United States Patent [19]

Inoue et al.

[11] Patent Number: 5,907,660
[45] Date of Patent: May 25, 1999

[54] DIGITAL VIDEO SIGNAL PLAYBACK DEVICE WITH SPECIAL PLAYBACK DATA BEING IN THE FORM OF A STILL IMAGE SLICE DATA

[75] Inventors: Sadayuki Inoue; Junko Shinohara; Tatsuo Yamasaki, all of Nagaokakyo, Japan

[73] Assignee: Mitsubishi Denki Kabushiki Kaisha, Tokyo, Japan

[21] Appl. No.: 08/768,225

[22] Filed: Dec. 17, 1996

Related U.S. Application Data

[63] Continuation of application No. 08/532,048, Sep. 21, 1995, abandoned.

[30] Foreign Application Priority Data

Sep. 21, 1994 [JP] Japan .................................. 6-226772
Sep. 26, 1994 [JP] Japan .................................. 6-230066

[51] Int. Cl.$^6$ .......................... H04N 5/917; H04N 7/26; H04N 5/91
[52] U.S. Cl. ............................... 386/109; 386/68
[58] Field of Search ...................... 386/68, 111, 81, 386/124, 6–8, 34, 35, 36, 37–40, 121–3, 109, 112; 348/402, 407, 409–413, 415, 416, 699

[56] References Cited

U.S. PATENT DOCUMENTS

| | | | |
|---|---|---|---|
| 5,168,356 | 12/1992 | Acampora et al. | 358/133 |
| 5,339,165 | 8/1994 | Inoue et al. | 358/312 |
| 5,377,051 | 12/1994 | Lane et al. | 360/33.1 |
| 5,384,665 | 1/1995 | Ohkuma et al. | 360/32 |
| 5,446,552 | 8/1995 | Inoue et al. | 358/335 |
| 5,450,209 | 9/1995 | Niimura et al. | 358/335 |
| 5,499,144 | 3/1996 | Inoue et al. | 360/10.3 |
| 5,510,840 | 4/1996 | Yonemitsu et al. | 348/402 |
| 5,513,010 | 4/1996 | Kori et al. | 358/341 |
| 5,623,344 | 4/1997 | Lane et al. | 386/81 |

OTHER PUBLICATIONS

Coding of moving pictures and associated audio for digital storage media at up to about 1.5 Mbits/s, ISO/IEC 11172–2, part 2, pp: viii, 16, 17, 54–56, 73–75, 85, 103–104, 1993.
Coded Representation of Picture, Audio, and Multimedia/Hypermedia, 1991.
HDTV '93, International Workshop on HDTV '93, Proceedings, vol. II, Oct. 26–28, 1993, "A Recording Method of ATV data on a Consumer Digital VCR", Yanagihara, et al.

*Primary Examiner*—Douglas W. Olms
*Assistant Examiner*—David R. Vincent

[57] ABSTRACT

In a digital signal playback device for playing back data from a recording medium on which intraframe, intrafield, interframe or interfield encoded digital video signals and digital audio signals input in the form of packets have been recorded transparently, and special playback data for special playback generated from said intraframe or intrafield encoded digital video signals has been recorded at predetermined positions, the special playback data is separated from a playback signal during special playback, and stored in a data storage circuit stores the separated special playback data. A still image slice data generator generates slice data with the motion vectors being 0 and prediction errors being 0 for all macroblocks in the slice. A data controller controls the still image slice generator such that the slice data from the still image slice generator is output for a predetermined number of frames after the special playback data of one frame or one field separated from the data storage means has been output. With the above arrangement, memory capacity is reduced, circuit size is reduced, and special playback can be realized without causing the ATV decoder to recognize the special playback mode.

13 Claims, 40 Drawing Sheets

FIG.9

|  | 2× | 4× | 8× | 16× |
|---|---|---|---|---|
| 9000rpm SYSTEM | 186SB | 62SB | 26SB | 12SB |
| 4500rpm SYSTEM | 93SB | 31SB | 13SB | 6SB |

SB : SYNC BLOCK a1, a2 : 2×, 4×(−2×) DATA
b1, b2 : 8×(−6×) DATA
c1, c2, : 16×(−14×) DATA

SB : SYNC BLOCK

C1
ERROR
DETECTION
FLAG

DATA
UPDATE
FLAG

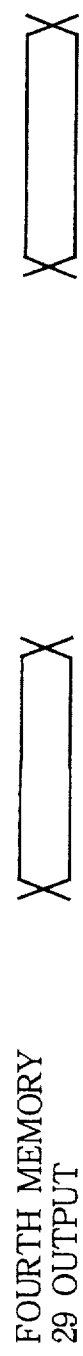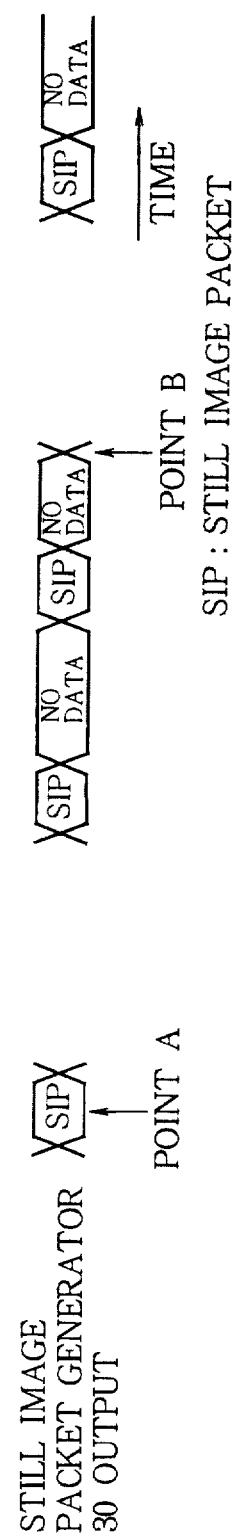

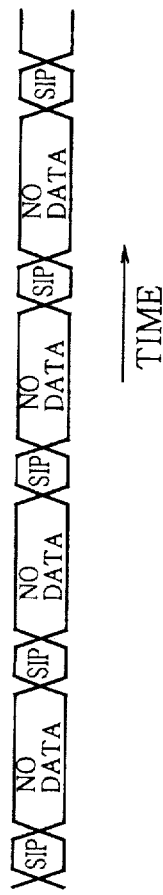

FIG. 24A SPECIAL PLAYBACK PACKET (SPECIAL PLAYBACK SLICE BLOCK)

FIG. 24B OUTPUT TRANSPORT PACKET

FIG. 24C SWITCH 31 CONTROL SIGNAL

SI : STILL IMAGE

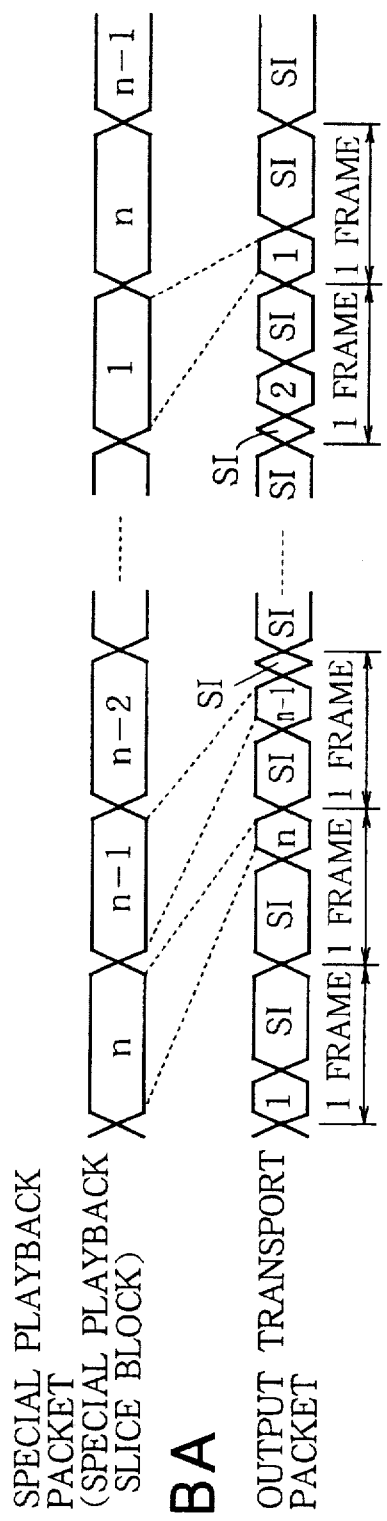
FIG.27A SPECIAL PLAYBACK PACKET (SPECIAL PLAYBACK SLICE BLOCK)
FIG.27BA OUTPUT TRANSPORT PACKET
FIG.27C SWITCH 31 CONTROL SIGNAL
SI : STILL IMAGE

TIME →

▨ : SPECIAL PLAYBACK SLICE BLOCK

☐ : STILL IMAGE SLICE DATA

| SLICE HEADER | MACROBLOCK AT LEFT EDGE OF SCREEN | MACROBLOCK AT RIGHT EDGE OF SCREEN |

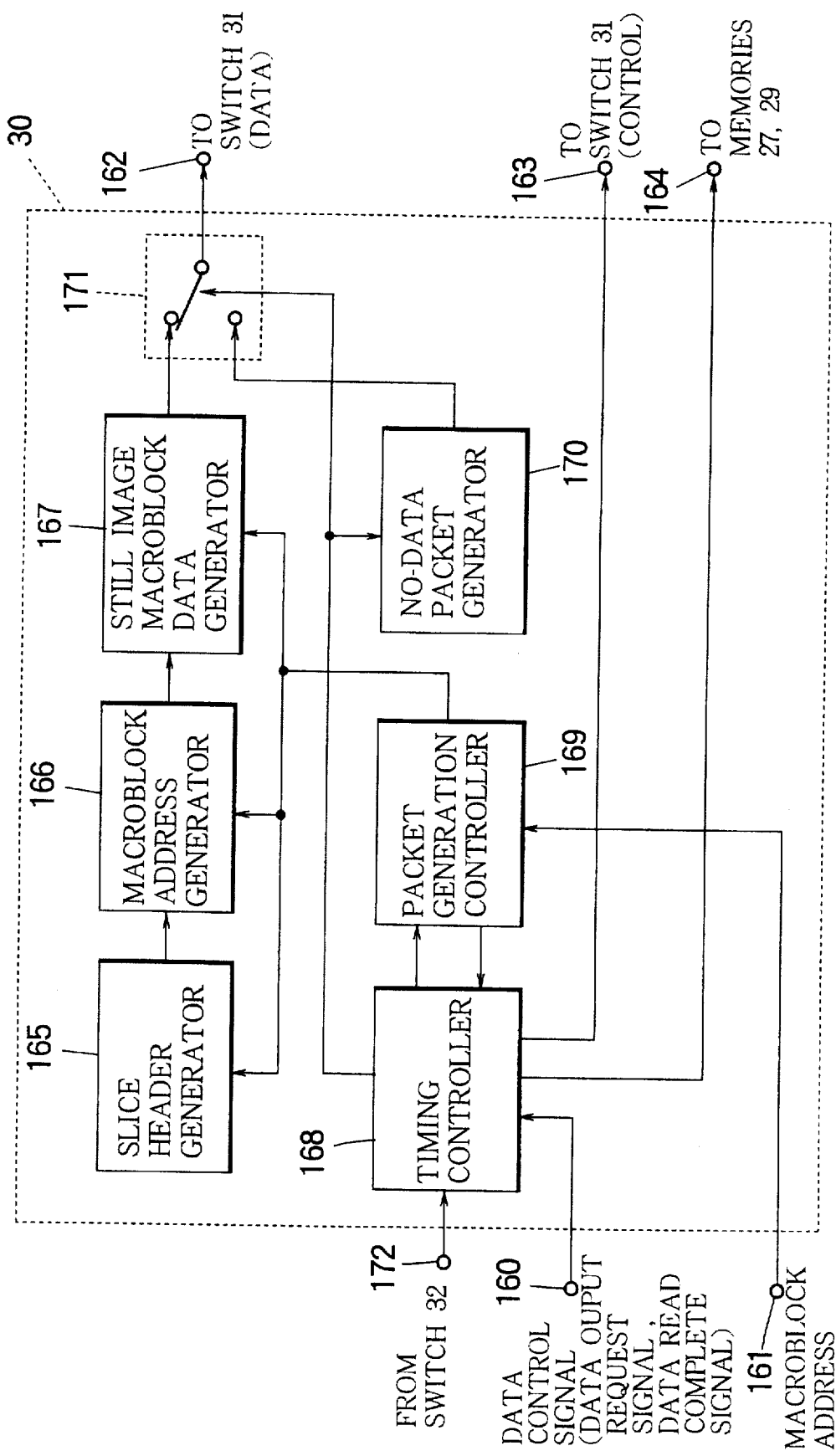

FIG.39
PRIOR ART
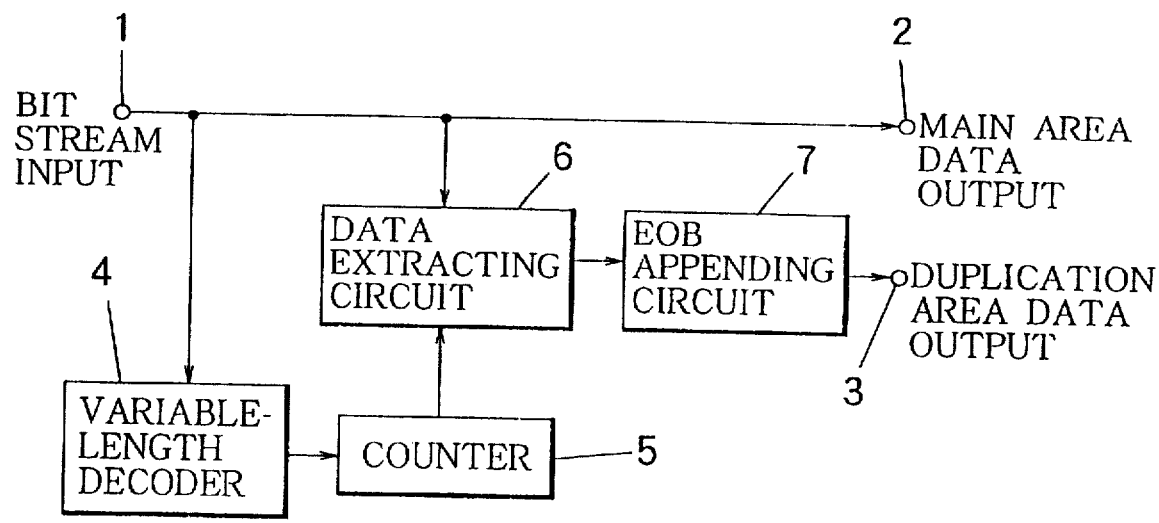
FIG.40
PRIOR ART
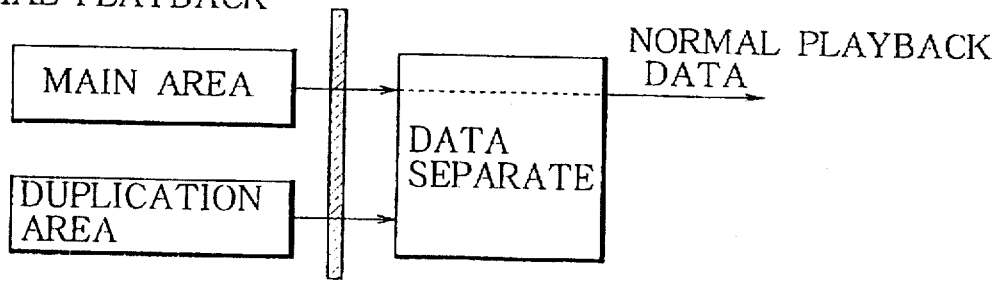
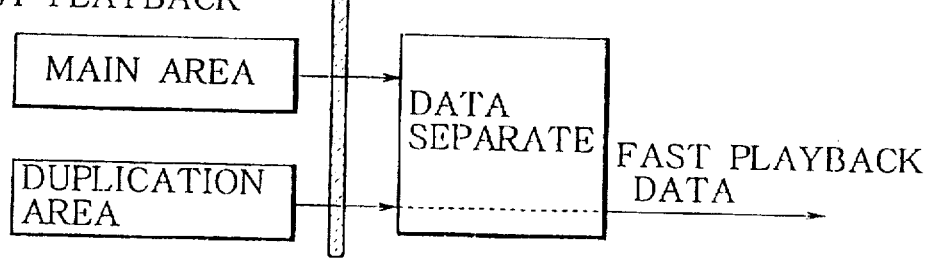

FIG. 44
PRIOR ART
CASE 1
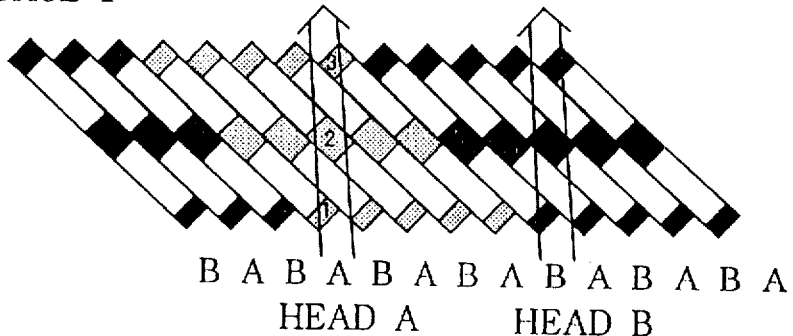
B A B A B A B A B A B A B A
   HEAD A        HEAD B
CASE 2
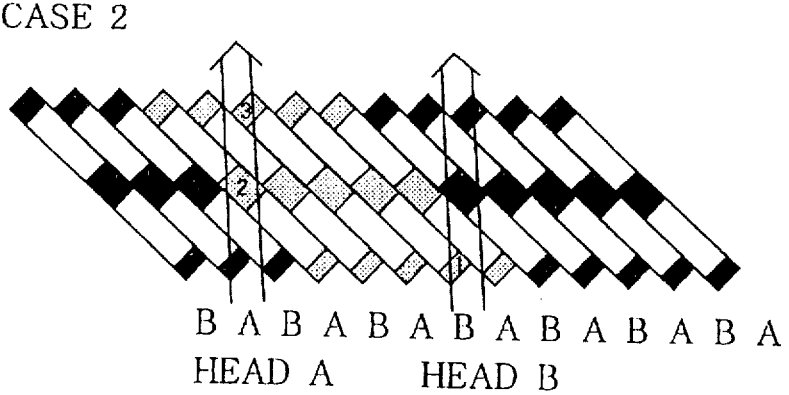
B A B A B A B A B A B A B A
   HEAD A        HEAD B
FIG. 45
PRIOR ART
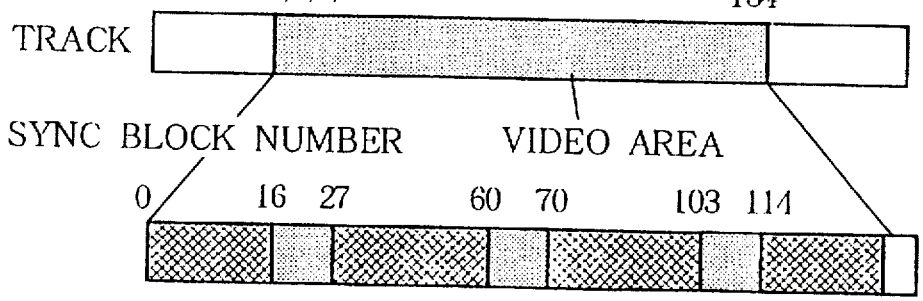
☒ MAIN AREA
☐ DUPLICATUON AREA

DIGITAL VIDEO SIGNAL PLAYBACK DEVICE WITH SPECIAL PLAYBACK DATA BEING IN THE FORM OF A STILL IMAGE SLICE DATA

This application is a continuation of application Ser. No. 08/532,048 filed on Sep. 21, 1995, now abandoned.

BACKGROUND OF THE INVENTION

This invention relates to a digital signal playback device such as a compact disk player (referred to hereinafter as CD), a digital audio tape recorder (referred to hereinafter as DAT), a digital video signal recording/playback device (referred to hereinafter as VTR) such as a digital VTR or digital video disk player that records digital video signal and digital audio signal bit streams typified by MPEG2, and more particularly relates to interface control during special playback.

FIG. 37 shows the track pattern of an ordinary home digital VTR. In the figure, slanting tracks are formed on the tape, each track being divided into a video area for recording digital video signals and an audio area for recording digital audio signals.

There are two ways of recording video and audio signals on this home digital VTR. One is baseband recording wherein analog video and audio signals are input and high-efficiency coding is performed on them. The other is transparent recording wherein a digitally transmitted bit stream is recorded.

Transparent recording is more suitable for the Advanced Television now being discussed in the U.S.A. This is because ATV signals are already digitally compressed, do not require a high efficiency coder or decoder, and can be recorded as they are with no picture quality deterioration. The problem however is special playback such as fast, still and slow playback. In particular, almost no pictures are reproduced during fast playback if a bit stream is recorded on slanting tracks without any modification.

One method of using a digital VTR to record these ATV signals is described in a "Method of Recording ATV Data on a Consumer Digital VTR", a technical presentation given at the "International Workshop on HDTV '93" held from Oct. 26–28, 1993 at Ottawa, Canada. This technique will now be described as an example of the prior art.

According to one basic specification of a prototype home digital VTR, in the SD (Standard Definition) mode, one video frame is recorded in video areas of 10 tracks if the recording rate of the digital video signal is 25 Mbps and the field frequency is 60 Hz. Assuming the data rate of an ATV signal is 17–18 Mbps, therefore, ATV signals can be recorded in this SD mode transparently.

FIG. 38A and FIG. 38B show the scanning trace of a rotary head during normal playback and fast playback of a conventional VTR. In the figure, adjacent tracks are recorded slantwise by heads having different azimuth angles. During normal playback, the tape travel speed is the same as in recording, so the head traces the recorded tracks as shown in FIG. 38A. During fast playback however, the tape speed is different so the head cuts across several tracks and can only reproduce fragments of tracks having the same azimuth. FIG. 38B shows the case for 5 times (5x) speed fast forward.

In an MPEG bit stream (ATV signals are almost always based on an MPEG2 bit stream), only intra-encoded blocks are decoded independently, without referring to other frames. Assuming the MPEG2 bit stream is sequentially recorded on each track, intra-encoded data will be separated from intermittently reproduced data during fast playback, and the image will be reconstructed only from this separated intra-encoded data. The reproduced area on the screen will be discontinuous, and block fragments will be scattered over the screen. Further, as the bit stream is variable length encoded, there is no guarantee that the whole screen will be periodically updated, and some parts may not be updated for long periods. As a result, the image quality during fast playback is unsatisfactory, and is unsuitable for home digital VTR.

FIG. 39 is a block diagram of a conventional bit stream recording device that permits fast playback. Here, the video area of each track is divided into a main area for recording the whole ATV signal bit stream, and a duplication area for recording important parts of the bit stream (HP data) used in reconstructing the image during fast playback. During fast playback, only intra-encoded blocks are effective so these are recorded in the duplication area, however to further reduce the amount of data, low frequency components are extracted from all intra-encoded blocks and recorded as HP data. In FIG. 39, an input terminal 1 is for receiving the bit stream. An output terminal 2 is for outputting the bit stream. An output terminal 3 is for outputting HP data. Reference numeral 4 is a variable length decoder, 5 is a counter, 6 is a data extracting circuit, and 7 is an EOB (End of Block) appending circuit.

The MPEG2 bit stream is input via the input terminal 1, output via the output terminal 2 and sequentially recorded in the main area. The bit stream from the input terminal 1 is also input to the variable length decoder 4, where the syntax of the MPEG2 bit stream is analyzed, and intra-images are detected, timing is generated by the counter 5. Low frequency components are extracted from all blocks in the intra-images by the data extracting circuit 6, and EOB's are appended by the EOB appending circuit 7 so as to construct HP data which is recorded in the duplication area.

FIG. 40 shows the essential features of a conventional digital VTR during normal playback and fast playback. During normal playback, all of the bit stream recorded in the main area is reproduced and output to the MPEG2 decoder outside the digital VTR. HP data is discarded. On the other hand, during fast playback, only HP data in the duplication area is collected and sent to the decoder, while the bit stream in the main area is discarded.

Next, the arrangement of data in one track of the main area and duplication area will be described. FIG. 41 is a head scanning trace during fast playback. When the tape speed is an integer multiple and phase-locked state is maintained, head scanning is synchronized with tracks having the same azimuth and the positions from which data is reproduced are fixed. In the figure, assuming that useful data is obtained from a part of the playback signal having an output level higher than −6 dB, the hatched areas will be reproduced by one head. FIG. 41 shows the case of 9 times (9x) speed, so signal reading of this hatched area is guaranteed at 9 times speed, and HP data may be recorded in this area. At other speeds however, signal reading is not guaranteed. For this reason, the areas where the HP data is recorded must be chosen so that it can be read at several tape speeds.

FIG. 42 shows examples of scanning areas for three tape speeds at which the head is synchronized with tracks having the same azimuth, and overlapping areas (at the bottom of FIG. 42) at the three fast playback speeds (the areas which are reproduced at any of the three fast playback speeds). The duplication area is selected from these overlapping areas, so that reading of HP data at different tape speeds is guaranteed. FIG. 42 shows the case of 4 times (4x), 9 times (9x) and 17 times (17x) speed fast forward, but these scanning areas are the same as for -2, -7 and -15 times (-2x, -7x and -15x) speed (i.e., 2, 7 and 15 times reverse speed).

However, it is impossible for the head to trace exactly the same area at several tape speeds due to the fact that the number of tracks the head cuts across depends on the tape speed. Also, the head must be able to trace from any identical azimuth track.

FIG. 43 shows 5 times and 9 times speed head scanning traces in a conventional VTR. In the figure, areas 1, 2, 3 are selected from 5 times and 9 times speed overlapping areas. By repeatedly recording the same HP data on 9 tracks, the HP data can be read at either 5 or 9 times speed.

FIG. 44 shows two head scanning traces at 5 times speed playback in a conventional digital VTR. As seen from the drawing, by repeatedly recording the same HP data on a number of tracks equal to the tape speed, the HP data can be read out by a head synchronized with tracks having an identical azimuth. Therefore, by repeatedly providing HP data on a number of tracks equal to the speed multiplier of the maximum fast playback speed (the speed multiplier being defined by the ratio of the fast playback speed to the normal playback speed), the HP data can be read in the forward or reverse directions at several tape speeds.

FIG. 45 is a track layout diagram in a conventional digital VTR, showing typical main areas and duplication areas. In the home digital VTR, the video area of each track comprises 135 sync blocks, the main area comprises 97 sync blocks and the duplication area comprises 32 sync blocks. For this duplication area, overlapping areas corresponding to the 4, 9, 17 times speeds also in FIG. 42 are selected. In this case, the data rate for the main area is approx. 17.46 Mbps and as the same data is recorded 17 times in the duplication area, the data rate for the duplication areas is approx. 338.8 kbps.

As the conventional VTR has the construction described above, special playback data is duplicated many times in the duplication area, so the recording rate of special playback data is very low and satisfactory image quality cannot be obtained. This is especially true during slow or fast playback. For example, if there are two intraframes per second, the amount of purely intra-encoded data in the ATV signal is estimated to be of approx. 3 Mbps, whereas, in the conventional example, only approx. 340 kbps can be recorded so the picture quality seriously deteriorated.

Where the ATV signal bit stream (transport packets) constructed from data recorded in the special playback area is output during special playback, if for example there is a large amount of data in the intra-frames, the transport packets may overflow in the data transmission process so that the system breaks down at the ATV decoder. Further, the capacity of the special playback memory on the playback side must be extremely large.

FIG. 46A and FIG. 46B show the configuration of error correction codes in the video and audio signal areas in one track of a digital VTR defined in the above SD mode (referred to hereinafter as SD specification). According to the SD specification, error correction codes used in the video signal area are a (85, 77, 9) Reed-Solomon code in the recording direction (referred to hereinafter as C1 check code), and a (149, 138, 12) Reed-Solomon code in the perpendicular direction (referred to hereinafter as C2 check code). Error correction codes used in the audio signal area are a (85, 77, 9) Reed-Solomon code (of the same type as that used for the video signal) in the recording direction (C1 check code), and a (14, 9, 6) Reed-Solomon code in the perpendicular direction (referred to hereinafter as C3 check code). FIG. 47 shows one sync block which is a unit of recording in the recording direction (C1 block). As shown in FIG. 47, one sync block comprises 90 bytes. The sync pattern and ID signal are recorded in the 5 bytes at the head and the error correction code (C1 check code) is recorded in the last 8 bytes.

As described above, the playback signal is reproduced intermittently from the tracks as the rotary head cuts across the recording tracks obliquely during special playback (fast playback, slow playback, still playback). An error correction block (video data) shown in FIG. 46A cannot therefore be constructed during special playback, so only error correction by means of C1 check code can be performed on playback data during fast playback.

If only error correction by means of C1 check code is performed, when the symbol error rate is 0.01, the error detection probability is $1.56 \times 10^{-3}$, i.e. one error is detected approximately every 8 sync blocks. Further, as the playback output is not stable during special playback, it often occurs that the symbol error rate is 0.01 or higher. As the recorded data is variable length coded, the subsequent playback data can no longer be used once an error occurs, and this causes deterioration of image quality. Undetected errors also occur very frequently, i.e. $7.00 \times 10^{-8}$.

SUMMARY OF THE INVENTION

This invention, which has been conceived to overcome the above problems, aims to provide a digital signal playback device wherein playback image quality is improved, especially during slow or fast playback, exactly the same interface control is performed in the ATV decoder during special playback (fast playback, slow playback and still playback) as in normal playback, the memory capacity during fast playback is reduced, and playback in fast playback is efficient.

Another object of the invention is to efficiently generate transport packets when recording so that data control over the playback system during fast playback is relatively simple, and in particular to reduce the circuit size of the playback system so that fast playback can be efficiently performed.

A further object of the invention is to reduce the memory capacity of the playback system during fast playback so as to perform fast playback efficiently.

According to one aspect of the invention, there is provided a digital signal playback device for playing back data from a recording medium on which intraframe, intrafield, interframe or interfield encoded digital video signals and digital audio signals input in the form of packets have been recorded transparently, and special playback data for special playback generated from said intraframe or intrafield encoded digital video signals has been recorded at predetermined positions, comprising:

data separating means for separating said special playback data from a playback signal during special playback;

data storage means for storing said separated special playback data;

still image slice data generating means for generating still image data; and still image slice data; and data control means for controlling said still image slice generating means such that the slice data from said still image slice generating means is output for a predetermined number of frames after said special playback data for one frame or one field period has been output from said data storage means.

The still image slice may be one with the motion vectors being 0 and prediction errors being 0 for all macroblocks in the slice; and With the above arrangement, memory capacity is reduced, circuit size is reduced, and special playback can be realized without causing the ATV decoder to recognize the special playback mode.

It may be so arranged that data change-over is performed such that the output of said still image packet generating means is always selected during still playback after said the final data in the frame or field reproduced during normal playback has been output.

With the above arrangement, a good reproduced image can be constructed by using a still image packet generating means for fast playback, without need of a memory for storing intra-encoded information for one frame in the digital VTR, even during still playback that does not use special playback data.

It may be so arranged that the change-over of data is performed such that the output of said still image packet generating means is output until a servo system locks and the intra-frame data for the special playback is reproduced, during transition to fast playback.

With the above arrangement, mode transition can be performed smoothly without disruption of the reproduced image.

According to another aspect of the invention, there is provided a digital signal playback device for playing back data from a recording medium on which intraframe, intrafield, interframe or interfield encoded digital video signals and digital audio signals input in the form of packets have been recorded transparently, and special playback data for special playback generated from said intraframe or intrafield encoded digital video signals has been recorded at predetermined positions, comprising:

data separating means for separating said special playback data from a playback signal during special playback;

data storage means for storing said separated special playback data;

still image slice data generating means for generating still image slice data; and packet generating means for generating packets such that said packets is transport packets for one frame formed using one or more slices of said special playback data separated by said data separating means from the reproduced data intermittently reproduced, and slide data from said still image slice data generating means, said transport packets is taken as interfield or interframe prediction mode, and said intermittently reproduced special playback data is taken as a forced intraframe mode.

The still image slice data may be one with the motion vectors being 0 and prediction errors being 0 for all macroblocks in the slice.

With the above arrangement, memory capacity required during fast playback is reduced, and the circuit size can be reduced.

It may be so arranged that said control is used at least during special playback in reverse direction.

With the above arrangement, memory capacity required during fast playback is reduced, and it is unnecessary to provide a memory for rearranging the data during reverse playback so that circuit size is even further reduced.

According to another aspect of the invention, there is provided a digital signal playback device for playing back data from a recording medium on which intraframe, intrafield, interframe or interfield encoded digital video signals and digital audio signals input in the form of packets have been recorded transparently, and special playback data for special playback generated from said intraframe or intrafield encoded digital video signals has been recorded at predetermined positions, comprising:

data separating means for separating said special playback data from a playback signal;

specific area fixed packet generating means for generating packets to freeze signals in specific areas on the screen when data output by said digital signal playback device is decoded so as to restore the original playback image data;

wherein transmission is performed with one frame of special playback data being divided into a plurality of block, in such a manner that the output of said specific packet fixing means and the special playback data are switched.

With the above arrangement, memory capacity required during fast playback is reduced.

According to another aspect of the invention, there is provided a digital signal recording and playback device for transparently recording intraframe, intrafield, interframe or interfield encoded digital video signals and digital audio signals input in the form of transport packets, comprising:

data separating means for separating intraframe or intrafield coded video signals from said transport packets, special playback packet generating means for reconfiguring said intraframe or intrafield coded digital signals separated by said separating means so as to form special playback transport packets, special playback block forming means for grouping a plurality of said special playback transport packets output by said special playback packet generating means so as to form special playback blocks, and recorded data controlling means for controlling recorded data so as to form the special playback blocks in such a manner that data in the same slice does not spread over a plurality of special playback blocks, and data output by said special playback block forming means is recorded on predefined areas of a recording medium when said special playback blocks are formed.

With the above arrangement, special transport packets that are resistant to error propagation are generated, the control of the playback system is simplified, and circuit size is reduced.

It may be so arranged that said special playback packet generating means is controlled so that data in one slice does not spread over a plurality of said transport packets when said special playback transport packets is generated.

With the above arrangement, the bit stream is generated without extracting slice headers from special playback transport headers during special playback to generate new special playback transport headers, so the circuit size of the playback system can be reduced.

It may be so arranged that said special playback packet generating means is controlled so that said slice data is configured from all macroblocks belonging to the same macroblock row when said special playback transport packet is generated.

With the above arrangement, the output timing of one frame of the bit stream during special playback is controlled by the number of the reproduced packets of the special playback transport packets, so the generation of data output timing is extremely simple. Further, with a digital storage media for recording and playback, or playback only, by which a signal, for example, a 4:2:2 component signal which has a smaller amount of data per frame than ATV signal is converted into a 4:2:0 color-difference sequential signal, and then data complying with the MPEG2 specification is generated, the size of the circuit of the playback system can be effectively reduced.

It may be so arranged that said special playback transport packets are formed such that data of the macroblock at the head of said special playback transport packets is formed from a macroblock on the left edge of the screen.

With the above arrangement, when data transmitted at a rate lower than the ATV signal is recorded on digital storage media, special playback transport packets can therefore be configured efficiently, and the circuit size of the playback system can be effectively reduced.

It may be so arranged that said special playback block forming means is controlled so that the data in said special playback block data is configured from all macroblocks belonging to the same macroblock row.

With the above arrangement, the output timing of one frame of special playback transport packets during special playback is controlled by the number of reproduced blocks of the special playback blocks. As a result, generation of data output timing is extremely simple. Moreover, with ATV signals having a relatively large amount of data which is difficult to transmit all the macroblock belonging to the same macroblock row with one transport packet, the circuit size of the playback system is effectively reduced. Further, the image quality is improved because of the smaller amount of slice headers than other embodiments.

It may be so arranged that said special playback block forming means is controlled such that said special playback blocks are formed from two special playback transport packets.

With the above arrangement, the aforesaid special playback transport packets can be effectively packed by a digital VTR complying with the SD specification.

It may be so arranged that said special playback blocks are disposed on said recording medium so that at least one of said special playback blocks is configured in the time taken by a rotary head to make one scan when the special playback is performed at a predefined speed.

With the above arrangement, the output timing of one frame of bit stream data during special playback can be generated by using the number of scans of the rotary head, so the circuit size of the playback system can be further reduced.

It may be so arranged that said special playback block is controlled to form special playback blocks from one error correction block to which an error correction code is appended in the direction different from the recording direction.

With the above arrangement, a plurality of special playback transport packets are grouped together, and special playback blocks are configured from one error correction block to which an error correction code is appended in a direction different from the recording direction. The output timing of one frame of bit stream data during special playback can therefore be generated by using an error correction decoding complete timing, and the circuit size of the playback system can be further reduced.

According to another aspect of the invention, there is provided a A digital signal playback device for playing back data from a recording medium wherein an intraframe, intrafield, interframe or interfield encoded digital video signal input in the form of transport packets and a digital audio signal, are recorded transparently, special playback data used for special playback is generated from said digital video signal which is intraframe or interfield coded from said transport packets, and said generated data is recorded at predefined positions, comprising:

separating means for separating said special playback data during special playback, data storage means for storing said separated special playback data, specific area fixed packet generating means for generating a transport packet to freeze a signal in a specific area of the screen when data output by said digital signal playback device is decoded so as to restore playback image data, and data output control means for generating an output timing control signal when one frame of special playback transport packet data is output, wherein control is so made that when said output timing signal is output by said data output control means when a playback image is configured using intermittently reproduced data, one frame of said special playback data is generated and transmitted using the output of said specific area fixed packet generating means and special playback data stored in said data storage means.

With the above arrangement, when the aforesaid output timing signal is output, the aforesaid data storage means detects the position on the screen of stored special playback data, and information indicative of the detected position is output to the special area fixed packet generating means. The special area fixed packet generating means outputs a transport packet to freeze the image data part of the frame which has not yet been configured by the data storage means. These signals are then combined and output. As a result, the memory capacity of the special playback data memory in the playback system can be reduced, and control of the playback system is simplified It may be so arranged that said output timing signal output by said data output control means is synchronized with the number of scans of a rotary drum head.

With the above arrangement, the output timing signal is generated at a predefined timing by counting the number of scans of the rotary drum head, hence even if the drum rotation speed is varied in order to adjust the relative speed, the aforesaid signal can be generated in time with the drum rotation speed and generation of timing is rendered simple.

It may be so arranged that said output timing signal output by said data output control means is synchronized with the frame frequency of an externally connected display.

With the above arrangement, the frame frequency of the externally connected display device is separated from the playback data, and the output timing signal from the data output control means is generated in synchronism with the frame frequency, There is therefore no need to alter the control for generating special playback data depending on the type of external display device. Accordingly, generation of timing is rendered simple and connection with devices having different frame frequencies is also simple.

It may be so arranged that the transport packet output by said specific area fixed packet generating means is formed from data of all the macroblocks within the packet for which all the motion vectors are 0 and prediction errors are 0, the transmission mode for all image data during special playback is set to be the interframe mode, and only the special playback data is transmitted in a forced intraframe mode in the interframe image.

With the above arrangement, the circuit size of the playback system on the side of the digital storage media can be reduced. Moreover, the input bit stream can be decoded by the ATV decoder without recognizing the playback state of the digital storage media.

BRIEF DESCRIPTION OF THE DRAWINGS

In the drawings;

FIG. 9 is a diagram showing the number of sync blocks which data can be obtained during fast playback;

FIG. 20A to FIG. 20F are time charts showing the operation of the digital VTR of an embodiment of the invention;

FIG. 21A to FIG. 21E are timing charts for explaining transition from normal playback to special playback;

FIG. 27A to FIG. 27C are diagrams illustrating the playback data during reverse special playback;

FIG. 34 is a block diagram showing an example of still image packet generator in FIG. 23;

FIG. 39 is a block diagram showing a conventional bit stream recording device capable of fast playback;

FIG. 40 is a diagram showing the essential features of normal playback and fast playback of a conventional digital VTR;

FIG. 44 shows showing scanning traces of two heads at 5 times playback speed;

FIG. 45 is a track layout diagram in a conventional digital VTR;

DETAILED DESCRIPTION OF THE PREFERRED EMBODIMENTS

EMBODIMENT A1

Figure 1:
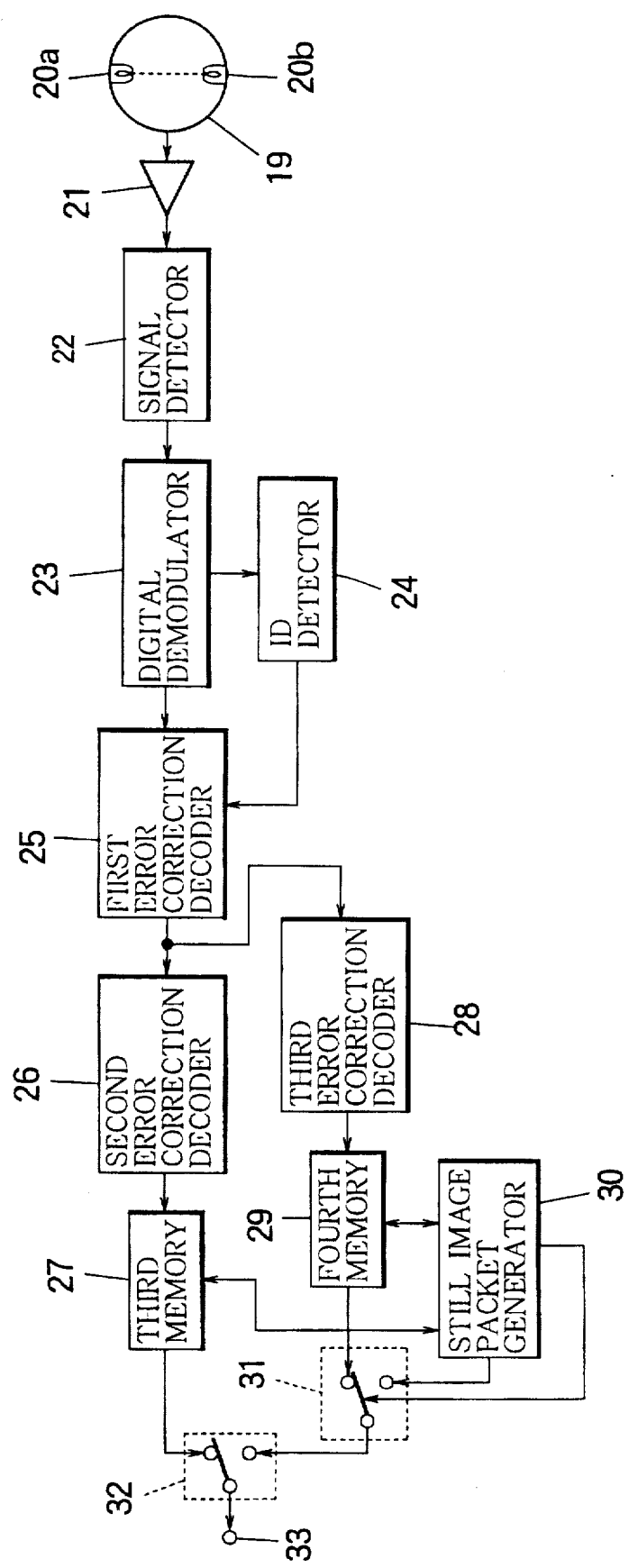
FIG. 1 is a block diagram showing a playback system of a digital VTR which is one example of this invention.

FIG. 1 is a block diagram of a playback system of a digital VTR according to Embodiment A1 of this invention. In the figure, reference numeral 19 is a rotary drum, 20a and 20b are rotary heads, and 21 is a head amplifier. A signal detector 22 detects digital data by means of a playback signal. A digital demodulator 23 performs digital demodulation on reproduced digital data output by the signal detector 22.

An ID detector 24 detects an ID signal in the digital demodulated signal. A first error correction decoder 25 corrects or detects errors contained in the digital demodulated signal using the C1 check code (error correction code in the recording direction). A second error correction decoder 26 corrects or detects errors in the data not corrected by the C1 check code (data for which errors have been detected or are undetected) during normal playback using the C2 check code (error correction code appended to the video signal in the vertical direction).

Reference numeral 27 is a third memory. A third error correction decoder 28 corrects or detects errors using using an error correction code (referred to hereinafter as C4 check code which will be described in further detail) appended to special playback data. Reference numeral 29 is a fourth memory. A still image packet generator 30 generates still image packets from a control signal output by the third memory 27 or fourth memory 29. Reference numerals 31 and 32 are switches, and 33 is a data output terminal.

Before describing Embodiment A1, a brief description of the ID signal used in a digital VTR will be given. The ID signal of a digital VTR according to the SD specification contains additional information such as track number and sync block number, and error correction code for correcting or detecting errors in the ID signal during playback. This is used as supplementary information to store, when sync blocks are lost due to drop-out during normal playback, correctly reproduced sync block data at predetermined addresses (memory locations) in the error correction block shown in FIG. 46A and FIG. 46B immediately after the drop-out. It is used also as a reference signal for generating a write address in a memory 40 (described in detail hereinafter) during special playback such as fast playback or slow playback. According to Embodiment A1, the ID signal contains a track number, in-track sync block number and error correction codes for detecting errors occurring in the ID signal during playback.

Figure 2:
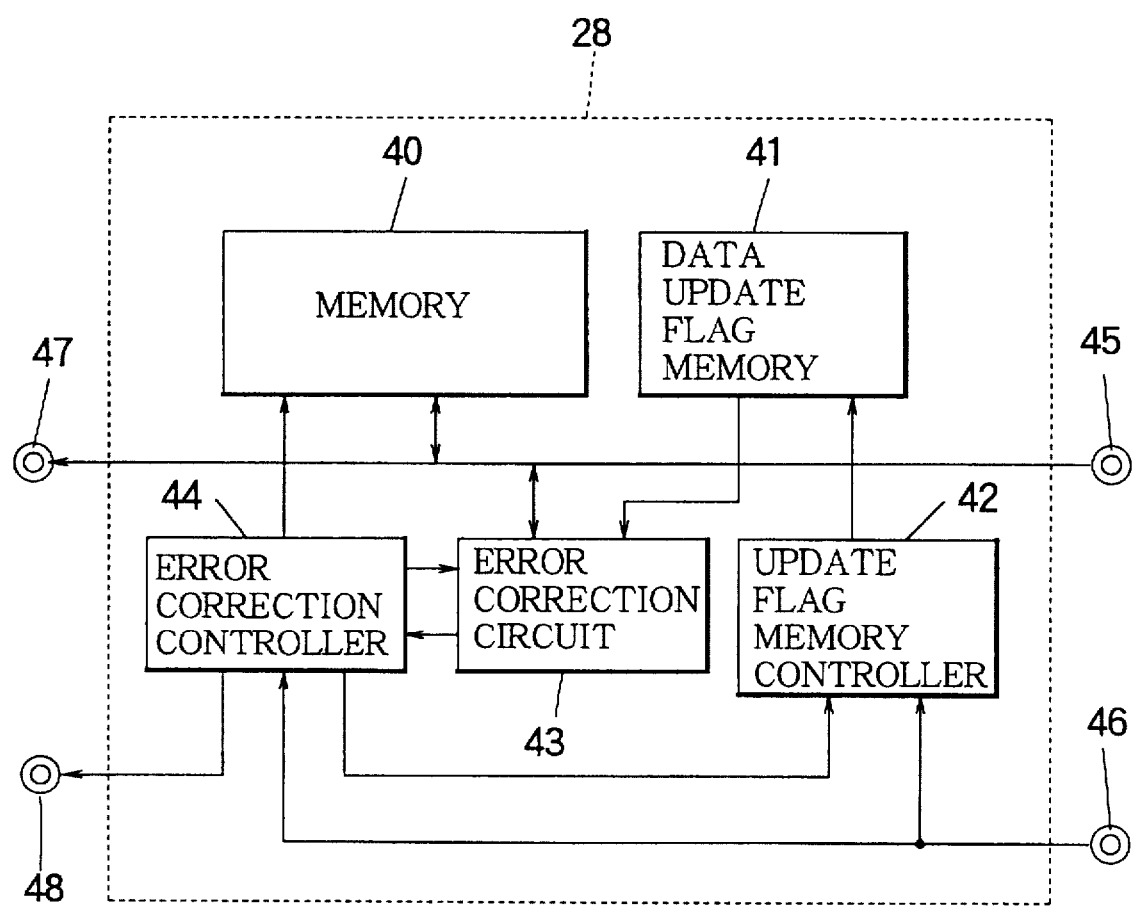
FIG. 2 is a block diagram showing an example of a third error correction decoder 28 in FIG. 1.

FIG. 2 is a block diagram of an example of a third error correction decoder 28. (The second error correction decoder 26 has basically the same construction, although the size of the memories may differ). In the figure, reference numeral 40 is a memory. A data update flag memory 41 stores a playback data update flag. An update flag memory controller 42 controls the data update flag memory 41. An error correction circuit 43 corrects input data. An error correction controller 44 controls the memory 40, data update flag memory 41, update flag memory controller 42 and error correction circuit 43. Reference numeral 45 is a playback data input terminal. An input terminal 46 is receiving for ID information output by the ID detector 24 and an ID signal error detection flag. An output terminal 47 is outputting error corrected data. An output terminal 48 is for outputting error detection flags. This flag data will be described in detail hereinafter.

Figure 3:
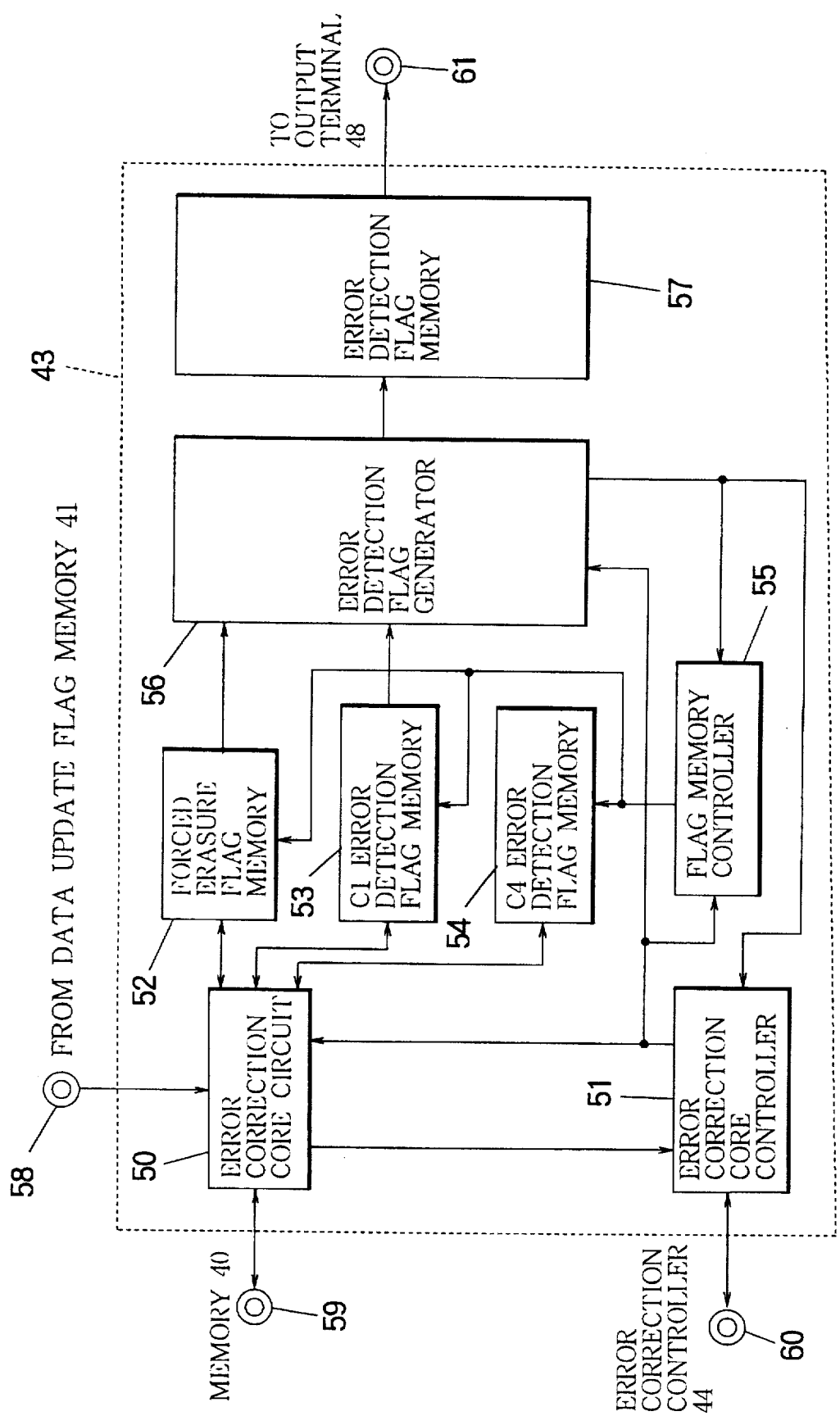
FIG. 3 is a block diagram showing an example of an error correction circuit 43 in FIG. 2.

FIG. 3 is a block diagram of an example of the error correction circuit 43. In the figure, an error correction core circuit 50 is for correcting or detecting errors in playback data in accordance with a syndrome generated from data read from the memory 40. The error correction of data stored in the memory 40 is also performed by the error correction core circuit 50.

An error correction core controller 51 generates a control signal for controlling the error correction core circuit 50 based on a control signal output by the error correction controller 44. A forced erasure flag memory 52 stores a data update flag position output by the data update flag memory 41. A C1 error detection flag memory 53 stores an error position detected when error correction decoding is performed by means of the C1 check code (such decoding being referred to hereinafter as C1 decoding) by the first error correction decoder 25. A C4 error detection flag memory 54 stores an error position detected when error correction decoding is performed by means of the C4 check code (referred to hereinafter as C4 decoding).

A flag memory controller 55 generates control signals for writing data to and reading data from the forced erasure flag memory 52, C1 error detection flag memory 53 and C4 error detection flag memory 54, based on control signals output by the error correction core controller 51. An error detection flag generator 56 generates error detection flags appended to data for which errors have been detected. An error detection flag memory 57 stores the error detection flag output by the error detection flag generator 56. An input terminal 58 is for the data update flag output by the data update flag memory 41. An I/O terminal 59 is for exchanging data with the memory 40. An I/O terminal 60 is for controlling signals to and from the error correction controller 44. An output terminal 61 for outputting data read from the error detection flag memory 57 with a predetermined timing based on a control signal output by the error correction core controller 51. Error-corrected playback data is read from the memory 40 via an output terminal 47 and supplied to the fourth memory 29.

Figure 4A:
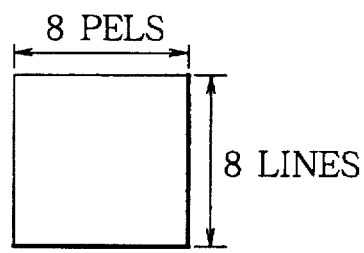
FIG. 4A to FIG. 4C are diagrams showing DCT blocks and macroblocks in an ATV signal.
Figure 4B:
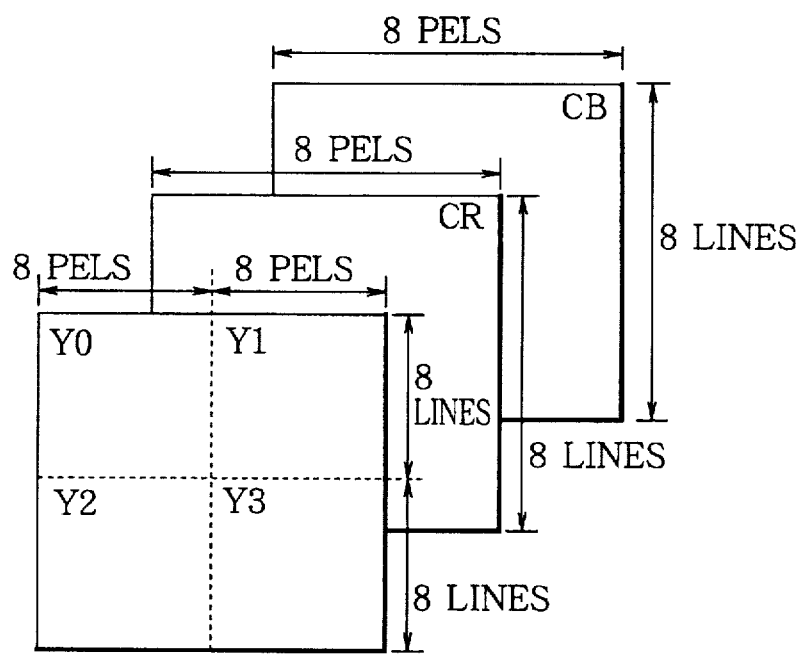
Figure 4C:
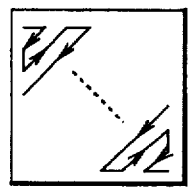
Figure 5:
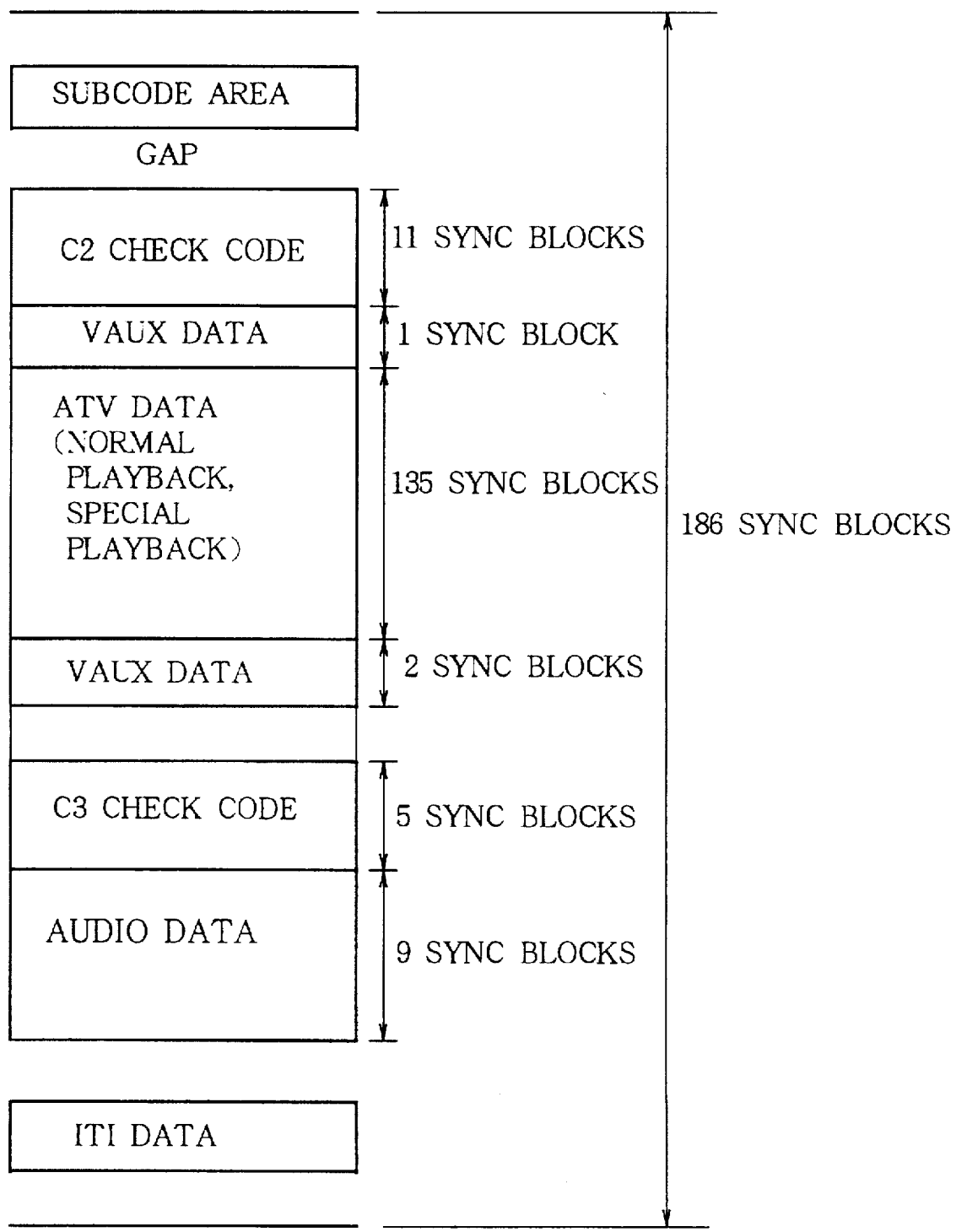
FIG. 5 is a diagram showing the arrangement of data on a track in compliance with the SD specification.
Figure 6A:
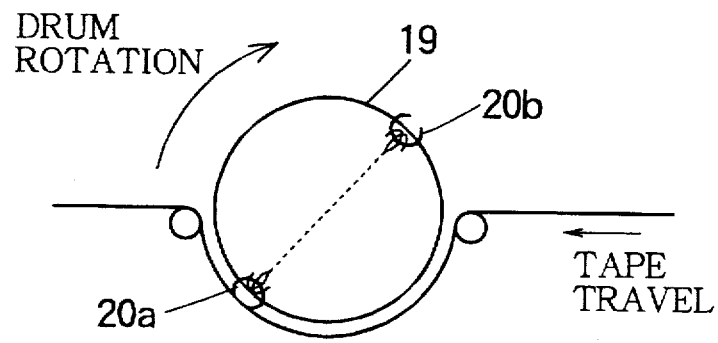
FIG. 6A to FIG. 6C are diagrams showing typical examples of arrangement of rotary heads 20a and 20b on a typical rotary drum 19 used in the SD mode.
Figure 6B:
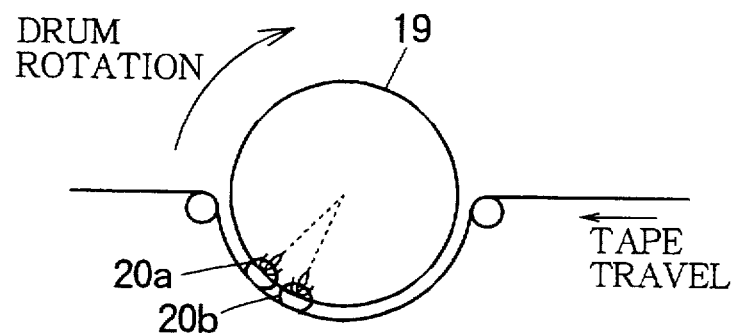
Figure 6C:
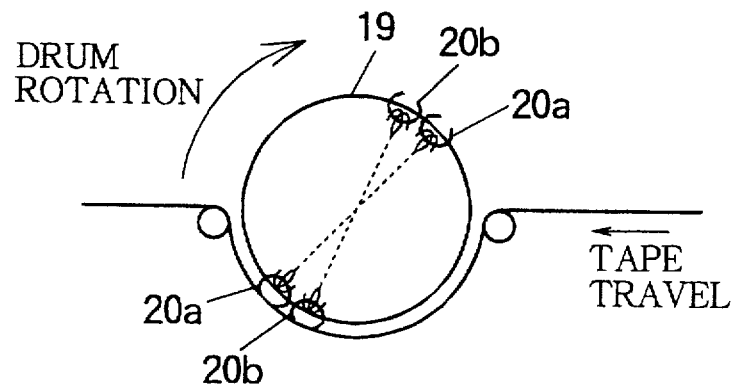
Figure 7A:
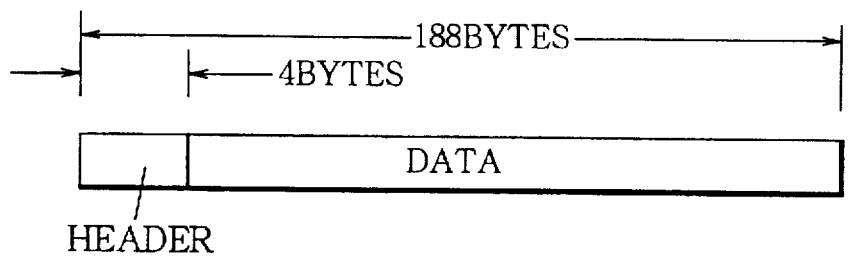
FIG. 7A is a diagram showing a transport packet contained in an input bit stream.
Figure 7B:
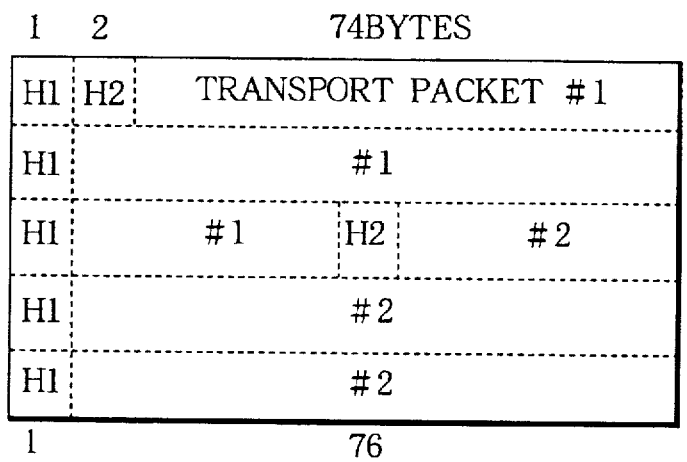
FIG. 7B is a diagram showing data packets recorded on a magnetic tape.
Figure 8:
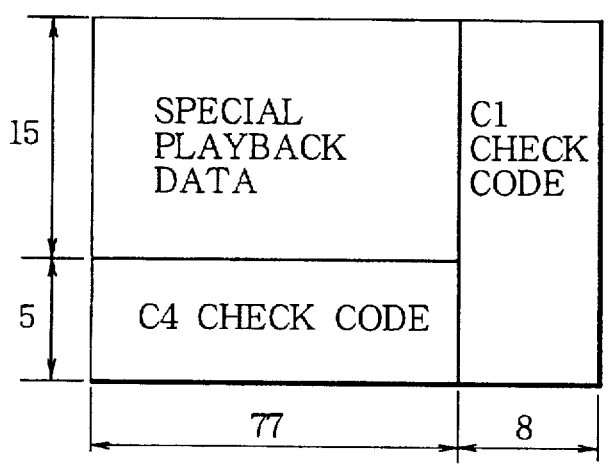
FIG. 8 is a diagram showing error correction codes appended to special playback data.

FIG. 4A to FIG. 4C show the configuration of the DCT blocks and macroblocks in the ATV signal. FIG. 5 shows the arrangement of data in one track according to one embodiment of this invention based on the SD specification. FIG. 6A to FIG. 6C show typical positions, used in the SD mode, of heads 20a, 20b on a rotary drum 19. FIG. 7A and FIG. 7B show an example of data packets used in the embodiment of the invention. FIG. 7A shows a transport packet contained in the input bit stream, and FIG. 7B shows a recording data packet recorded on magnetic tape. FIG. 8 shows code configuration of error correction codes appended to special playback data. The code configuration will be called an error correction block.

Figure 10A:
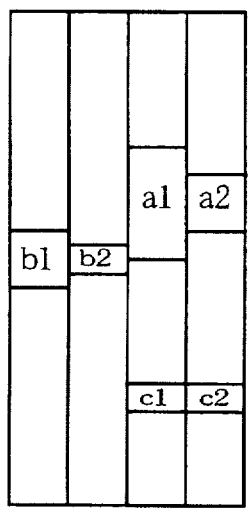
FIG. 10A is a diagram showing the special playback data recording area on a track.
Figure 10B:
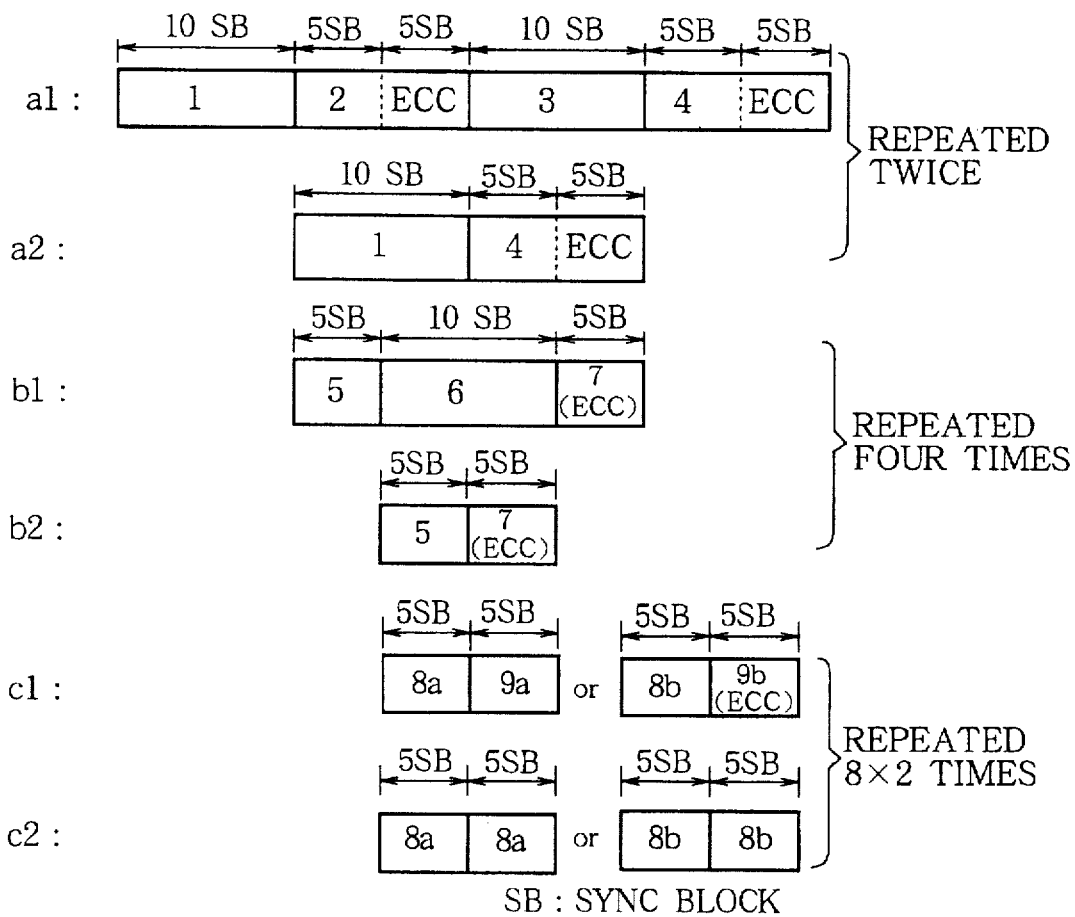
FIG. 10B is a diagram showing the arrangement of data recorded in that area of the track.
Figure 11:
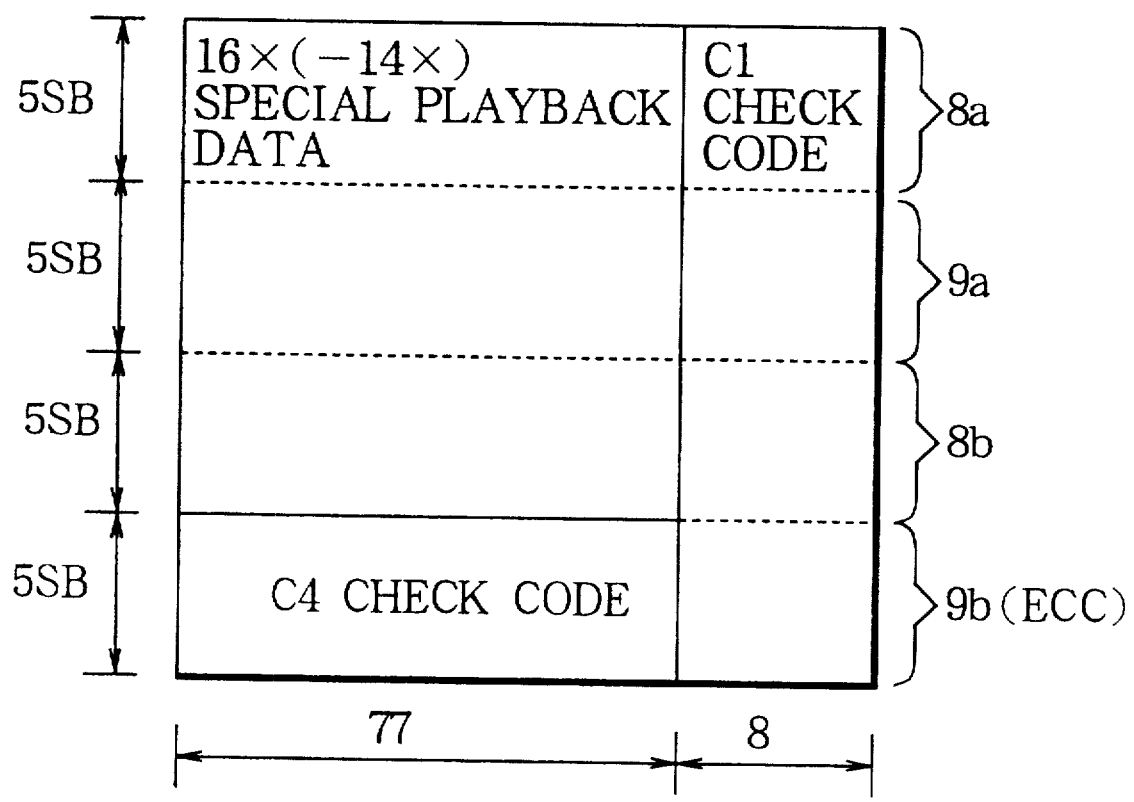
FIG. 11 is a diagram showing a method of dividing one error correction block of data at 16 times (−14 times) speed.
Figure 12:
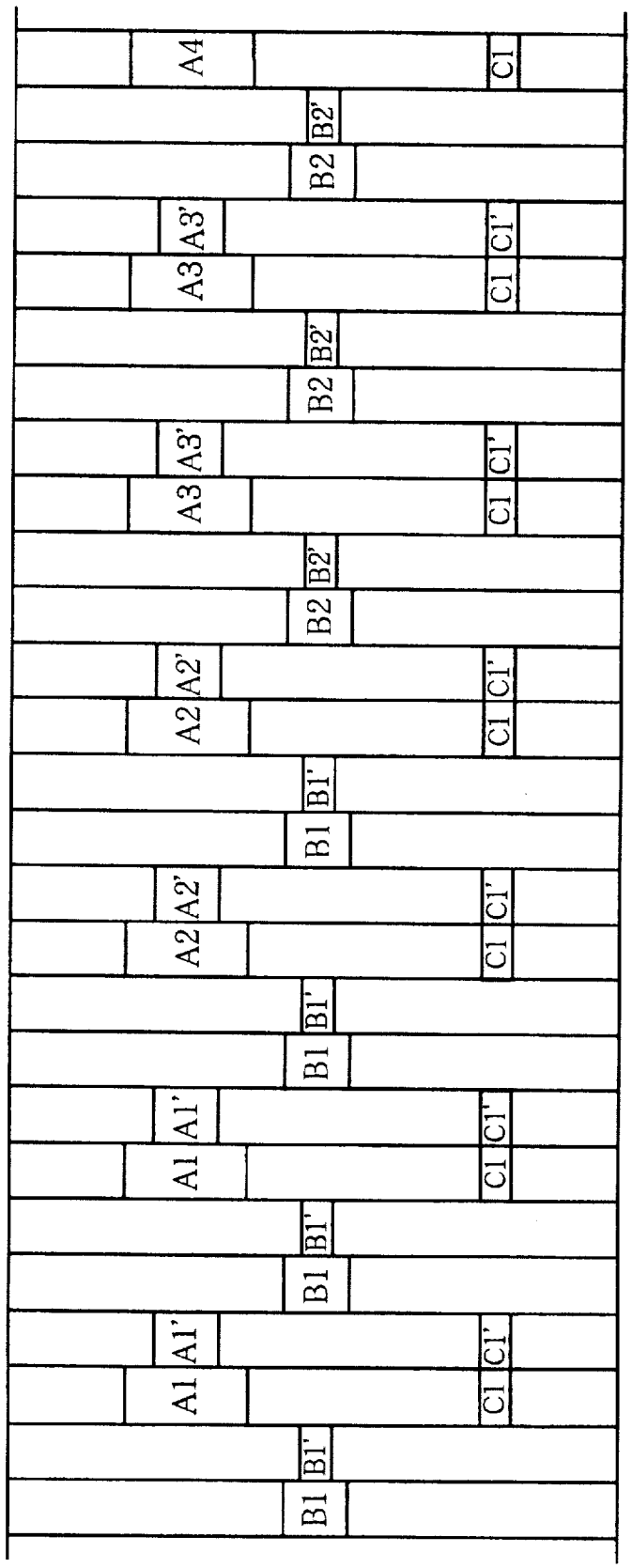
FIG. 12 is a diagram showing the track format.

FIG. 9 shows number of sync blocks for which data can be obtained from one track during fast playback. FIG. 10A and FIG. 10B show the arrangement of special playback data recording areas in tracks and the arrangement within special playback data recording areas. FIG. 11 is a diagram showing how one error correction block for 16 times (16x) speed (−14 times (−14x) speed) data is divided. FIG. 12 shows a track format. Before describing the operation of the playback system, the recording format will be described with reference to FIG. 5 to FIG. 12.

Transport packets (comprising digital video signals and digital audio signals, and digital data for video signals and audio signals) input during recording comprise a 4 byte header part and 184 byte data part as shown in FIG. 7A.

Figure 47:
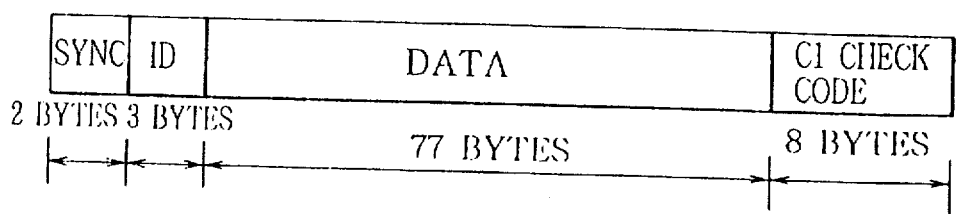
FIG. 47 is a diagram showing the configuration of one sync block complying with the SD specification.

According to the SD specification, as already described for the conventional case, one sync block comprises 90 bytes as shown in FIG. 47. The first 5 bytes are used for recording the sync pattern and ID signal, and the last 8 bytes are used for recording the error correction code (C1 check code), hence the remaining 77 bytes can be used for storing data as shown in the figure. Therefore, according to Embodiment A1, transport packets are detected from the bit stream, and two detected transport packets are converted to 5 sync block recording data as shown in FIG. 7B. In the figure, H1 denotes a first header and H2 denotes a second header. The first header H1 includes an identifying header indicating the number of each sync block within the group of 5 sync blocks. It also includes a flag identifying whether the data contained in the sync block in question is special playback data or normal playback data. The second header H2 contains identifying data, e.g. for identifying video data or audio data. The data recording area in one track comprises 149 sync blocks for recording video data, as shown in FIG. 5 as was described in connection with the prior art example. Three of the sync blocks are used as a VAUX data recording area, and 11 sync blocks are used as a data correction code recording area (C2 check code).

Next, the special playback recording area on the magnetic tape will be described with reference to FIG. 8 to FIG. 12. FIG. 9 shows the number of sync blocks that can be obtained from one track for each fast playback speed. In the figure, the 9000 rpm system corresponds to the head arrangement shown in FIG. 6A and FIG. 6B, while the 4500 rpm system corresponds to the head arrangement shown in FIG. 6C. The numbers in the figures show the number of sync blocks that can be reproduced from one track at each of the playback speeds in the special playback mode using a 10 μm rotary head (the track pitch in the SD specification is 10 μm). In the calculation, it has been assumed that there are 186 sync blocks per track (corresponding to 180 degrees), and that a part of the playback signal having an output level greater than −6 dB is obtained as effective data.

FIG. 10A shows the arrangement of special playback data recording areas within tracks according to Embodiment A1 taking account of the number of sync blocks for which data can be obtained as shown in FIG. 9. According to this recording format, every four successive tracks are made to form a group and an identical pattern of arrangement of the special playback data recording areas is repeated at an interval of four tracks, such that special playback data recording areas for each of the playback speed are provided every four tracks and one special playback data recording area for each of the playback speed is provided in each of the groups of four successive tracks. In the figure, a1 and a2 are special playback data recording areas for 2, 4 and −2 times speed, b1 and b2 are special playback data recording areas for 8 and −6 times speed, and c1 and c2 are special playback data recording areas for 16 and −14 times speed. The ATV signal is recorded in the remaining areas (referred to hereinafter as ATV data recording areas).

FIG. 10B shows data (and number of sync blocks) recorded in a special playback data recording area. In the figure, identical signals are recorded in areas having the same number. For instance, the data in "1" in a1 is also recorded in "1" in a2. The data in areas a1 and a2 is repeatedly recorded twice (over two groups of four successive tracks). The data in areas b1 and b2 is repeatedly recorded four times (over four groups of four successive tracks). With respect to the areas c1 and c2, special playback data (one error correction block) with the error correction code appended thereto is divided into four groups of five sync blocks as shown in FIG. 11, and the upper two blocks are recorded 8 times, the lower two blocks are recorded 8 times. The detailed arrangement of the special playback data recording area on the magnetic tape is shown in FIG. 12. In the figure, the same special playback data is recorded on areas having the same numbers or marks (A1, A1', B1, B1', C1, C1').

It will be seen each of A1, A1', A2, A2', and the like are repeated twice (over two groups of four successive tracks), B1, B1', B2, B2', and the like are repeated four times.

The special playback operation will now be briefly described with reference to FIG. 9. From FIG. 9, it is seen that whereas 62 sync blocks can be reproduced from one track at four times speed in a 9000 rpm system, only 31 sync blocks can be reproduced in a 4500 rpm system. In other words, in this recording format, in a 9000 rpm system, all the special playback data recorded on areas a1 (i.e. all signals on 1, 2, 3 and 4 shown in FIG. 10B including area marked ECC in the figure) can be reproduced. However, in the 4500 rpm system, as 9 sync blocks are not reproduced, a complete error correction block shown in FIG. 8 cannot be formed (i.e. a few sync blocks at the head of part of "1", and the last few sync blocks in part of "4" of FIG. 10B, are not reproduced). Therefore, the digital VTR shown in Embodiment A1 is designed so that supplementary data for the 4500 rpm system is recorded on the part a2. In a 4500 rpm system, one error correction block during special playback is formed using playback data from the adjacent rotary head 20b. This feature however is outside the scope of this invention and its details are therefore omitted.

The recording format will now be described. The ATV signal bit stream synthesized or combined into the sync blocks shown in FIG. 7B is recorded in the ATV signal recording area. The special playback data, on the other hand, is formed from intraframes (intra-encoded (intraframe-encoded or intrafield-encoded) data separated from the MPEG2 bit stream). According to Embodiment A1, special playback data is generated from different intraframes for each of predefined playback speeds. If the refresh time at 4, 8 and 16 times speed in the recording format shown in FIG. 10A and FIG. 10B (the refresh time being the minimum time in which the playback image is updated when a special playback image is formed using data recorded in the special playback area at the playback speeds) is 0.5 sec, the coding amount (amount of codes) of special playback images forming one frame is approximately 1.32 Mbit at 4 times speed, approximately 0.66 Mbit at 8 times speed and approximately 0.33 Mbit at 16 times speed. As a result, the quality of the playback image at each special playback speed is better than in the prior art example. In the following description it is assumed that the coding amount at each speed is as described above.

The method of configuring one error correction block of special playback data will next be described with reference to FIG. 7A, FIG. 7B and FIG. 8. One frame of the intra-encoded data separated from the bit stream is variable length decoded, and the data amount is reduced such that the coding amount of one frame is as described above. The data of the reduced data amount is reconstructed and header information is appended so as to form the transport packets shown in FIG. 7A. Two transport packets are grouped so as to form the recording data block shown in FIG. 7B. Three of these data blocks are grouped to form one error correction block, and after adding a C4 check code shown in FIG. 8, a C1 check code is appended.

In Embodiment A1, a (20, 15, 6) Reed-Solomon code is used for the C4 check code. According to Embodiment A1, one error correction block for special playback shown in FIG. 8 is formed during special playback, and error correction is applied to the playback data (C4 error correction is applied to data for which error correction was not achieved by means of C1 check code). The error detection probability is then of the order of $1.54 \times 10^{-13}$ when the symbol error rate is 0.01, and the error detection probability is improved by approximately $10^{10}$ times so that it is not a problem in practice. Undetected errors are of the order of $2.38 \times 10^{-16}$, which is also not a practical problem. As described in connection with the prior art example, the symbol error rate is often greater than 0.01, but from the calculated result for the error rate, there is no problem in practice with the code configuration and good image quality can be achieved in special playback.

The recording format according to Embodiment A1 will now be described. As stated above, from the bit stream for the input ATV signal, two transport packets are formed with 5 sync blocks. The ATV signal is recorded in the ATV data area (this area will be referred to as main area hereinafter, see FIG. 5), i.e., in an area other than the special playback data recording area, sync block by sync block.

The special playback data for various speeds comprising 20 sync blocks with the error correction code appended thereto are recorded in corresponding special playback data recording areas shown in FIG. 10A. As described above, the special playback data corresponding to various speeds are recorded a predetermined number of times. Specifically, for 4 times speed, the data is recorded twice as shown in FIG. 10B (for area a1, one error correction block is formed from the first 20 sync blocks, and another error correction block is formed from the last 20 sync blocks. In other words, the contents of the first error correction block and second error correction block are different). For 8 times speed, the playback data is recorded 4 times. For 16 times speed, one error correction block is divided into a first 10 sync blocks and a last 10 sync blocks as shown in FIG. 11. Then, after recording the first 10 sync block data 8 times, the last 10 sync block data is recorded 8 times.

Further, if the refresh time of the special playback data for each of the playback speeds is set to be 0.5 sec. as described above, the refresh of special playback data corresponding to the above speeds is performed at predetermined intervals, an intra-image is extracted from the input bit stream so as to update the special playback image every 2 seconds at 4 times speed, every 4 seconds at 8 times speed and every 8 seconds at 16 times speed. The refresh interval is however not limited to these values.

FIG. 12 shows the recording format according to Embodiment A1.

Next, the operation of the playback system of the digital VTR having the recording format will be described with reference to FIG. 1 to FIG. 3. During normal playback, data is read from the magnetic tape via the rotary heads 20a, 20b. After amplification by the head amplifier 21, signal detection is performed by the signal detector 22, and the data is converted to playback digital data. A sync signal appended to the head of each sync block is then detected. Playback digital data output by the signal detector 22 is subsequently digitally demodulated by the digital demodulator 23. The digitally demodulated data is input to the ID detector 24 and first error correction decoder 25.

In the ID detector 24, the ID signal appended to the head of the each sync block is separated based on the sync signal detected by the signal detector 22, and the error contained in the ID signal is detected using the error detection code appended to the ID signal. At the same time, in the first error correction decoder 25, errors occurring in the playback signal are corrected and detected using the C1 check code appended in the recording direction. The error corrected data is input to the second error correction decoder 26 and third error correction decoder 28.

In the second error correction decoder 26, a C2 check code (error correction code appended in a vertical direction of the video signal) is applied to data that was not corrected by the C1 check code (data for which errors were detected, or containing undetected errors), so as to perform error correction or detection (referred to hereinafter as C2 decoding). The C2 decoded data is input to the third memory 27. In the third memory 27, the ATV signal bit stream is separated from the input data, and only the bit stream is stored in the memory (special playback data is discarded at this stage as in the prior art example).

Concerning the data input to the third error correction decoder 28, the special playback data recorded in the special playback area is separated from the playback data so as to form the error correction block shown in FIG. 8. To separate the special playback data, the position of the special playback data recording area on the track is detected from the sync block number recorded in the ID signal in the sync blocks, and by detecting the header of the sync blocks, it is determined whether or not the data is special playback data or a normal ATV signal bit stream.

When the error correction block is formed, in the third error correction decoder 28, error correction or detection is performed by applying a C4 check code (error correction code appended in the vertical direction) to special playback data that has not been corrected by the C1 check code (data for which errors have been detected and data which contains undetected errors). The C4 decoded data is input to the fourth memory 29. The details of operation of the third error decoder 28 will be described when describing fast playback operation.

According to Embodiment A1, the minimum distance of the C4 check code for special playback data and the minimum distance of the C3 check code for audio data are designed to be the same. This is due to the fact that the audio signal is transmitted together with digital video data in the ATV signal bit stream as described in the prior art example, and it is therefore recorded together with the video signal in the video signal area instead of being recorded in the audio signal area. This means that an error correction decoder for the audio signal is not used during playback of an ATV signal. According to Embodiment A1, by making the minimum distance of the C4 check code and C3 check code the same, the error correction decoder 28 can be used also as an error correction decoder for the audio signal so that circuit size is reduced.

The input error corrected special playback is stored in the fourth memory 29. During normal playback, the switch 32 always selects the output of the third memory 27, and the ATV bit stream having been restored to 188 byte packet information in the third memory 27 is output via the output terminal 33.

Next, the still mode will be described. Still playback may be divided into two cases, i.e. a transition to still mode during normal playback, and selection of still mode from the stop state. First, transition to still mode from normal playback will be described. When still mode is selected during normal playback, reproduction of data stops and no new data is input to the third memory 27 and fourth memory 29. When the still mode signal is input, therefore, the end of frame data of playback data in the ATV signal is detected from the playback signal in the third memory 27. This can be an intraframe or predicted frame. When the end of frame data is detected, the third memory 27 outputs a frame data detection signal to a still image packet generator 30. According to Embodiment A1, this end of frame data is detected from the output of the third memory 27.

When a frame data end detection signal is input, The still image packet generator 30 generates a transport packet indicating a still image is to be produced.

Before describing the operation of this embodiment, the coding system for image data specified by MPEG2 (method of configuring video packets) will briefly be described. In MPEG2 (ATV signals use the same coding system as MPEG2), input image data of respective fields or frames are transmitted in combination of intra-encoded (intra-frame or intra-field encoded) data and inter-encoded (inter-frame or inter-field encoded, i.e., or motion compensated predicted) data.

The data in each frame or field divided into blocks of 8 lines×8 pels (referred to hereinafter as DCT blocks) shown in FIG. 4A. In MPEG2, high efficiency coding is applied taking each of these blocks as a unit. In the high efficiency coding of intraframe (or intrafield) data, a discrete cosine transformation (referred to hereinafter as DCT) is applied to the DCT blocks. With regard to coefficients obtained after the DCT (referred to hereinafter as "sequence"), the power spectrum is concentrated in the lower frequency region, so that this sequence is sequentially transmitted from the data in lower frequency region in a zig-zag scanning, illustrated in FIG. 4C. In the figure, the sequence on the upper left which is transmitted first is known as the lower frequency region sequence, while that on the lower right which is transmitted later is known as the higher frequency region sequence.

A plurality of the aforesaid neighboring DCT blocks are grouped to form a macroblock. For interframe (or interfield) data, motion vectors are detected and coding is performed for each of these macroblocks. Several constructions of these macroblocks are defined according to MPEG2. In the case of an ATV signal, the construction is as shown in FIG. 4B. As illustrated, each macroblock in an ATV signal is formed of four adjacent DCT blocks for the luminance signal (denoted by Y0–Y3 in the figure) each comprising 16 lines×16 pels, and two DCT blocks of 8 lines×8 pels for the color-difference signals at the same position on the screen (referred to by CR, CB in the figure).

The image data is transmitted in the form of 4:2:0.

A plurality of the aforesaid macroblocks are grouped together to form a slice. According to MPEG2, several conditions must be satisfied to configure a slice. Some of these conditions are shown below (for details, refer to the specification of MPEG2). A slice can be any string of macroblocks, there being no restriction on the number of macroblocks contained in the string. The slice must contain at least one macroblock, and the first and last macroblock in the slice cannot be skipped. The first and last macroblocks belong to the same horizontal row of macroblocks (referred to hereinafter as identical macroblock row). The position of the slice may vary from one screen to another. The slice begins on the upper left of the screen, and must appear in the bit sequence running from left to right and from top to bottom in raster.

Next, the method of transmitting one frame of video packets will be described. A picture header is appended to the top of each frame, and image coding information is appended thereto (specifically, information indicating intra-coding or interceding, and a quantization table, and the like). Following the picture header, one frame of image data is transmitted. This frame of image data comprises a plurality of the aforesaid slices, and an address indicating the slice row direction (slice start code) is appended to the slice header. A macroblock address is appended to the head of each macroblock in the slice, and the presence or absence of a macroblock skip is judged from the continuity of the macroblock. This macroblock skip will be described later.

For the macroblock address defined by MPEG2, a relative address for the immediately preceding macroblock in the row direction is transmitted.

The contents of the transport packet indicating "still image" output by the still image packet generator 30 will now be described. Specifically, according to Embodiment A1, a plurality of blocks (having data with zero motion vector, and hence zero prediction error signal) are grouped to form slice data, and on such a slice or a plurality of such slices in combination form a transport packet. Hereinafter, this transport packet is described as a still image packet. The still image packet generator 30 generates still image packets and packets indicating no data so that these two types of packets in combination fit the frame period in the ATV decoder.

In an example, a transport packet is formed from one or a plurality of slices consisting only of macroblocks having zero motion vector, and the data in the DCT blocks in the macroblock is all zero (that is, the DC data is all zero, and the AC data consists only of EOB (end of blocks)). A no-data packet is a packet defined by the ATV bit stream which signifies that the transmitted information has no meaning. If a no-data packet is defined by a transport header, all the data in the following transport packets is ignored during decoding in the ATV decoder. The still image packet generator 30 always generates still image information, and switches its output by information which is appended to a predetermined position of a transport header and indicates whether or not a transport packet is a still image packet and is a no-data packet. This enables reduction in the size of the circuit 30.

When a still mode signal is input, the switch 31 selects the output of the still image packet generator 30. The switch 32 is controlled such that the output of the switch 31 is selected based on the end signal of the ATV signal frame data output by the third memory 27. According to Embodiment A1, the end of the frame data was detected from the output data of the third memory 27. But this invention is not limited to this arrangement. For example, the same effect may be achieved by detecting the input of the third memory 27, introducing a predetermined delay, and controlling the still image packet generator 30 and switch 32. It is of course also possible to change over the data at a timing at which the last packet in the intraframe is detected (this is effective, as image quality is slightly better when the still image is formed from intraframe than from interframe data).

Next, the case of selecting still mode from the stop state will be described. In the stop state, correct data is not transmitted to the ATV receiver (decoder), so if the still mode is selected in this state, the tape is first played for a short time, and after one screen of data has been sent to the ATV receiver, the switches 31, 32 and still image packet generator 30 are then controlled and the tape is stopped in the same way as described above. Here, control is performed so that in the third memory 27, the end position of intraframe data is detected, and the end signal of the frame data is output. This is because even if an interframe end signal is detected, only motion vectors and prediction error components are transmitted, so the playback image cannot be formed.

According to Embodiment A1, the ATV signal used for normal playback was used also as data for still playback. But the same effect is achieved by performing the same control using the special playback data stored in the fourth memory 29. In such a case, when the still mode is input, the switch 32 selects the output of the switch 31, and the switch 31 selects the output of the still image packet generator 30 after detecting the end of frame data output by the fourth memory 29. In particular, a good still image can be obtained using the special playback data when an error is detected in the ATV signal used for normal playback. According to Embodiment A1, the construction is such that during still playback, transport packet data played back from the special playback data recording areas used for 2, 4 and −2 times speed, which have the greatest amount of recording data and yield the highest picture quality, are output. Therefore, as during normal playback only the data used for still playback need be decoded, only the data from the special playback data recording area used for 2, 4 and −2 times speed playback need be decoded in the third error correction decoder 28. Due to this construction, still playback can be achieved by a simple circuit without the ATV decoder having to recognize the still playback mode. Moreover, when an error is detected in a playback signal, the data recorded in the special playback data recording area is used to realize a good still playback. According to Embodiment A1, due to the construction, the capacity of the third memory 27 can be reduced to about 4 tracks×2. In the prior art, the memory capacity of one frame intraframe was required.

Figure 13:
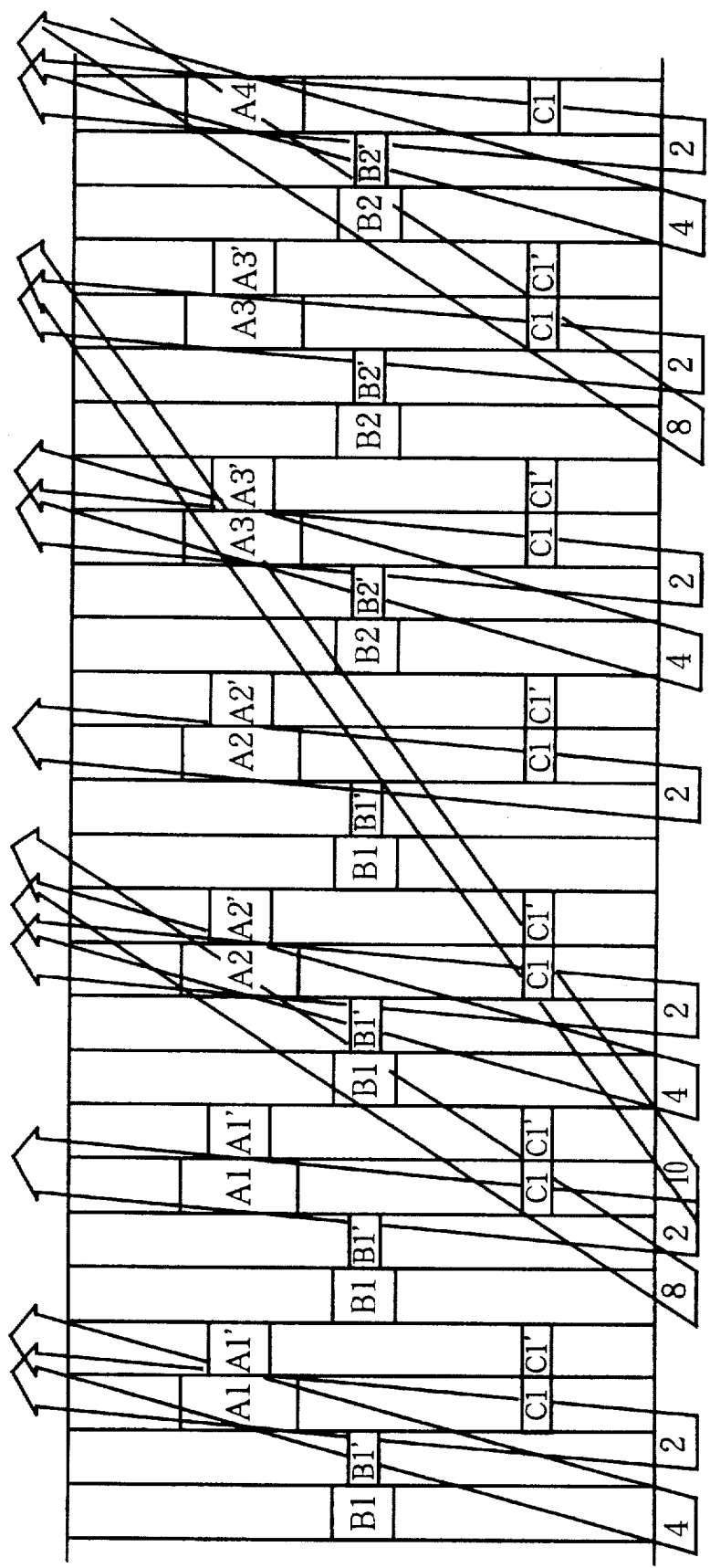
FIG. 13 is a diagram of head scanning traces of the rotary head 20a at 2, 4, 6, 8 and 16 times speed fast playback.
Figure 14A:
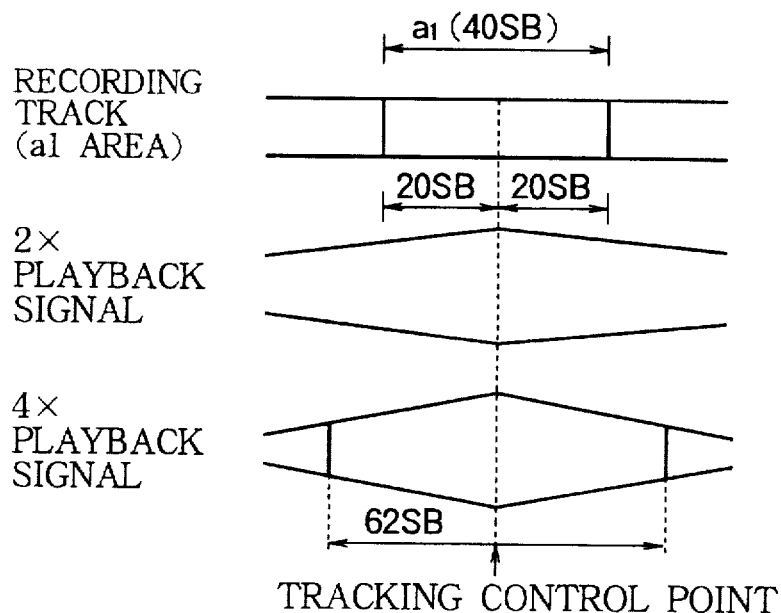
FIG. 14A to FIG. 14C are diagrams for explaining the tracking control operation.
Figure 14B:
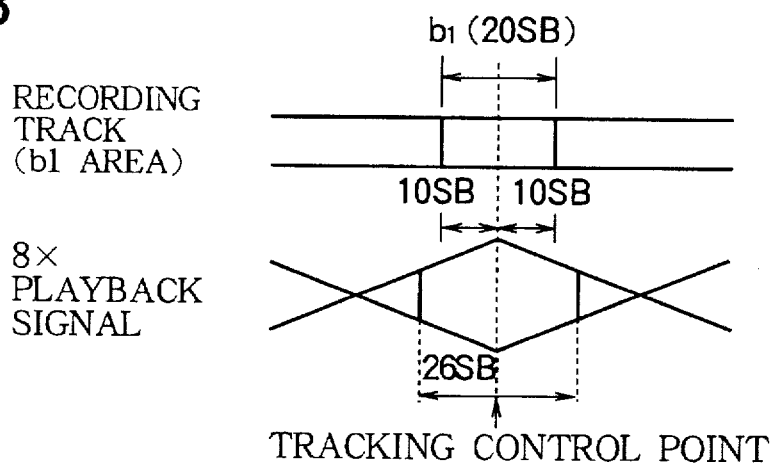
Figure 14C:
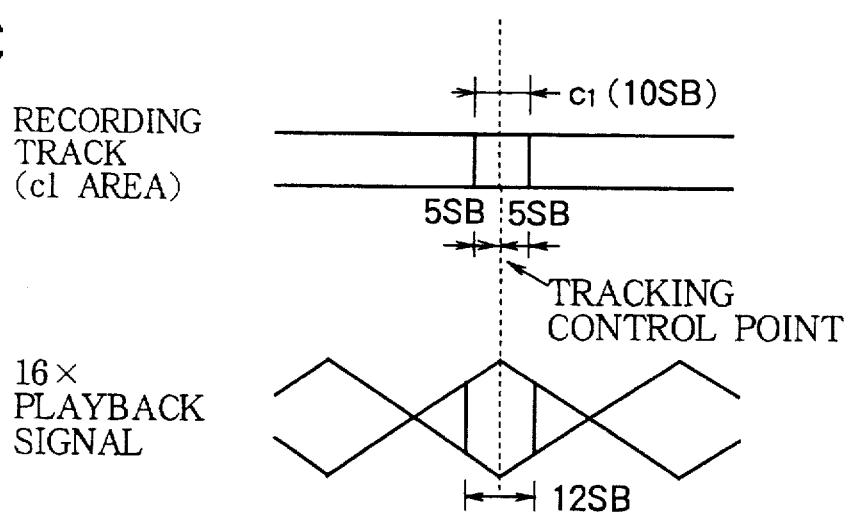

Next, fast playback operation will be described. Description will be made of the case of the rotary head shown in FIG. 6A. FIG. 13 is a scanning trace of the rotary head 20a when the tape is read at 2, 4, 8, and 16 times speed. The scanning trace of the rotary head 20a shown in FIG. 13 is the same as that followed by the rotary head construction shown in FIG. 6B. The scanning trace of the rotary head 20b is completely different as the head position is different. FIG. 14A to FIG. 14C are diagrams for explaining the tracking control of the digital VTR of Embodiment A1. First, the tracking control system for fast playback according to Embodiment A1 will be described with reference to FIG. 13 and FIG. 14A to FIG. 14C. During fast playback, data is reproduced intermittently, as described above. The number of sync blocks that can be reproduced from one track at various playback speeds is as shown in FIG. 9.

To obtain special playback data effectively, the tracking of the head 20a should be controlled so that the playback output is maximized in the center of the area in which special playback data is recorded at each speed. FIG. 14A to FIG. 14C show the tracking control points of the rotary head 20a at each speed. In the recording format of Embodiment A1, in a 9000 rpm system, error correction block data shown in FIG. 8 can be formed even if the data reproduced by the rotary head 20b is not used, so the scanning trace of the rotary head 20b has been omitted in FIG. 13.

Fast playback will now be described in view of the above with reference to FIG. 1 to FIG. 3, FIG. 13 and FIG. 14. When the fast playback mode signal is input, the switch 32 selects the output of the switch 31 (the detailed timing of the switch change-over will be described hereinafter). Playback data reproduced intermittently via the rotary heads 20a, 20b is amplified by the head amplifier 21, converted to playback digital data by the signal detector 22, and then digitally demodulated by the digital demodulator 23. Data with the correct sync signal correctly detected by the signal detector 22 is input to the ID detector 24 and first error correction decoder 25. The ID detector 24 separates the ID signal appended to the head of each sync block according to the sync signal detected by the signal detector 22, and detects errors in the ID signal using an error detection code appended to the ID signal.

Figure 15:
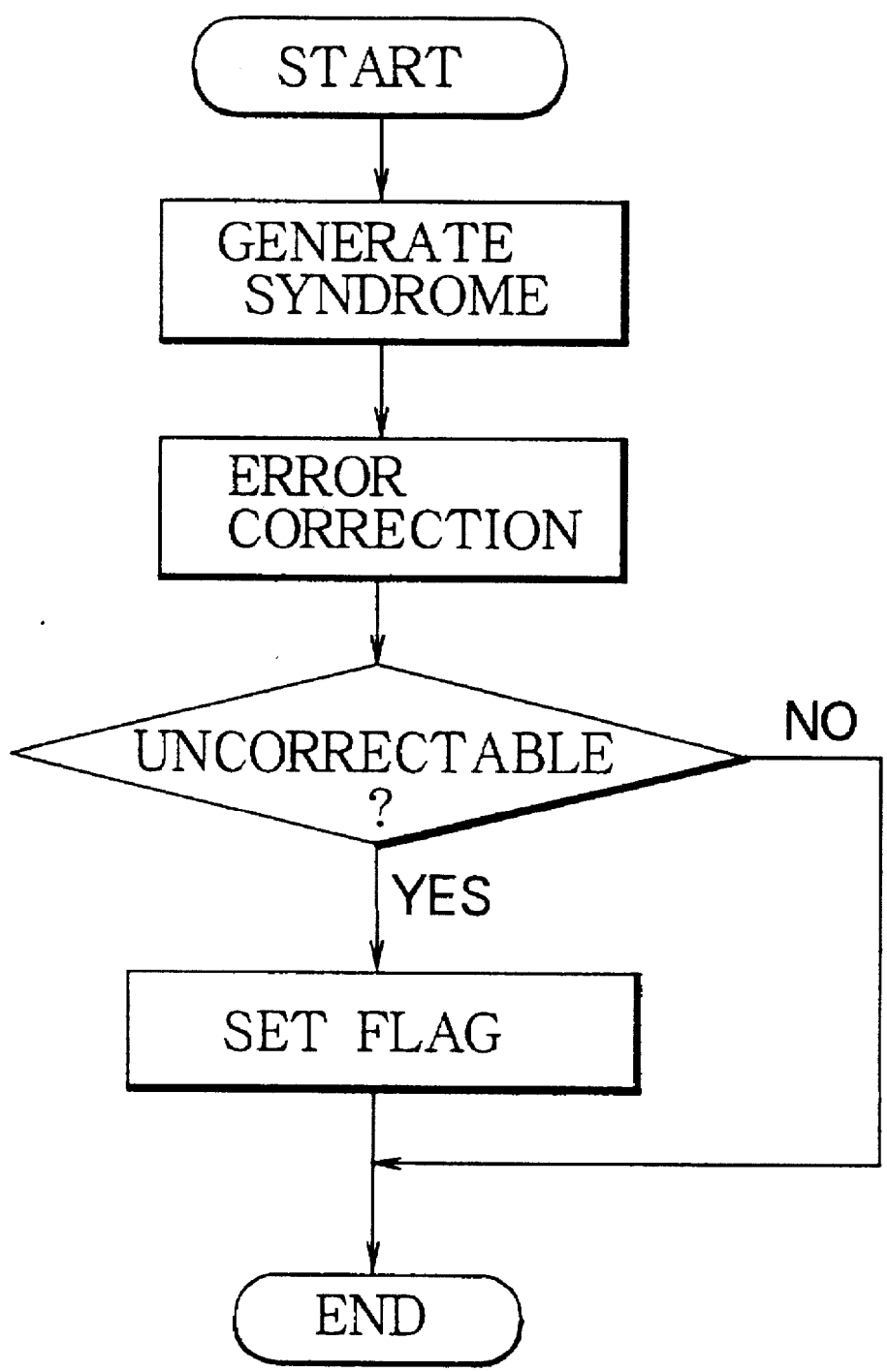
FIG. 15 is a flowchart illustrating a general C1 decoding algorithm.
Figure 16:
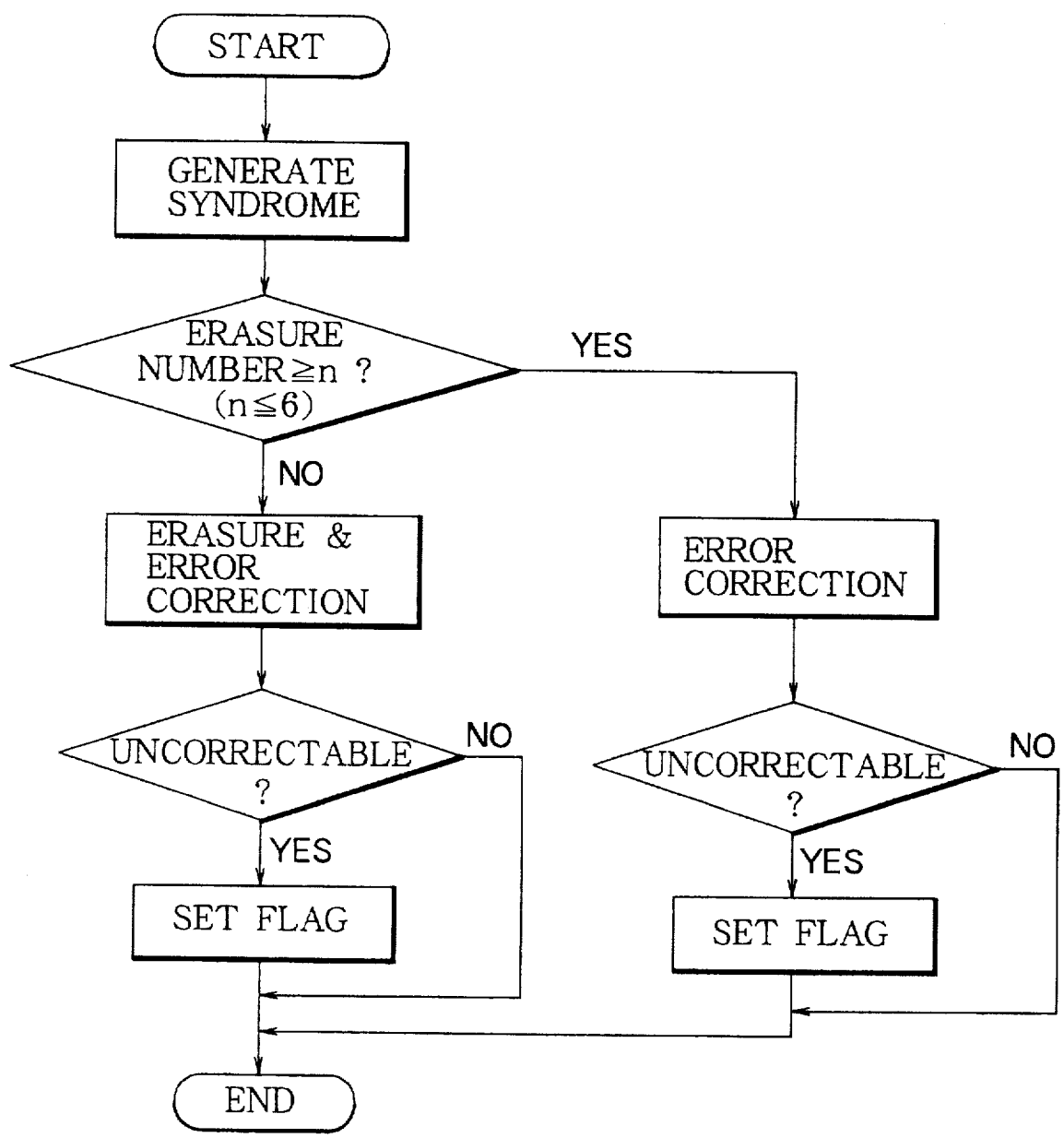
FIG. 16 is a flowchart illustrating a general C4 decoding algorithm.

The first error correction decoder 25 performs correction and detection of errors in the playback signal using the C1 check code appended in the recording direction (C1 decoding). The error corrected data is input to the third error correction decoder 28. The output of the first error correction decoder 25 is also input to the second error correction decoder 26, but as the data is reproduced intermittently, C2 decoding cannot be performed, and as transport packets cannot be generated, C2 decoding operation is not performed during fast playback according to Embodiment A1. Before describing the action of the third error correction decoder 28, a brief description will be given of a general error correction decoding algorithm of an error correction code in the product coding system shown in FIG. 8 or FIG. 46A and FIG. 46B. FIG. 15 shows a general C1 decoding algorithm used in a digital VTR, and FIG. 16 shows a general C4 decoding algorithm used in a digital VTR. In general, with C2 decoding and C3 decoding, decoding is performed with the same algorithm as for C4 decoding shown in FIG. 16 although the minimum distance and coding length are different.

When data is reproduced, errors in the playback signal are first corrected using the C1 check code up to the error correcting capability limit of C1 check code. FIG. 15 shows the C1 decoding algorithm. First, when C1 decoding begins, a syndrome is generated using data output by the digital demodulator 23. After the syndrome generation, the positions and values of errors are calculated using the syndrome. If, as a result of this calculation, there are no more than 4 errors, error correction is performed. If it is determined that there are more than 4 errors, an error detection flag is output (hereinafter, this error detection flag will be referred to as an erasure flag). According to Embodiment A1, the minimum distance of the C1 check code is 9, so correction is performed up to a maximum of 4 errors.

Errors which were not corrected by the C1 check code are corrected by the C4 check code. According to Embodiment A1, in error correction by C4 check code, erasure correction is performed on errors detected by the C1 check code, and error correction is performed on errors undetected by the C1 check code. C4 decoding will now be described based on the decoding algorithm shown in FIG. 16.

When the error correction block data is formed in the memory 40, a syndrome is first generated using the input data, and the number of erasures is counted based on the erasure flag detected by the C1 check code. If the number of erasures is not more than the error correcting capability of the C4 check code, (according to this example, the minimum distance of C4 check code is 6, so up to 5 erasures can be corrected), a modified syndrome is generated based on the aforementioned syndrome, and erasure correction is performed on errors detected by the C1 check code. The method of erasure correction differs depending on the decoding algorithm, so if an algorithm other than Euclidean decoding is used, erasure correction is performed by other methods depending on the syndrome and erasure position, without generating the modified syndrome. Error correction is performed also on errors undetected by C1 check code up to the error correcting capability limit. If on the other hand, the number of erasures detected by C1 check code exceeds the error correcting capability, error correction is performed up to the error correcting capability limit of C4 check code (a maximum of 2 errors are corrected) without generating a modified syndrome. Error correction is possible as there is a high probability that errors detected by C1 are false erasures (i.e. the values are detected as erroneous by C1 check code, but are actually correct).

Figure 42:
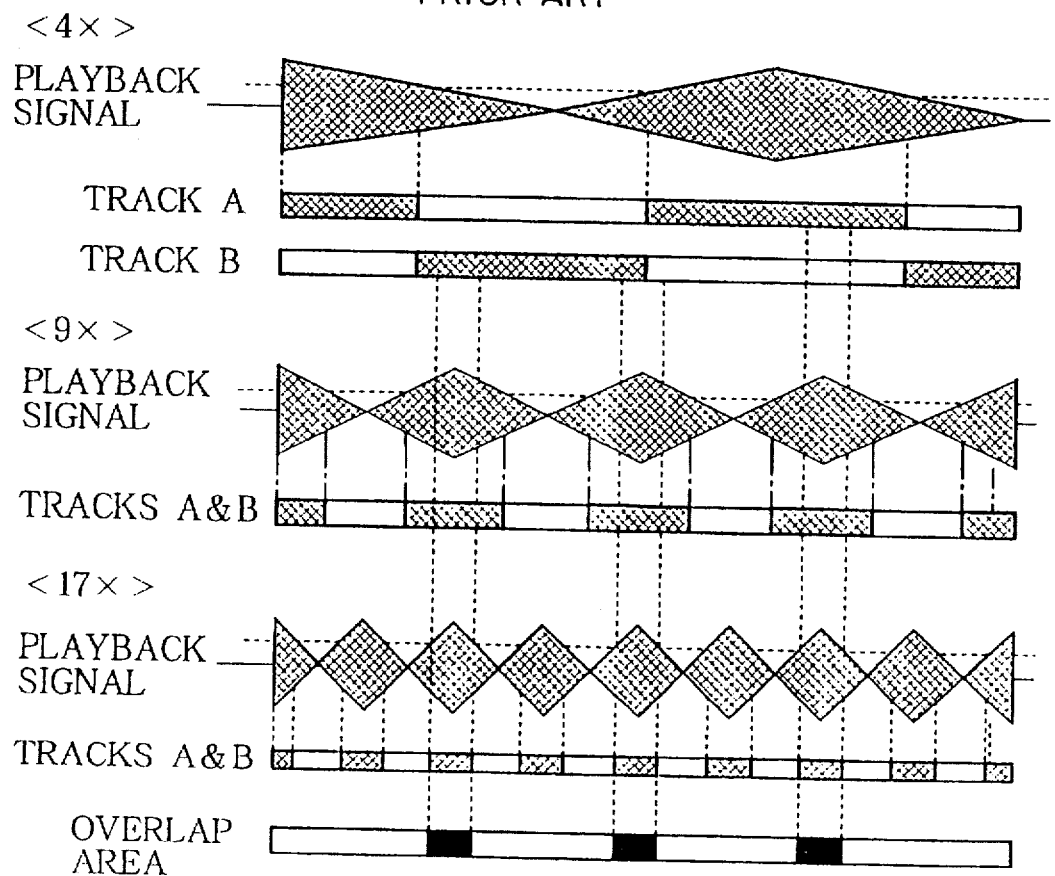
FIG. 42 is a diagram illustrating overlapping areas at a plurality of fast playback speeds.
Figure 43:
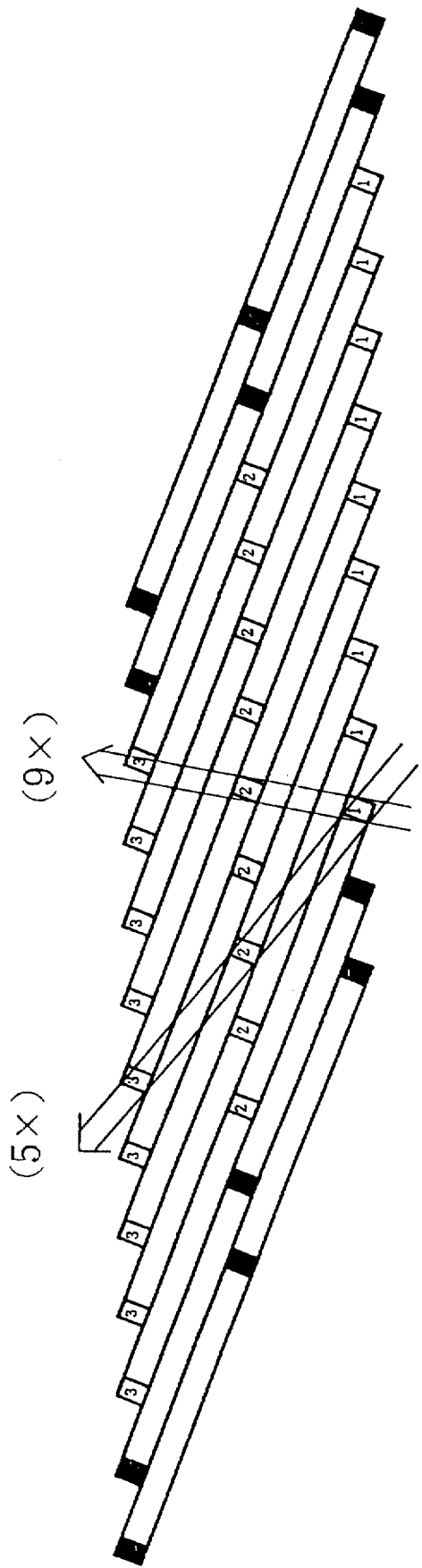
FIG. 43 shows head scanning traces at 5 times speed and 9 times speed.

Problems of error correction and detection will now be described in connection with fast playback, with which the problems are more evident, will now be described with reference to FIG. 15 and FIG. 16. As shown in FIG. 42, in fast playback, playback data is reproduced intermittently. First, C1 decoding is applied to the reproduced data according to the decoding algorithm shown in FIG. 15 by the first error correction decoder 25.

At the same time, the ID detector 24 detects an ID signal based on the result of detection of a sync signal output by the signal detector 22, and errors in the ID signal are using an error detection code appended to the ID signal. Special playback data is then separated using this detected ID signal so as to configure the error correction block shown in FIG. 8. Specifically, a write address in the memory 40 is created based on the track number and sync block (C1 block) number appended to the ID signal.

When error correction is performed on data to which error correction codes are appended in two or more different directions including the recording direction, as shown in FIG. 8, and error correction is performed in a direction other than the recording direction, one error correction block of data must first be stored in a storage device such as a memory, and the data is read in a different direction (direction corresponding to the above-mentioned direction other than the recording direction) to perform the correction. In this case, if an error is detected in the ID signal, C1 block data (hereinafter, in describing error correction, one sync block will be referred to as a C1 block) is not written in the memory 40 in the third error correction decoder 28. This is because, when data reproduced intermittently is combined or synthesized to form one error correction block, continuity of the ID signal is not guaranteed, unlike during normal playback. Also, when it is attempted to generate a C1 block data for which an error has been detected in the ID signal, by estimating an address using ID data for the preceding C1 block, the data written in the memory 40 in the preceding scanning period would be overwritten leaving incorrect data in the memory 40.

Hence, under the above conditions, C4 decoding is performed on the error correction block (shown in FIG. 8) configured in the memory 40 is C4 decoded based on the decoding algorithm shown in FIG. 16. An error detection flag detected by the C4 or C1 check code is appended to the data corrected and detected by C4 check code, and an effective digital video signal excluding error correction codes is read from the memory 40.

During fast playback, writing of data in the memory 40 is controlled as described above, and data for which errors have been detected by the error detection code in the ID signal is not written in the memory 40. When an error correction block is configured, therefore, there will be C1 blocks which are not written in the memory 40 because ID errors are detected. At that time, the address (memory location) which stores the C1 block stores error corrected data updated on the immediately preceding occasion or the occasion before that. When error correction is applied to this error correction block, the C1 block data is not updated, so it is determined that there are no errors after the error correction by C1 check code, even though all the data in the block is incorrect. This occurs because the C1 code error detection flag is reset. Further, even if C1 decoding is again performed on C1 block data that has not been updated in the memory 40, errors cannot be detected as error correction is performed on the immediately preceding occasion or the occasion before that. When error correction is applied by the C4 check code to this C1 block data, these errors will be errors undetected by C1 check code (this phenomenon is especially marked when performing control over, for example, writing of C1 block data based on the ID information in the memory 40 and C1 decoding of the written C1 block data).

As described above, if a C4 error correction is applied when there are errors undetected by C1 check code, either C4 check code cannot be used to its maximum effect or more errors undetected by C4 decoding (including error corrections) occur, so that there is a serious impact on playback image quality. In particular, in the case of the home digital VTR described above, as image signals are high efficiency coded during recording, an undetected error of one symbol is propagated to a plurality of DCT blocks leading to an impairment of the image. Errors in the playback data therefore have to be corrected or detected without fail.

Figure 17:
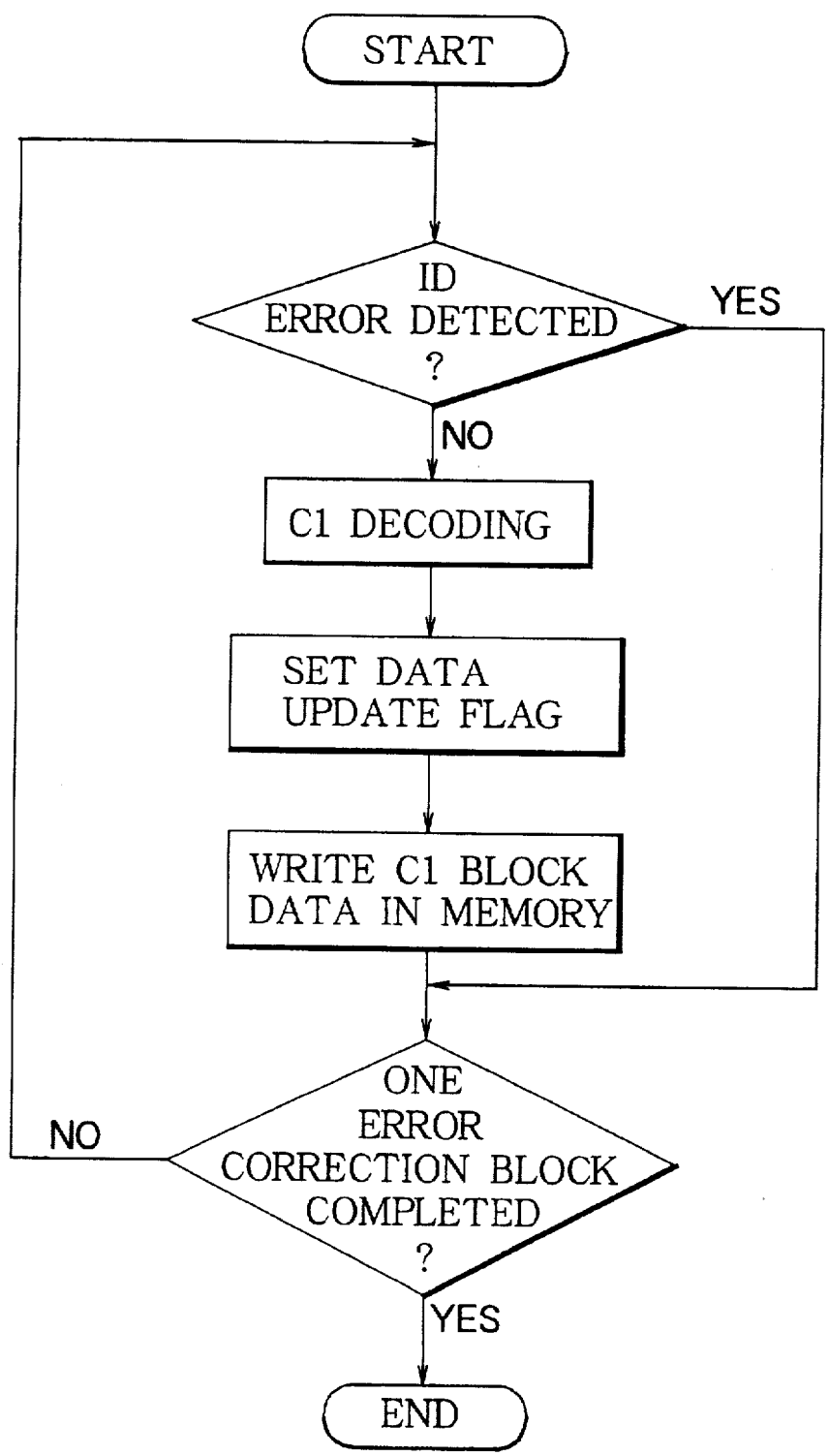
FIG. 17 is a flowchart illustrating the algorithm for appending a data update flag.
Figure 18:
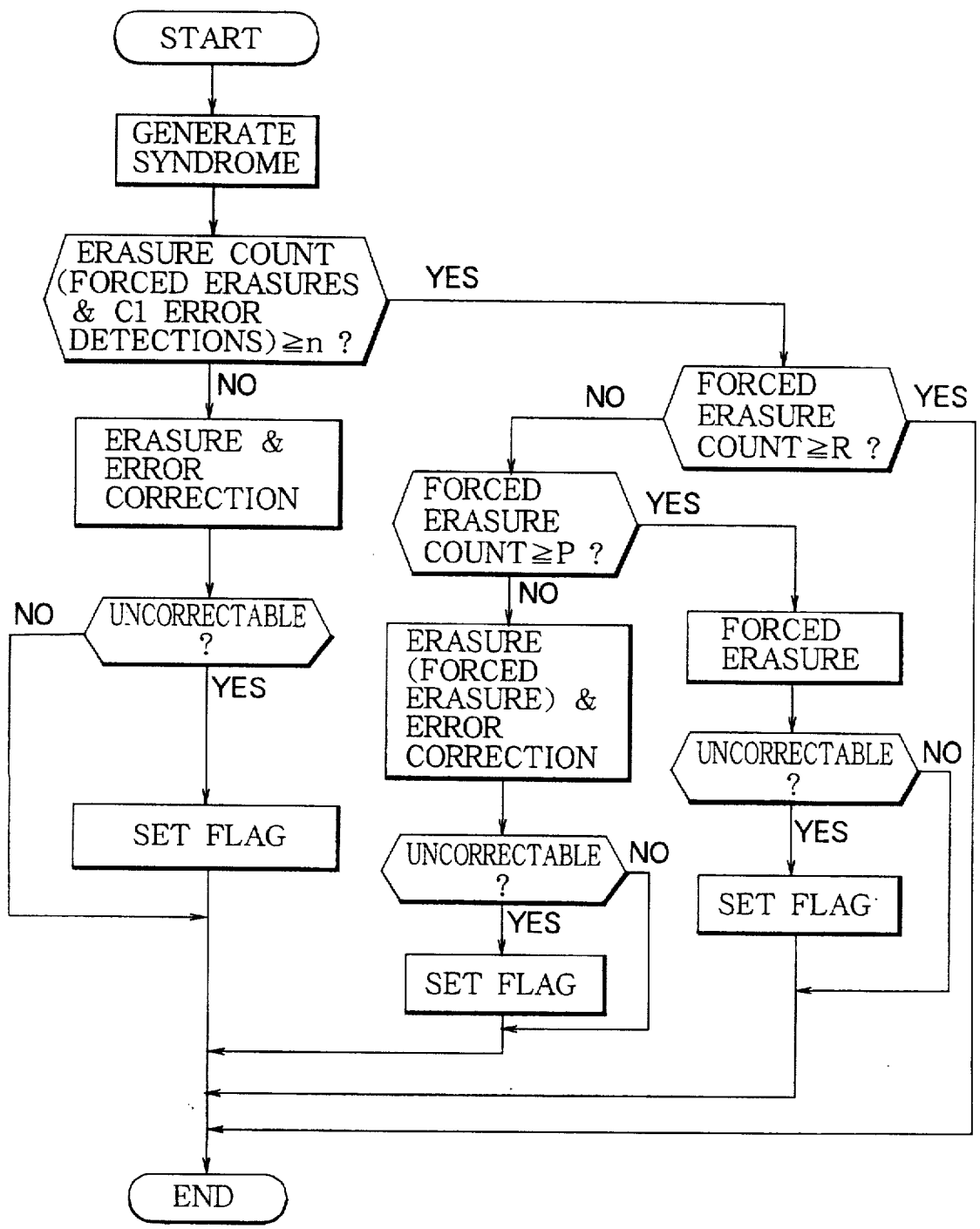
FIG. 18 is a flowchart illustrating a C4 decoding algorithm.

Taking account of the considerations, the decoding algorithm of the error correction code according to Embodiment A1 will next be described with reference to FIG. 17 and FIG. 18. FIG. 17 shows the algorithm used when setting a data update flag according to Embodiment A1. FIG. 18 shows an error correction decoding (C4 decoding) algorithm using an error correction code in a different direction from the recording direction according to Embodiment A1 (perpendicular in this example). The C1 decoding algorithm is also the same as that shown in FIG. 15.

First, the data update flag algorithm according to Embodiment A1 will be described with reference to FIG. 17. An ID signal is first separated from the C1 block data intermittently reproduced by the rotary heads 20. Error detection is then performed on the separated ID signal using an error correction code appended during recording. For C1 block data having an ID signal which has been found not to have any errors by error detection, C1 decoding is performed by the first error correction decoder 25, and then data from the special playback data area is separated based on a track number and line number separated from the ID signal, and written in a predetermined address in the memory 40. When C1 block data is written in the memory 40, the data update flag is written in a predetermined address in the data update flag memory 41 (address separated from ID signal). According to Embodiment A1, with regard to updated C1 blocks, "0" is written in the data update flag memory 41 as update information (FIG. 17). When decoding of one error correction block is complete (C1 and C4 decoding), the data update which information in the memory is reset so that all the data will be unupated data (i.e. all "1"s are written in the memory).

C1 decoding based on the C1 decoding algorithm shown in FIG. 15 is applied in the first error correction decoder 25 to C1 block data for which it has been determined in the ID detector 24 that there are no errors in the ID signal (the C1 decoding operation is the same as the above, so its description will be omitted here). In a manner similar to that described above, the C1 decoded data is input to the third error correction decoder 28. The third error correction decoder 28 controls writing of the C1 block data in the memory 40 based on the error detection result for the ID signal output by the ID detector 24.

The method of control over the memory 40 and data update flag memory 41 will now briefly be described. The ID signal and error detection result output by the ID detector 24 are input to an error correction controller 44. The error correction controller 44 generates, for C1 block data where no error in the ID signal was detected, a write signal and write timing signal for writing the C1 block data and a data update flag in the memory 40 and data update flag memory 41, based on track number information and sync block number information appended to the ID signal (the control signal for the data update flag memory 41 is generated by an update flag memory controller 42 based on the write timing signal generated by the error correction controller 44 and on ID information). The C1 block data is written in a predetermined address in the memory 40 based on a write control signal generated by the error correction controller 44, and using the information detected from the ID signal. Likewise, the data update flag ("0" as described above) is stored in the data update flag memory 41. An error detection flag detected during C1 decoding is also stored at a predetermined address of a C1 error detection flag memory 53 to be described hereinafter.

For C1 block data having the ID signal for which an error is detected, on the other hand, the data is not written in the memory 40 and is discarded. Setting of the flags in the data update flag memory 41 and C1 error detection flag memory 53 does not take place. With regard to data for which errors are detected as a result of C1 decoding, the error detection flag is stored at a predetermined address of the C1 error detection flag memory 53 in the error correction circuit 43 based on the ID information. According to Embodiment A1, data for which errors are detected during C1 decoding is also written in the memory 40.

When one error correction block of data to which C1 decoding has been applied in the manner described above is synthesized in the memory 40, the error correction controller 44 supplies a data update flag read start signal to the update flag memory controller 42. Subsequently, when the data update flag read control signal is input, the update flag memory controller 42 progressively read data starting from the head of the data update flag memory 41. The data update flag read out from the data update flag memory 41 is stored in the forced erasure flag memory 52, and the number of flags that are not yet updated (number of forced erasure flags) is counted. The number of error detection flags by means of the C1 check code is also counted during C1 decoding. Hereinafter, flag information in C1 blocks not yet updated will be referred to as forced erasure flags in order to distinguish them from erasure flags showing errors detected by the C1 check code.

Figure 19A:
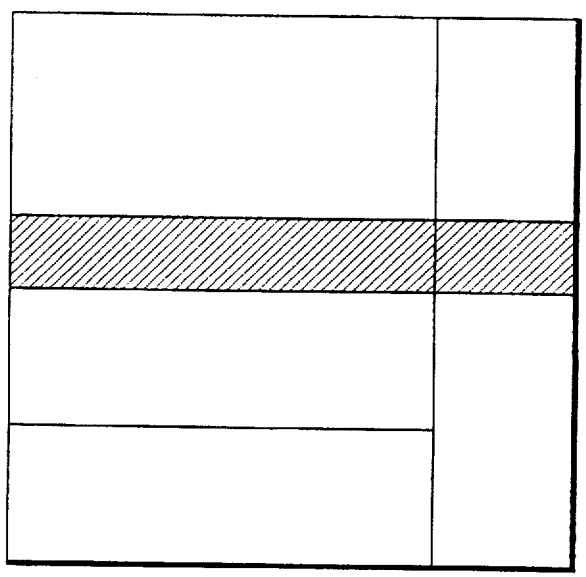
FIG. 19A to FIG. 19C are diagrams for explaining the the C4 decoding algorithm.
Figure 19B:
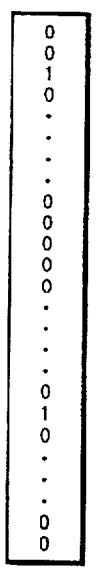
Figure 19C:
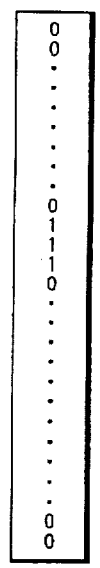

FIG. 19A to FIG. 19C are diagrams for explaining an example of the C4 decoding algorithm. Specifically, the method of counting the number of erasures will be described taking the illustrated error correction block as an example. In the case shown in FIG. 19B and FIG. 19C, there are two blocks containing an error detected by C1 decoding and three blocks containing a forced erasure, so a total of 5 blocks is counted as the number of erasure flags. Where an error detection flag is set in a C1 block for which a forced erasure flag has been set, the number of erasures is counted taking it that an error has been detected in one C1 block.

Next, the number of erasures is compared with a predetermined number n (according to Embodiment A1, n=6). If it is equal to or greater than n (according to Embodiment A1, as in the prior art, erasure correction by C4 decoding is performed up to the error correcting capability limit of C4 check code, and erasure corrections are made up to 5 erasures). The number of forced erasures is compared with a predetermined number R (according to Embodiment A1, R=6), and if it is equal to or greater than R, C4 decoding is not performed and the error correction operation ends.

This is because, as all the data in a C1 block with a forced erasure flag being set is erroneous, error correction cannot be performed if the number of forced erasures exceeds the error correcting capability limit of C4 check code (up to two errors can be corrected), even if the erasure flags are ignored during C4 decoding as shown in FIG. 16. If error correction by C4 check code is still attempted, as an error correction flag is appended to all blocks, data which has been error corrected by C1 decoding may be output as being erroneous, and in addition erroneous correction may be induced. According to Embodiment A1, therefore, when the number of forced erasures is equal to or greater than R, the error correction process is forcibly terminated.

On the other hand, if the number of forced erasures is less than R (number of erasure flags is equal to or greater than n), C4 decoding is performed according to the algorithm shown in FIG. 18 (according to Embodiment A1, forced erasure is error-corrected, being taken as erasures, as shown in FIG. 18). Likewise, even if the number of erasures is less than n, error correction is performed by C4 check code as shown in FIG. 18. The details of error correction by the C4 check code will be given hereinafter.

When C4 decoding of one error correction block is complete, the update flag memory controller 42 resets the data update flag in the data update flag memory 41, or more specifically, a "1" is written at a predetermined address in the memory 41. After the resetting of the memory 41 is complete, an error detection flag is generated using the error detection flag by means of C1 check code, error detection flag by means of C4 check code and forced erasure flag, and the error correction process of one error correction block is thereby terminated. The reset timing of the data update flag memory 41 and the set timing of the error detection flag are however not limited to the timings. Further, resetting of the C4 error detection flag memory 54, the C1 error detecting flag memory 53 and the forced erasure flag memory 52 in the error correction circuit 43 is performed after setting of the error detection flag.

The operation of the playback system during fast playback using the decoding algorithms shown in FIG. 17 and FIG. 18 will now be described with reference to FIG. 1 to FIG. 3, FIG. 17 and FIG. 18, in the light of the preceding discussion. As stated above, when a fast playback mode signal is input, the switch 32 selects the output of the switch 31. Data reproduced intermittently via the rotary heads 20a, 20b is amplified by the head amplifier 21 and converted to playback digital data by the signal detector 22, after which digital demodulation is performed by the digital demodulator 23. The signal detector 22 also detects the sync signal. Data for which the sync signal is correctly detected by the signal detector 22 is input to the ID detector 24 and first error correction decoder 25. The ID detector 24 separates the ID signal from the playback data using this sync signal, and detects errors in the ID signal by means of an error correction code appended to the ID signal.

The first error correction decoder 25 performs C1 decoding based on ID error information (presence or absence of errors in the ID signal) output by the ID detector 24. According to Embodiment A1, with regard to C1 blocks for which an ID error was detected (C1 blocks with an ID signal for which an error was detected), C1 decoding is not performed. (According to Embodiment A1, C1 decoding is not performed for data of C1 blocks for which an ID error is detected during fast playback. This is because during fast playback, the head cuts across a plurality of tracks, and the playback C1 block period may be discontinuous at the time of a track jump, so that control may be disrupted. To prevent this, C1 decoding is not performed for C1 blocks of data having an ID error. It will be understood that C1 decoding may be performed on blocks for which ID errors have been detected if a protective circuit is added). With regard to C1 blocks of data for which an ID error was not detected, C1 decoding is performed based on the decoding algorithm shown in FIG. 15. C1 decoded data is input to the third error correction decoder 28. Incidentally, C2 decoding is not performed during fast playback.

A brief description will now be given of how C1 decoded C1 block data and the data update flag are written in the memory 40 and the data update flag memory 41 with reference to FIG. 17. C1 block data detected for which an ID error has been detected in the ID detector 24 is not written in the memory 40 as described above. The memory 40 and data update flag memory 41 are therefore placed on stand-by state until the next sync signal is detected.

When it is detected that there is no ID error by the ID detector 24, the update flag memory controller 42 sets a data update flag in a predetermined address of the data update flag memory 41 in accordance with the ID signal (track number and C1 block number). (According to this embodiment, "0" is written in the data update flag memory 41.) At the same time, the error correction controller 44 generates a write address for the memory 40 based on the ID signal, and writes C1 decoded C1 block data in the memory 40, at the memory location designated by the write address. The above process is repeated until the error correction block of data shown in FIG. 8 has been configured. Errors detected during C1 decoding are written in the C1 error detection flag memory 53 at the memory location designated by the ID information. The number of error detection flags due to C1 coding is then counted in the error correction circuit 43.

When the error correction block data is configured in the memory 40 as shown in FIG. 8, a data update flag is first read from the data update flag memory 41 as described above, and is stored in the forced erasure flag memory 52. At that time, the number of forced erasure flags is counted. When reading of data update flags is complete, the error correction core circuit 50 adds the number of C1 error detection flags and the number of forced erasure flags to each other to find the number of erasures.

The error correction core controller 51 determines a C4 decoding algorithm according to the erasure number. This C4 decoding algorithm will be described using FIG. 18. When the aforesaid number of erasure flags is input, the error correction core controller 51 compares it with a predetermined number n (n=6). If the number of erasure flags is less than n (according to Embodiment A1, erasure correction by C4 decoding is effected up to the error correction capability of the C4 check code as in the prior art example, i.e. erasure correction is effected up to 5 erasures), erasure correction is applied to the forced erasure flags and C1 error detection flags. Errors undetected by C1 decoding are then decoded up to the limit of error correction capability of the C4 check code.

If the aforesaid number of erasure flags is equal to or greater than n, the number of forced erasures is compared with a predetermined number R (according to Embodiment A1, R=6). If the number of forced erasures is equal to or greater than R, C4 decoding is not performed and error correction is terminated.

If the number of forced erasure flags is less than R (number of erasure flags equal to or greater than n), the number of forced erasure flags is again compared with a predetermined number P (P=4), and if this is equal to or greater than P, erasure correction is performed taking only the forced erasure flags as erasures. Errors undetected by C1 decoding are not corrected at this time. If the number of forced erasure flags is less than P, erasure correction is performed taking only the force erasure flags as erasures. In this case, errors undetected by C1 decoding are also corrected up to the error correction capability limit of the C4 check code.

When computation of the number of erasures by the error correction core controller 51 is complete, a data request signal is supplied to the error correction controller 44. Upon receipt of the data request signal, the error correction controller 44 reads data from the memory 40 and generates an address and a control signal. The error correction core circuit 50 uses the data read from the memory 40 to generate a syndrome. When the generation of the syndrome is complete, a modified syndrome is generated according to the decoding algorithm, and an error position and value are calculated. When the calculation of the error position and value is complete, the error correction core circuit 50 outputs the result of error position calculation to the error correction core controller 51. According to Embodiment A1, decoding with a Euclidean algorithm was considered and a modified syndrome was generated during the process of erasure correction. If another algorithm is used, erasure correction is performed by the syndrome and erasure position without generating a modified syndrome.

When the result of error position calculation is input, the error correction core controller 51 supplies an error data read request signal and error position data to the error correction controller 44. The error correction controller 44 reads incorrect data stored in the memory 40 at the memory location designated by the error position data. The error correction core circuit 50 performs error correction by adding the aforesaid error value to the incorrect data read from the memory 40, and the corrected data is again written in the memory 40 at the memory location designated by the aforesaid error position. This procedure is repeated for the number of detected errors. With regard to the data for which an error is detected during in C4 decoding, flag data is written in the C4 error detection flag memory 54 at the designated address. This procedure is repeated over one error correction block.

When C4 decoding of one error correction block is complete, the update flag memory controller 42 resets the data update flag memory 41 in the same way. After resetting of the data update flag memory 41, the error detection flag generator 56 generates an error detection flag using the flag for an error detected by the C1 check code, the flag for an error detected by the C4 check code and the a forced erasure flag. The generated error detection flag is stored in the error detection flag memory 57 at the designated address, and the error correction of one error correction block is completed.

Data corrected by the third error correction decoder 28 in the above manner is read with a detected error correction flag from the memory 40, and stored in the fourth memory 29. When one frame of special playback data has all been played back, the fourth memory 29 supplies a data output request signal to the still image packet generator 30.

According to Embodiment A1, during fast playback when one frame of (intra-encoded) special playback data is reproduced, it is then output from the fourth memory 29. Then, the the still image packet generator 30 generates still image packets and no-data packets, until the next frame of special playback data is reproduced, to freeze the screen (picture) on the ATV decoder, as in the still playback. Due to this control, the ATV decoder performs decoding without recognizing the fast playback mode, as in the case of still playback. This fast playback control will now be described, focusing on the operation of the still image packet generator 30.

When the data output request signal is received from the fourth memory 29, the still image packet generator 30 recognizes the state of still image packets currently being generated. This operation will now be described with reference to FIG. 20A to FIG. 20F. FIG. 20A to FIG. 20F are timing charts for special playback of a digital VTR according to the invention. In the figure, FIG. 20A shows the input signal to the fourth memory 29 (actually reproduced intermittently), FIG. 20B shows the data output request signal output by the fourth memory 29, FIG. 20C shows the data read start signal output by the still image packet generator 30, FIG. 20D shows the change-over signal of the switch 31, FIG. 20E shows the output signal of the fourth memory 29, and FIG. 20F shows the output signal of the still image packet generator 30.

First, when the still image packet generator 30 is generating still image packets, the fourth memory 29 goes on standby until one frame of packets have been output (point A in figure). When the final packet in one frame of still image packets is output, the still image packet generator 30 supplies the data read start signal to the fourth memory 29. When no-data packets are generated, the data read start signal is output after output of the currently generated packets is complete (point B in the figure). When the data read start signal is input, the fourth memory 29 reads special playback data packets from the memory in sequence.

This data read start signal is also supplied to the switch 31, and the switch 31 changes over the connection so as to select the output of the fourth memory 29. In the figure, when the change-over signal of the switch 31 is "H", the output of the fourth memory 29 is selected, and when it is "L", the output of the still image packet generator 30 is selected. The reason why the output of the fourth memory 29 goes on standby when still image packets are being generated by the still image packet generator 30 is that if interframe data were interrupted in the ATV decoder, and intraframe data were input, there would be a risk of faulty operation, and it is necessary to control the reproduced frames to prevent the faulty operation.

When the final packet of the special playback data is detected in the output of the fourth memory 29, the fourth memory 29 supplies a special playback data output complete signal to the still image packet generator 30 and switch 31. When this signal is input to the switch 31, the output is switched to the output of the still image packet generator 30. The still image packet generator 30 makes selection of the output packets in accordance with the coding amount up to the present time. More specifically, if too much data (frames) is sent to the ATV decoder so that the memory of the ATV decoder would tend to overflow, no-data packets are output to control the coding amount. Conversely, if there is not enough data (underflow) or if the amount of data is exactly right, the aforesaid still image packets are output. The still image packets are output frame by frame, and by inserting the no-data packets between the aforesaid still image packets, coding amount control of the ATV bit stream (i.e. control of the number of output frames so as not to cause overflow or underflow in the ATV decoder as described above) is performed. The data amount (number of frames) according to Embodiment A1 is counted at the output stage of the switch 32, and the count result is output to the still image packet generator 30. The data amount is found by counting the number of transmitted frames that have not yet been decoded, and their coding amount. More simply, the number of frames that have not yet been decoded may be counted.

As described above, by controlling the fourth memory 29, still image packet generator 30 and switch 32, a playback image can be formed in the ATV decoder without recognizing the fast playback mode, and a good fast playback image can be generated. Further, by using a combination of still image packets and no-data packets, overflow and underflow in the ATV decoder can be prevented so that a good special playback image is formed.

Next, the operation at the time of mode transition of the still image packet generator 30 will be described. When the special playback mode signal is input to the still image packet generator 30, generation of the still image packets (still image packets for which motion vectors are 0 and prediction errors are 0) and no-data packets is commenced. At the same time, in the third memory 27, the final packet of frame data in the ATV bit stream currently being output is detected. When the final packet of the frame data is detected, a final packet detection signal is supplied to the still image packet generator 30 and switch 32. When this signal is input, the switch 32 performs control so as to select the output of the switch 31.

When the final packet detecting signal is input to the still image packet generator 30, it generates one frame of still image packets, and then no-data packets. By generating no-data packets by the still image packet generator 30, overflow or underflow of the memory in the ATV decoder is prevented. According to Embodiment A1, the number of no-data packets inserted is controlled depending on the output result of the data amount counted in the output stage of the switch 32.

FIG. 21A to FIG. 21E are timing charts showing the transition from normal playback to special playback of a digital VTR according to this invention. In the figure, FIG. 21A shows the output of the third memory 27, FIG. 21B shows a special playback mode signal, FIG. 21C shows a frame final packet detection signal, FIG. 21D shows a change-over signal of the switch 32, and FIG. 21E shows the output data of the still image packet generator 30. As shown in the figure, the still image packets are output from the still image packet generator 30 following the final packet of the frame output by the third memory 27. According to Embodiment A1, changes in tape travel are performed with the same timing as the change-over signal of the switch 32.

Due to the above operation, the transition to special playback can also be controlled without having the ATV decoder recognize the mode transition. Also due to the above operation, still image packets are generated and output during the mode transition to special playback, so the playback image is a still image and mode transition can be effected smoothly without disrupting the image. In particular, in the aforesaid type of digital VTR for recording ATV signals, unlike the conventional analog recording VTR, so even if data reproduced during mode transition is used, the ATV signal comprises intraframe and interframe bit streams as described above, and a special playback image cannot be configured using the signal reproduced by the rotary head 20, and, therefore, the aforesaid control is very effective.

When the special playback mode signal is input, the switch 31 selects the output of the still image packet generator 30. Although not shown in the figure, control over the switch 31 is performed so as to select the output of the still image packet generator 30 until transition to the special playback mode is completed and the tape travel system (servo system) locks. When the tape travel system is brought into steady state and one frame of special playback data is configured in the fourth memory 29, a data output request signal is output as described above by the fourth memory 29. The subsequent control performed by the still image packet generator 30, switch 31, switch 32 and fourth memory 29 is the same as that described for fast playback, and is therefore omitted here (FIG. 20A to FIG. 20F).

Next, description will be made of the method of control during transition from the special playback mode to the normal playback mode. When there is a transition to the normal playback mode from the special playback mode and a normal playback mode signal is input, the fourth memory 29 checks the current data output state. If special playback data packets are currently being read from the fourth memory 29, a data output complete signal is output to the still image packet generator 30 after one frame of data has been read, and writing of data into the fourth memory 29 is stopped. At the same time, the normal playback mode start signal is supplied to the tape travel system (servo system). When the data read complete signal is input, the still image packet generator 30 generates and outputs still image packets and no-data packets in the above-described manner such that overflow or underflow does not occur in the memory of the ATV decoder. The change-over control signal of the switch 31 is output according to the same timing.

When special playback data packets are not being read from the fourth memory 29, the fourth memory 29 stops writing data, and a normal playback mode start signal is output to the tape travel system (servo system). The still image packet generator 30 generates and outputs still image packets and no-data packets in the above described manner such that overflow or underflow does not occur in the memory of the ATV decoder, and the switch 31 selects the output of the still image packet generator 30.

When the normal playback mode start signal is input from the fourth memory 29, transition to the normal playback mode. When the tape travel system is brought into the steady state, the fact that the transition to normal playback has taken place is output to the third memory 27 and fourth memory 29. In normal playback, reproduced ATV data for normal playback is written into the third memory 27. In the same way, special playback data is again written into the fourth memory 29.

After special playback data has been removed from the ATV data read into the third memory 27, ATV transport packets are configured and output. In the stage subsequent to the third memory 27, the switch 32 selects the output of the switch 31 until the leading packet (packet at the head) of intraframe is detected. When this head of the intraframe is detected at the output terminal of the third memory 27, the result of detection is output to the switch 32. When this signal is input, the switch 32 selects the output of the third memory 27. Due to the aforesaid control, mode transition from normal playback back to other mode, or from special playback to normal playback is performed smoothly without any distortion of the playback image, and a good playback image is obtained. Further, the playback image is configured without the ATV decoder recognizing the mode transition.

The output of the switch 32 is supplied to the ATV decoder. As the digital VTR is controlled as described above during fast playback, the ATV decoder can configure special playback images by performing the same control as in the normal playback, without the ATV decoder recognizing the playback mode of the digital VTR, and the memory capacity of the fourth memory 29 used for special playback can be reduced. This is because it is not necessary for the fourth memory 29 to read the same data in the memory repeatedly, due to the aforesaid control. This means, the memory is vacant after data has been read once. The fast playback can be realized simply by adding a buffer memory in front of the fourth memory 29. If this control is not performed, reproduced special playback data has to be read repeatedly until the next special playback data is reproduced. This requires a special playback memory of a capacity of at least two frames so that memory size could not be reduced. According to Embodiment A1, however, special playback can be achieved with only a memory of one frame so that the memory capacity can be reduced to about ½.

Figure 22:
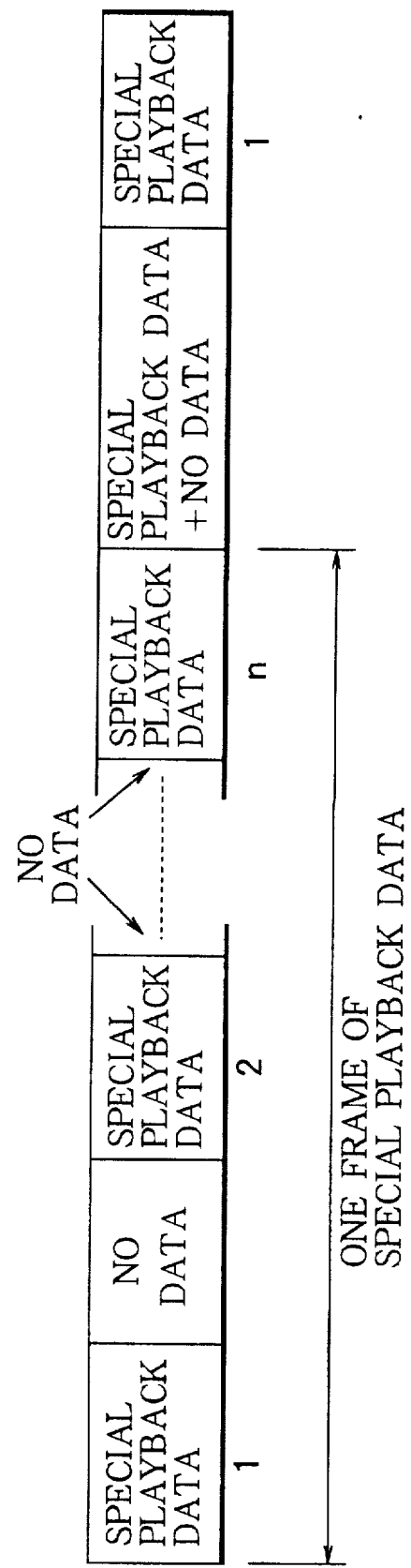
FIG. 22 is a diagram illustrating how one frame of data is output during special playback.

According to Embodiment A1, one frame of data is temporarily stored in the fourth memory 29. However, the invention is not limited to this arrangement, and the same effect can be obtained also by reading data stored in the fourth memory 29, taking a plurality of slice as a unit, as shown in FIG. 22, outputting no-data packets as inter-slice packets in the same frame, and switching between still image packets and no-data packets between frames. FIG. 22 shows the case where one frame is divided into a plurality of slices, and regrouped into a plurality of slices, and outputting them to the ATV decoder in n installments (the special playback data in one frame is divided into n blocks, taking each slice as a unit). "n" is an integer which is equal to or greater than 2. The number of slices contained in each of the n blocks need not be identical. By virtue of the above construction, the size of the fourth memory 29 can be reduced.

According to Embodiment A1, the still image packet generator 30 controls the coding amount and number of frames by combining still image packets and no-data packets so as not to cause an overflow or underflow in the ATV decoder. However, the invention is not limited to this arrangement, and particularly with regard to no-data packets, packets indicating a mode other than video signal, e.g. packets with headers indicating audio signals, may also be inserted. If packets are generated and output to give predetermined DC data as a result of audio decoding, audio muting can be performed and good special playback can be achieved.

Description has been made, with regard to Embodiment A1, of the method of control of the third memory 27, fourth memory 29, still image packet generator 30, switch 31 and switch 32. However the aforesaid control is not limited to fast playback and may also be applied to a mode transition to still playback, from still playback to normal playback, from fast playback to still playback, from normal playback to slow playback or the reverse of these transitions, and yet the same effect is obtained. In the description of Embodiment A1, slow playback was not referred to. However, as slow playback may be realized by repeating still playback, it can of course be achieved by alternating between playback data and still image packets (including no-data packets) as described above.

According to Embodiment A1, a digital VTR used for recording the ATV signal under discussion in the U.S.A. was described, however the aforesaid still image packets and no-data packets may for example also be used to control a digital VTR for recording an MPEG2 bit stream during special playback. The above-described signal recording/playback device is not limited to a digital VTR, and may be used for example to configure a playback image using only intra-encoded data during fast playback of a disk device or the like, that plays back, or records and plays back, an ATV bit stream or MPEG2 bit stream, and yet the similar effects can be obtained.

According to Embodiment A1, the decoding algorithm shown in FIG. 18 was used for C4 decoding, however the invention is not limited to this arrangement. In the case of a decoding algorithm using the aforesaid forced erasure flags, effective error correction can be performed to achieve the same effect by using a product coding system such as C2 code or C3 code. It will moreover be understood that effective error correction can be performed using the aforesaid forced erasure flags when coded blocks which have been error-correction coded in two or more dimensions are decoded.

According to Embodiment A1, the aforesaid forced erasure flags were described as being used for fast playback. But the invention may be used in a situation where error correction is applied to playback data during slow playback, and yet the similar effects can be obtained. The forced erasure flags may also be used during normal playback, and yet similar effects can be obtained. (In particular, decoding can be performed effectively if long dropouts occur.)

Writing in the memory 40 was controlled by the result of error detection of ID information appended to an ID signal. But the invention is not limited to this arrangement, and the result of C1 decoding may for example be used.

The decoding algorithm shown in FIG. 18 may also be controlled by selecting the aforesaid thresholds n, R, P in the normal playback and special playback modes. In particular, during fast playback or slow playback when data is reproduced intermittently, the number of maximum erasure correction may be set to be smaller than in the normal playback, in order to suppress errors undetected by the C4 code (e.g. whereas the setting may be n=6, R=6, P=4 for normal play, it may be n=5, R=5, P=3 for fast play).

With regard to the C4 decoding algorithm, the invention is not limited to the algorithm shown in FIG. 18. If the aforesaid forced erasure flags are treated as erasures and the C4 decoding algorithm is selected according to the number of forced erasure flags, error correction can be performed utilizing the maximum error correction capability of the C4 check code.

In the above description of Embodiment A1, the data update flag memory 41 and the forced erasure flag memory 52 were described as being separate from each other, but they may share the same memory. Also according to Embodiment A1, decoding was performed by treating the forced erasure flags and the C1 error detection flags separately. However, they may not be treated separately in the decoding, and yet the error correction capacity of the error correction code can be utilized fully, compared with the case where the forced erasures flags are not used. In such a case, the aforesaid forced erasure flag memory 52 and C1 error correction flag memory may share the same memory.

According to Embodiment A1, data containing errors detected by the C1 decoding was written in the memory 40 (or the memory in the second error correction decoder 26). But the invention is not limited to this arrangement, and control may be performed so that C1 block data containing errors detected by the C1 decoding is not written in the memory 40, and yet similar effects are obtained. (In this case, control is performed so that the forced erasure flags and C1 error detection flags are not separated or distinguished). Further, according to Embodiment A1, data which had been C1 decoded was stored in the memory. But the invention is not limited to this arrangement, and the playback data may be stored in the memory and then applying C1 and C4 decoding (C2 decoding for normal playback), and yet similar effects are obtained.

According to Embodiment A1, error correction was performed up to the error correction capability limit of the C4 check code, but the invention is not limited to this arrangement. If there are a large number of forced erasure flags, control may of course be performed by setting a small number of error corrections or erasure corrections in order to improve error detection capability.

According to Embodiment A1, description was made of a case where a (85, 77, 9) Reed-Solomon code was used in the recording direction, and a (20, 15, 6) Reed-Solomon code was used in a perpendicular direction. However, the invention is not limited to this arrangement, and decoding may be performed using forced erasure flags with error correction code of other types of product coding system, and yet similar effect may be obtained.

When repeated error correction decoding is performed using the error correction codes in the recording direction (repeated error correction decoding means applying C4 decoding after C1 decoding, and then again applying C1 error correction to C4 decoded data), the error correction capability in the recording direction at the time of repeated decoding may be selected depending on the presence or absence of update flags. By selecting the decoding algorithm depending on the presence or absence of update flags, undetected errors in repeated decoding of C1 block data that has not been updated can be suppressed, and a good quality image can be obtained.

In performing repeated error correction decoding using the error correction codes in the recording direction, control is performed so that, when playback digital data with the update flags reset (C1 block data that has not yet been updated) is decoded, control is performed so that erasure correction using error detection flags detected by an error correction code (C4 code) in a direction different from the recording direction does not take place. In particular, therefore, undetected errors in repeated decoding of C1 block data not yet updated are suppressed, and a good playback image is obtained.

In the above description of Embodiment A1, the Reed-Solomon code which is a linear error correction code is used. As an alternative, a BCH (Bose-Chaudhuri-Hocquenghem) code or a combination of a BCH code and a Reed-Solomon code may be used to configure the error correction code, and the forced erasure flags may be be used for erasure correction, and yet similar effects are obtained.

In the above description of Embodiment A1, the decoding algorithm for error correction codes using forced erasure flags was applied to video signal playback. However, the invention is not limited to this arrangement, and may be used for audio signal or the like. Also, in the description of Embodiment A1, digital VTR was taken as an example. However, the invention is not limited to this arrangement, and may be applied to any other digital signal playback device that plays back digital signals, such as DAT, CD, minidisk or digital disk recorder.

When an error detection flag is appended in the error correction circuit using a decoding algorithm using forced erasure flags, if the number of forced erasure flags is less than a predetermined number (e.g. 3), erasure correction is performed using only forced erasure flags as erasures (there are 6 or more in the case of FIG. 18). For error correction block data where the total number of erasures is less than a predetermined number (e.g. 9), data having a C1 error detection flag, or data containing both a forced erasure flag and C4 error detection flag (correction A) area treated as being erroneous. For other error correction block data, all errors detected by the C4 code are treated as being erroneous (correction B). An error detection flag is appended to those data having been found erroneous in the above criteria. With the above arrangement, error detection flags are appended without fail, undetected errors are minimized, and the number of error detection flags is adequately reduced.

As shown in FIG. 2 and FIG. 3, separate memories were provided for storing the error correction flags. However, the invention is not limited to this arrangement. For example, when the memory 40 is a commercially-available memory, there will be an excessive area after the memory 40 is configured after configuring the error correction block shown in FIG. 8. The excessive area may be used for storing error detection flags or data update flags. Almost all commercially-available memories used for error detection are of 8 bit configuration, so these data update flags and C1 error detection flags may be stored in different bits of the same address. If the aforesaid arrangement is adopted, the data update flags (forced erasure flag) and C1 error detection flags may be read together during C4 decoding so that circuit size can be reduced.

The reset timing for flag data in the data update flag memory 41, forced erasure flag memory 52, C1 error detection flag memory 53 and C4 error detection flag memory 54 is not limited to that described. For example data in the data update flag memory 41 may be reset while reading flag data during C4 decoding (read-after-write).

EMBODIMENT A2

Figure 23:
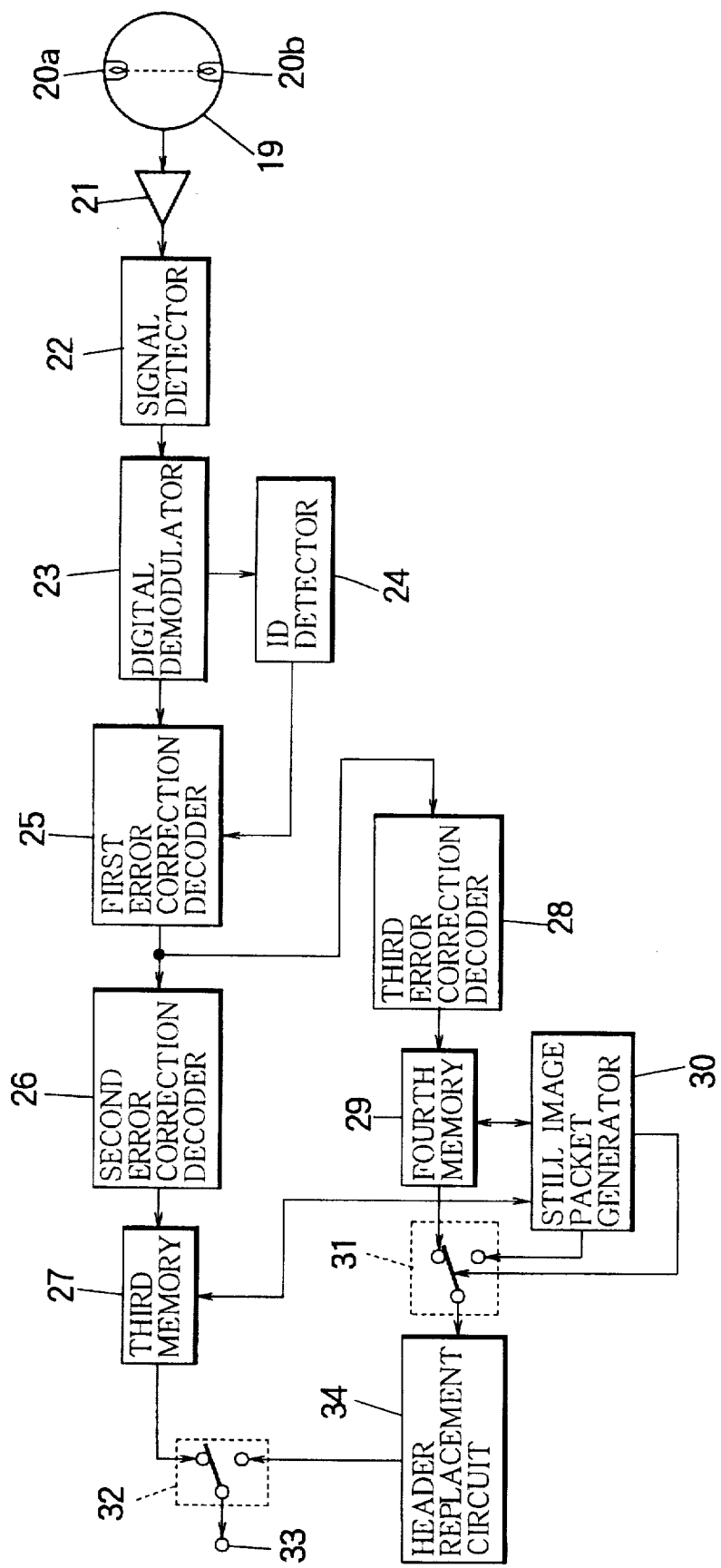
FIG. 23 is a block diagram showing a playback system of a digital VTR of another embodiment of the invention.

FIG. 23 is a block diagram of the playback system of a digital VTR according to Embodiment A2 of the invention. In the figure, the same parts as those of FIG. 1 are denoted by the same symbols, and as their construction and operation are identical, so that their description is omitted here. An additional component is a header replacement circuit 34 for replacing the input transport packet header. It is assumed that the recording format of the digital VTR according to Embodiment A2 is the same as that of Embodiment A1.

Embodiment A2 is for reducing the capacity of the memory used during fast playback in a digital VTR for records the ATV bit stream in the above-described manner (specifically, separating special playback data from the bit stream, and recording the special playback data in specific areas of the recording tracks).

The operation of the playback system during fast playback of a digital VTR according to Embodiment 2 will be described with reference to FIG. 23. According to Embodiment 2, description will be made of the case wherein a rotary head having the construction shown in FIG. 6A is used as in Embodiment A1. The scanning traces of the rotary head 20a at 2, 4, 8 and 16 times speed are as shown in FIG. 13, as in Embodiment A1. With regard to the tracking control for fast playback, the rotary head 20a is controlled so as to give maximum playback output in the center of the area in which the special playback data is recorded at each playback speed as in Embodiment A1 (FIG. 14A to FIG. 14C).

The operation of the playback system during fast playback will now be described with reference to FIG. 23, FIG. 13 and FIG. 14A to FIG. 14C in view of the above considerations. When the fast playback mode signal is input, the switch 32 selects the output of the switch 31 (the detailed timing of the switch change-over is the same as that of Embodiment A1). Playback data which is reproduced intermittently via the rotary heads 20a, 20b is amplified by the head amplifier 21, converted to playback digital data by the signal detector 22, and digitally demodulated by the digital demodulator 23. Data for which the sync signal has been correctly detected by the signal detector 22 is input to the ID detector 24 and first error correction decoder 25. The ID detector 24 separates the ID signal appended to the head of each sync block is separated based on the sync signal detected by the signal detector 22, and errors contained in the ID signal are detected using the error detection code appended to the ID signal.

The first error correction decoder 25 corrects and detects errors occurring in the playback signal, using the C1 check code appended in the recording direction. C1 decoded data is input to the third error correction decoder 28. The output from the first error correction decoder 25 is also input to the second error correction decoder 26, but C2 decoding is not performed as data is reproduced only intermittently as described above, and transport packets cannot be generated, so that C2 decoding is not performed during fast playback according to Embodiment A2 as in Embodiment A1.

Special playback data which has been C1 decoded in the first error correction decoder 25 is C4 decoded by the third error correction decoder 28. C4 decoding is similar to that performed in Embodiment A1, hence its details will be omitted here. Data which has been C4 decoded by the third error correction decoder 28 is stored in the fourth memory 29.

According to Embodiment A2, when a bit stream, typically MPEG2, is recorded in a digital VTR, intra images are extracted from the bit stream so as to perform special playback, and intraframe data is recorded in a special playback data recording areas provided on the recording tracks. The capacity of the memory used for fast playback at that time is reduced.

Description will now be made of the operation of the fourth memory 29, still image packet generator 30, switch 31 and header replacement circuit 34 during fast playback in the forward direction (fast forward playback) will now be described with reference to FIG. 22. To transmit intra-encoded data frame by frame during special playback, a memory that can store one frame of data is required as shown in Embodiment A1. According to Embodiment A2, one or a plurality of slices are grouped together by the fourth memory 29 as shown in FIG. 22, and one frame of intra images is divided into n blocks (referred to hereinafter as slice blocks), and output. In the fourth memory 29, the coding amount of special playback data that is played back is counted, for each slice, so as to configure a slice block. According to Embodiment A2, when the coding amount of special playback data stored in the fourth memory 29 reaches a predetermined value, a slice block is configured, and data is read from the fourth memory 29.

When output of the first slice block of data is complete, the fourth memory 29 supplies a data output request signal to the still image packet generator 30. The still image packet generator 30 outputs no-data packets as packets between slice blocks in the same frame, and still image packets and no-data packets between frames, for a predetermined number of frames. According to Embodiment A2, transport packets are output and transmitted in the interframe mode (interfield or interframe prediction mode). In this case, control is performed so that special playback data which is intermittently reproduced in slices during special playback is transmitted in a forced intraframe mode. FIG. 22 shows the case where one frame is divided into n slice blocks (n is an integer equal to or more than 2).

The description will now be made of the method of data control during fast playback according to Embodiment A2, focusing on the operation of the still image packet generator 30 and header replacement circuit 34. According to Embodiment A2, with regard to the transport packets, the special playback data may be transmitted, taken as intraframe images, and yet similar effects are obtained.

As described above, during fast forward playback according to Embodiment A2, output transport packets are transmitted as interframe mode packets. Further, the still image packet generator 30 generates still image packets and no-data packets between special playback data packets in one frame, in order to freeze the image on the ATV decoder side during special playback (FIG. 22). A good quality fast playback image can therefore be output, as in Embodiment A1, without the ATV decoder recognizing the special playback mode. The operation of the fourth memory 29 will now be described with reference to FIG. 23.

After digital demodulation and error correction, special playback data reproduced via the rotary head 20 is stored in the fourth memory 29, and slices are configured. The slices configured in the fourth memory 29 are output to the header replacement circuit 34 via the switch 31. In the header replacement circuit 34, a header in the packet header (picture header in MPEG2) indicating the transmission mode of the image is detected and replaced by an interframe (or interfield header), and at the same time, a header indicating the macroblock decoding mode (the block decoding mode is selected for each macroblock in MPEG2) is detected and replaced by an intraframe mode header. Special playback data packets for which these headers have been appended have been replaced are supplied to the output terminal 33 via the switch 32. Transport packets for transmitting special playback data are thereby transmitted as interframe packets, and macroblock data is decoded by the ATV decoder in the forced intraframe mode.

When output of one frame of special playback transport packets is complete, the still image packet generator 30 outputs still image packets. Likewise, the switch 31 selects the output of the still image packet generator 30 when output of one frame of special playback transport packets is complete. The timing of generating still image packets, and the change-over timing of the switch 31 are the same as those in Embodiment A1. The output (still image packets) of the switch 31 is supplied to the switch 32 via the header replacement circuit 34. The headers of the still image packets are generated by the still image packet generator 30, and according to Embodiment A2, the header replacement circuit 34 does not replace the header.

According to Embodiment A2, the output transport packets are controlled as described above, so the capacity of the fourth memory 29 can be substantially reduced compared with the case of Embodiment A1. More specifically, it is sufficient to provide a memory that can store one slice of data (or a several slices depending on the structure of the slice), and there is no need to provide a memory in the playback system that can store one frame of data as shown in Embodiment A1. There is particularly no need to provide a memory having one frame capacity in the case of an ATV decoder designed solely for playback, so circuit size can be reduced. Moreover, transport packets can be decoded without the ATV decoder recognizing the special playback mode.

EMBODIMENT A3

Another method of data transmission according to Embodiment A3 of the invention will now be described. In the above described method, one frame of special playback data is transmitted to the ATV decoder, and still image packets are generated by the still image packet generator 30 for a predetermined number of frames, and then transmitted. According to Embodiment A3, special playback data is divided into a plurality of frames and transmitted. It will be assumed that according to Embodiment A3, the construction of the playback system of the digital VTR is the same as that shown in FIG. 23.

Figure 24:
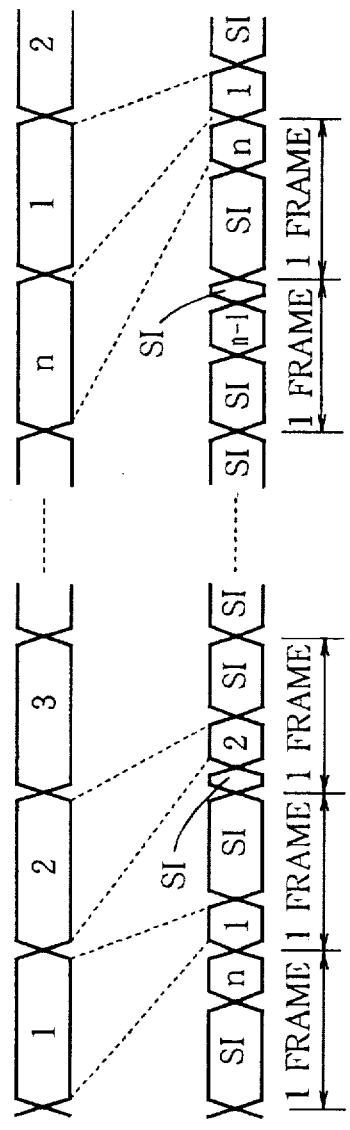
FIG. 24A to FIG. 24C are diagrams illustrating the playback data during special playback in the forward direction.

FIG. 24A to FIG. 24C are diagrams illustrating the playback data during special playback in the forward direction (forward special playback) of a digital VTR according to the invention. FIG. 27A to FIG. 27C are diagrams illustrating the playback data during special playback in the reverse direction (reverse special playback) of a digital VTR according to the invention. According to Embodiment A3, special playback data which is reproduced intermittently during fast playback is combined to configure the aforesaid slice block, and this slice block is combined with still image packets generated by the still image packet generator 30 so as to form one frame of transport packets and output to the ATV decoder. This will be referred to hereinafter as a partial refresh system.

Figure 25:
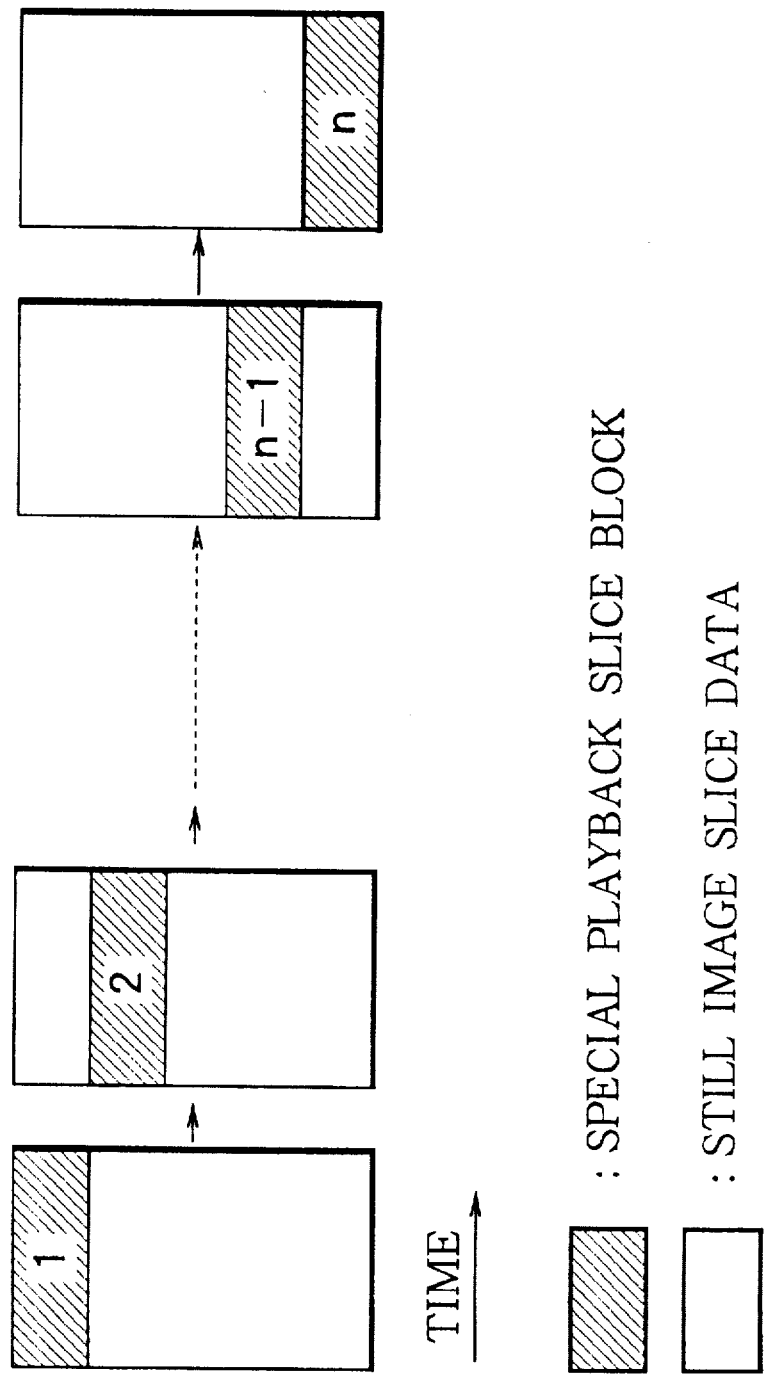
FIG. 25 is a diagram showing partial refresh on the screen during special playback in the forward direction.

Description will next be made of the fast forward playback using the partial refresh system, with reference to FIG. 24A to FIG. 24C and FIG. 25. FIG. 24A shows special playback packet which is reproduced by the rotary head 20 during fast forward playback (in practice, it is reproduced intermittently). FIG. 24B shows transport packets output from the switch 32. "1 FRAME" in the figure means one frame of transport packets. FIG. 24C shows the change-over signal for the switch 31. FIG. 25 shows partial refresh on the screen during forward special playback of a digital VTR according to the invention. In the figure, the data in the hatched part is special playback data transmitted forcibly in the intraframe mode, and the other parts are transmitted still image packets output by the still image packet generator 30. According to Embodiment A3, one frame of special playback data is divided into n slice blocks and transmitted as shown in FIG. 24A.

Description will next be made of the operation of the playback system during fast forward playback with reference to FIG. 23, FIG. 24A to FIG. 24C and FIG. 25. The operation up to the third error correction decoder 28 is the same as that of Embodiment A2, so its description will be omitted. Playback signal processing is performed as described above, and data which has been C4 decoded by the third error decoder 28 is stored in the fourth memory 29.

According to Embodiment A3, the capacity of the special playback data memory (fourth memory 29) used for fast playback by a digital VTR using the aforementioned recording system is reduced as in Embodiment A2.

Description will next be made of the operation of the fourth memory 29, still image packet generator 30, switch 31 and header replacement circuit 34 during fast playback with reference to FIG. 23. Normally, to transmit intra-encoded data frame by frame during fast playback, a memory for storing one frame of data is required as described in connection with Embodiment A1. According to Embodiment A3, a plurality of slices are grouped together in the fourth memory 29 in order to configure a slice block as shown in FIG. 24A to FIG. 24C or FIG. 25, and this slice block is combined with still image packets output by the still image packet generator 30 so as to configure one frame of transport packets, which is output. In the fourth memory 29, the coding amount of special playback data is counted for each slice to form a slice block. According to Embodiment A3, when the coding amount of special playback data stored in the fourth memory 29 reaches a predetermined value, the slice block is configured, and data is read out from the fourth memory 29 as in Embodiment A2.

When configuration of one slice block is complete, the fourth memory 29 outputs a data output request signal and a macroblock address contained in the slice block to the still image packet generator 30. According to the MPEG2 specification, when packets are transmitted, one frame of macroblocks is divided into slices for transmission, and the transmission sequence is defined so that transmission occurs in raster scan order from the upper left of the screen. According to Embodiment A3, therefore, the address of the first macroblock and the address of the last macroblock are transmitted as macroblock address information. When the still image packet generator 30 receives this signal, it outputs, following header information (a picture header in MPEG2) indicating the interframe (interfield) mode, still image packets (from the beginning of the frame and up to the macroblock immediately preceding the macroblock at the head of the slice block. If special playback data is at the head of the frame, the header (picture header in MPEG2) is already appended, so appending a header does not take place. In this case, the switch 31 selects the output of the still image packet generator 30. When output of still image packets up to the address of the aforesaid macroblock at the head is complete, the still image packet generator 30 supplies a data read start signal to the fourth memory 29.

When the aforesaid signal is received, the fourth memory 29 reads out data from the head of the slice block configured having been configured. At that time, the switch 31 selects the output of the fourth memory 29. When reading of the slice block is complete, a control signal indicating that output of data has been completed is output to the still image packet generator 30. When this signal is received, the still image packet generator 30 generates and outputs still image packets from the next macroblock after the final macroblock in the slice block to the last macroblock in the frame. The switch 31 then selects the output of the still image packet generator 30. When generation of still image packets up to the last macroblock in the frame has been completed, the still image packet generator 30 outputs no-data packets until configuration of the next slice block is complete.

The output of the switch 31 is input to the header replacement circuit 34. According to Embodiment A3, transport packets are transmitted in the interframe mode (interfield or interframe prediction mode) as in Embodiment A2. In this case, control is performed so that special playback data which is reproduced intermittently during fast playback is transmitted in the forced intraframe mode. With regard to the special playback data packets, the header replacement circuit 34 detects a header indicating the transmission mode of images (a picture header for MPEG2), replaces it by an interframe (or interfield) header, detects a header indicating the macroblock decoding mode, and replaces this header by an intraframe mode header as in Embodiment A2. Special playback data packets for which the headers have been replaced are supplied to the output terminal 33 via the switch 32. Transport packets which transmit special playback data are thereby transmitted as interframe packets, and data in each macroblock is decoded by the ATV decoder as the forced intraframe mode.

Still image packets output by the still image packet generator 30 are supplied via the header replacement circuit 34 to the switch 32. The headers of the still image packets are generated by the still image packet generator 30, and according to Embodiment A3, header replacement by the header replacement circuit 34 is not performed as in Embodiment A2.

FIG. 24A to FIG. 24C and FIG. 25 show transmission of one frame of special playback data having been divided into n frames of transport packets, and refreshing on the screen using the transmitted frame data. By transmitting data as shown in drawings, a plurality of slices on the screen are updated in one frame, and all special playback images are updated in n frames (partial refresh).

As described above, the output transport packets during fast forward playback are transmitted as the interframe mode packets. In order to freeze the screen on the ATV decoder side during special playback, still image packets and no-data packets are generated by the still image packet generator 30 for screen information in one frame which is not refreshed (FIG. 24B), so a good fast playback image is obtained as in Embodiment A1 without the ATV decoder recognizing the fast playback mode.

Description will next be made of the method of reducing the capacity of the fourth memory 29 during fast playback in the reverse direction (fast reverse playback), will be described. According to Embodiment A2, during fast forward playback, a plurality of reproduced slices were grouped together to configure a slice block in the fourth memory 29, and special playback data packets were output from the fourth memory 29 slice block by slice block. No data packets were inserted between slice blocks in the same frame, and still image packets were inserted between frames to generate transport packets during fast playback, so that the capacity of the memory used for fast playback was thereby reduced. As special playback data is recorded in the order of slices in which the bit stream data is input, it is not necessary to alter the order of the slices played back during fast forward playback, even if slice blocks are configured as described above and playback data is output slice block by slice block. Data could therefore be output sequentially in slice units before configuring one frame of data.

During fast reverse playback, the slices are reproduced in the order reverse to that used for recording. According to the MPEG2 specification, macroblocks must be transmitted in a raster scan order starting from the upper left of the screen as stated above. When intraframe data is input to the ATV decoder, therefore, decoding of image data starts from the slice at the head. In this process, if the transmission sequence of slices in the input bit stream is different from the predetermined sequence, the ATV decoder cannot configure the playback image. This occurs due to the fact that the ATV decoder is not provided with a function of deshuffling the decoded slices at the predetermined positions, when the order of the reproduced slices differ. In such a case, if it is desired to perform fast reverse playback, a memory must be provided in the playback system capable of storing at least one frame of special playback data so as to be able to rearrange the data which is played back.

Figure 26A:
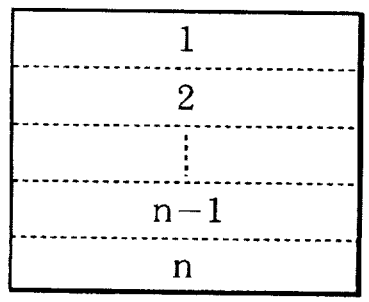
FIG. 26A to FIG. 26C are diagrams illustrating the operation during reverse special playback.
Figure 26B:
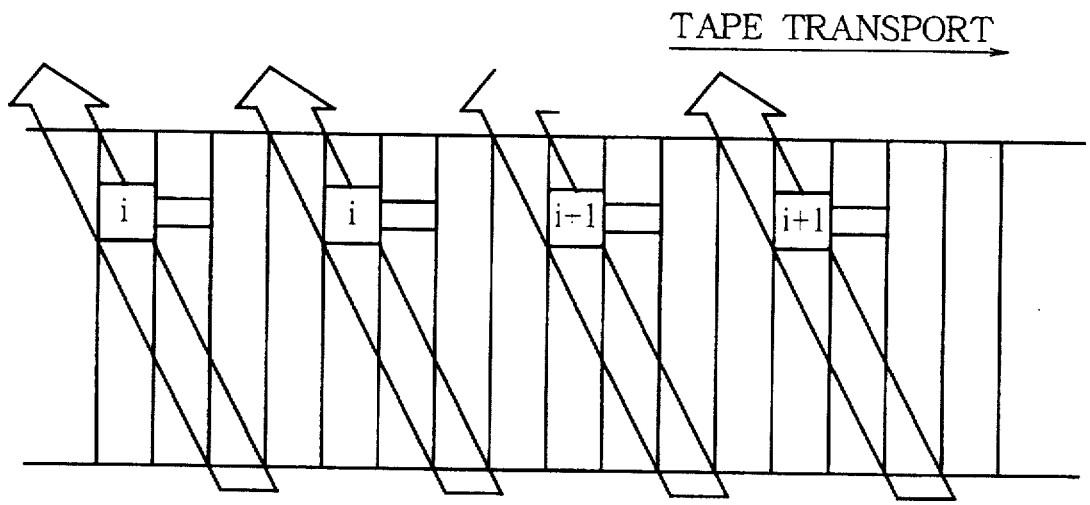
Figure 26C:
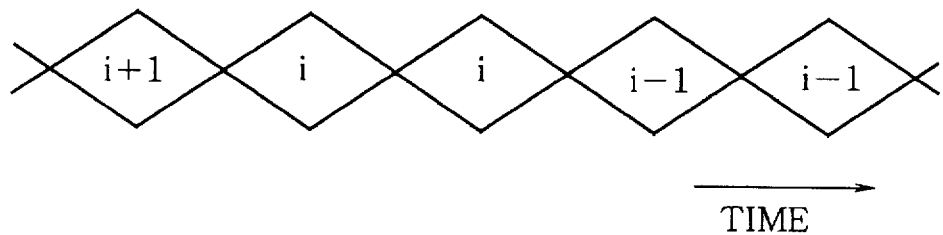

FIG. 26A to FIG. 26C are diagrams for explaining the operation during reverse special playback of a digital VTR according the invention. FIG. 26A shows a typical configuration of the slice blocks in one frame, FIG. 26B shows the scanning traces of the rotary head 20a at −2 times playback speed, and FIG. 26C shows the playback signal output by the rotary head 20a. According to this embodiment, it will be assumed that the aforesaid slice blocks can be configured from special playback data in one track. Because slice block data is reproduced in the reverse order as described above, the transmission method of Embodiment A2 (wherein a predetermined number of still image packets are transmitted after outputting one frame of special playback data) cannot be employed. It is necessary to rearrange the data in the fourth memory 29. The following description relates to a method of control in which the partial refresh system is used in a fast reverse playback, to correctly decode the playback signal without requiring a memory for rearranging the data.

During fast reverse playback, transport packets are transmitted as packets in the interframe mode (interfield or interframe prediction mode) as in the fast forward playback. Special playback data reproduced intermittently during fast reverse playback is transmitted in the forced intraframe mode. Data control during fast reverse playback according to Embodiment A3, and in particular the operation of the fourth memory 29, still image packet generator 30 and header replacement circuit 34, will now be described with reference to FIG. 23, FIG. 26A to FIG. 26C, FIG. 27A to FIG. 27C and FIG. 28.

Figures 28, 29:
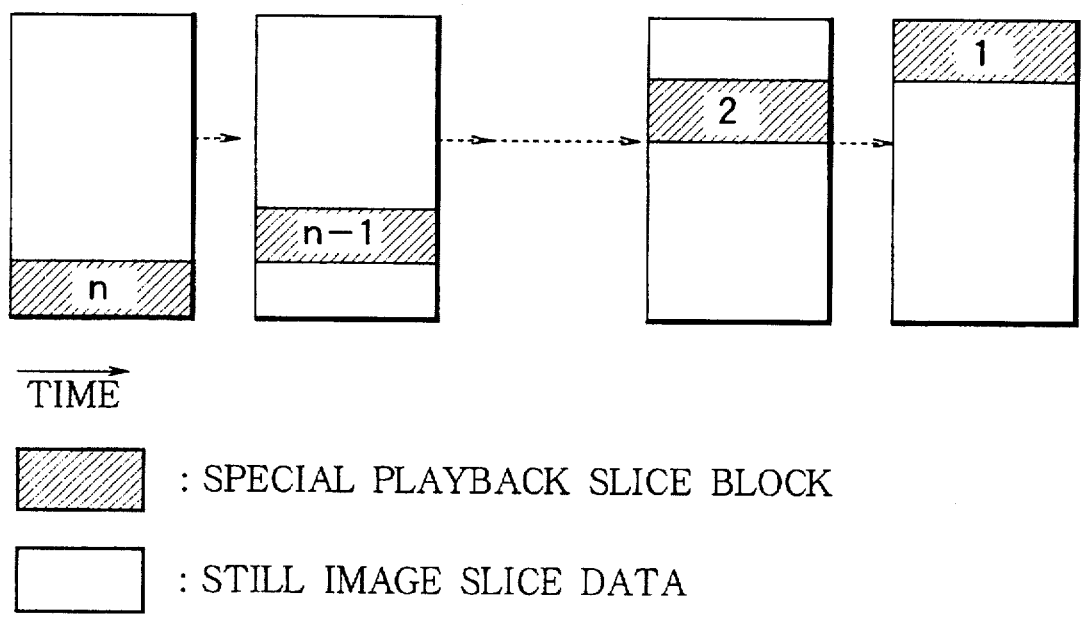
FIG. 28 is a diagram showing partial refresh on the screen during reverse special playback.
FIG. 29 is a diagram showing how still image packets are configured using macroblock skip in one slice.

FIG. 27A to FIG. 27C are diagrams for showing the playback data during reverse special playback of a digital VTR according to the invention. FIG. 28 shows partial refresh on the screen during reverse special playback of the digital VTR according to the invention. FIG. 27A shows special playback packet which is reproduced by the rotary head 20 during fast reverse playback (actually, it is reproduced intermittently). FIG. 27B shows transport packets output from the switch 32. "1 FRAME" in the figure means one frame of transport packets. FIG. 27C shows the change-over signal of the switch 31. FIG. 28 shows interframe data output by the digital VTR. In the figure, the data in the hatched part is special playback data transmitted in the forced intraframe mode, and the other parts indicates transmitted parts of still image packets output by the still image packet generator 30. During fast reverse playback, as in the fast forward playback, one frame of special playback data is divided into n slice blocks and transmitted as shown in FIG. 27A to FIG. 27C.

Description will next be made of the operation of the playback system. The operation up to the third error correction decoder 28 is the same as that of Embodiment A2, so its description will be omitted here. Playback signal processing is performed as described above, and data which has been C4 decoded by the third error correction decoder 28 is stored in the fourth memory 29. In the fourth memory 29, slices are separated from the input special playback data, and the coding amount of input special playback data is counted for each slice to form a slice block. When the coding amount of special playback data stored in the fourth memory 29 reaches a predetermined value, the slice block is configured, and data is read out from the fourth memory 29.

When configuration of one slice block is complete, the fourth memory 29 supplies a data output request signal, and the macroblock addresses of the first and last macroblocks contained in the slice block, to the still image packet generator 30. (As in the case of fast forward playback, for the frame of data of which special playback data is not at the head of the frame, a header information indicating the interframe (interfield) mode is appended at the head.) When these signals are received by the still image packet generator 30, still image packets up to the macroblock immediately preceding the first macroblock in the slice block are generated and output. The switch 31 then selects the output of the still image packet generator 30. When the output of still image packets up to the address of the macroblock at the head is complete, the still image packet generator 30 supplies a data read start signal to the fourth memory 29.

When the aforesaid signal is received, slices blocks are read from the fourth memory 29, starting with the head. Then, the switch 31 selects the output of the fourth memory 29. When reading of the slice block is complete, a control signal indicating that the reading of data has been completed is output to the still image packet generator 30. When this signal is received, the still image packet generator 30 generates and outputs still image packets from the next macroblock after the final macroblock in the slice block to the last macroblock in the frame. The switch 31 then selects the output of the still image packet generator 30. When generation of still image packets up to the last macroblock in the frame has been completed, the still image packet generator 30 outputs no-data packets until configuration of the next slice block is complete.

The output of the switch 31 is input to the header replacement circuit 34. According to Embodiment A3, transport packets are transmitted in the interframe mode (interfield or interframe prediction mode) as in Embodiment A2. In this case, control is performed so that special playback data which is reproduced intermittently, slice by slice, during fast playback, is transmitted in the forced intraframe mode. With regard to special playback data packets, the header replacement circuit 34 detects a header in the packet header (a picture header for MPEG2) indicating the image transmission mode, replaces it by an interframe (or interfield) header, detects a header indicating the macroblock decoding mode, and replaces this header by an intraframe mode header as in Embodiment A2. Special playback data packets for which the headers have been replaced are supplied to the output terminal 33 via the switch 32. Transport packets which transmit special playback data are thereby transmitted as interframe packets, and data in each macroblock is decoded by the ATV decoder in the forced intraframe mode.

Still image packets output by the still image packet generator 30 are supplied to the switch 32 via the header replacement circuit 34. The headers of the still image packets are generated by the still image packet generator 30, and according to Embodiment A3, header replacement by the header replacement circuit 34 is not performed as in Embodiment A2.

FIG. 27A to FIG. 27C and FIG. 28 show transmission of special playback data during fast reverse playback, with one frame of special playback data being divided into n frame of transport packets, and the refreshing on the screen of the transmitted frame data. By transmitting data as illustrated, a plurality of slices are updated at each frame on the screen so that all special playback images are updated in n frames (partial refresh).

As described above, according to Embodiment A3, the output transport packets are transmitted as packets in the interframe mode during fast reverse playback. Also, during special playback, in order to freeze the screen on the ATV decoder side, still image packets are generated by the still image packet generator 30 for slices of special playback data in one frame that are not transmitted (FIG. 27B), so a good fast playback image is generated as in Embodiment A1 without the ATV decoder recognizing the fast playback mode.

The memory capacity for fast playback is reduced by storing playback data one slice block at a time and not one frame at a time as in Embodiment A1. During fast reverse playback, although it was necessary to provide a memory that could store one frame of fast playback data and rearrange the order of the reproduced data, such a memory is rendered unnecessary by changing the mode to the interframe mode and changing to the forced intraframe mode for the reproduced data for each slice during fast playback as described above. Further, as playback data is stored in a fast playback memory one slice at a time as in the fast forward playback, memory size can be reduced (for example, although this depends on the size of the slice block and refresh cycle of special playback data, if one frame of data is divided into 10 slice blocks and transmitted, memory capacity can be reduced to approx. ¹⁄₁₀).

According to Embodiment A3, output transport packets are controlled as described above, so the capacity of the fourth memory 29 can be substantially reduced compared with Embodiment A1. More specifically, it is sufficient to provide a memory that can store one slice (or a plurality of slices depending on the configuration of the slices) of data, and there is no need to provide a memory in the playback system that can store one frame. There is particularly no need for one frame of memory in decoders in a device solely designed for playback, so circuit size can be reduced. Further, it is possible to decode the transport packets without having the ATV decoder recognize the special playback mode.

EMBODIMENT A4

A method of configuring still image packets according to Embodiment A4 will now be described. In MPEG2, macroblock skip is defined only for transmission of interframe packets. The meaning of macroblock skip is that macroblocks in the same slice can be skipped (however the macroblocks at the beginning and end of a slice cannot be skipped). The size of the slice is not important provided that it is configured from the same horizontal row of macroblocks. According to Embodiment A4, still image packets are transmitted using this skip. FIG. 29 shows the configuration of still image packets of one slice according to the invention. As illustrated, the slice is configured from two macroblocks, and the data in each macroblock has a motion vector being 0 and the prediction error being 0. FIG. 29 shows the case where all macroblocks in the same horizontal direction are still image packets. Where a still image packet is configured from macroblocks in the middle of the screen, the macroblock addresses in the macroblock may be changed, or more specifically, the relative addresses of subsequent macroblocks may be changed. If still image packets are configured as described above, the size of the circuit used to store still image packets and the amount of data generated by still image packets can be reduced, so circuit control is very easy to perform.

EMBODIMENT A5

According to Embodiments A1, A2, A3, as still image packets, packets with motion vectors equal to 0 and prediction errors equal to 0 were transmitted. However, the invention is not limited to this arrangement, and packets may for example such that if special playback data was not transmitted, images in the preceding frame (or field) would be used for interpolation, and yet similar effects may be obtained. In particular, if one frame of special playback data is divided into a plurality of frames for transmission as in Embodiment A3, the capacity of the memory in the playback system and the circuit size may be reduced.

EMBODIMENT A6

According to the aforesaid embodiments, still image packets were configured taking a transport packet as a unit. However, the invention is not limited to this arrangement. For example, description was made of the case where slice blocks were configured taking a transport packet as a unit, in connection with Embodiments A2 and A3. But the invention is not limited to this arrangement. Macroblocks wherein the motion vectors are 0 and prediction errors are 0 may be inserted midway in the reproduced transport packet. Further, transport packets are configured by inserting special playback data (slice by slice) following the macroblocks indicating the aforesaid still images, and yet similar effects can be obtained.

EMBODIMENT A7

Special playback data was so far considered as frame image data. But the invention is not limited to this arrangement. If transmitted transport packets is field images, similar processing may be performed taking the transport packets as are field images, and yet similar effects can be obtained. According to the aforesaid embodiment, moreover, the data recording format was as shown in FIG. 12. But the invention is not limited to this arrangement. If a digital VTR is for recording digital signals that are high efficiency coded by high efficiency coding such as motion compensation prediction as typified by MPEG2, and if the digital signal playback device is of the type which separates the intra-coded data as special playback data from the digital signal, and has a format for recording the separated special playback data in the areas predefined on the recording medium, the above described control may be used, and yet similar effects can be obtained. In the description of the above embodiments, the digital VTR was taken as an example of digital signal playback device. But the invention may be applied to special playback in other types of devices, such as disk players, for recording in the above-described manner.

EMBODIMENT B1

Figure 30:
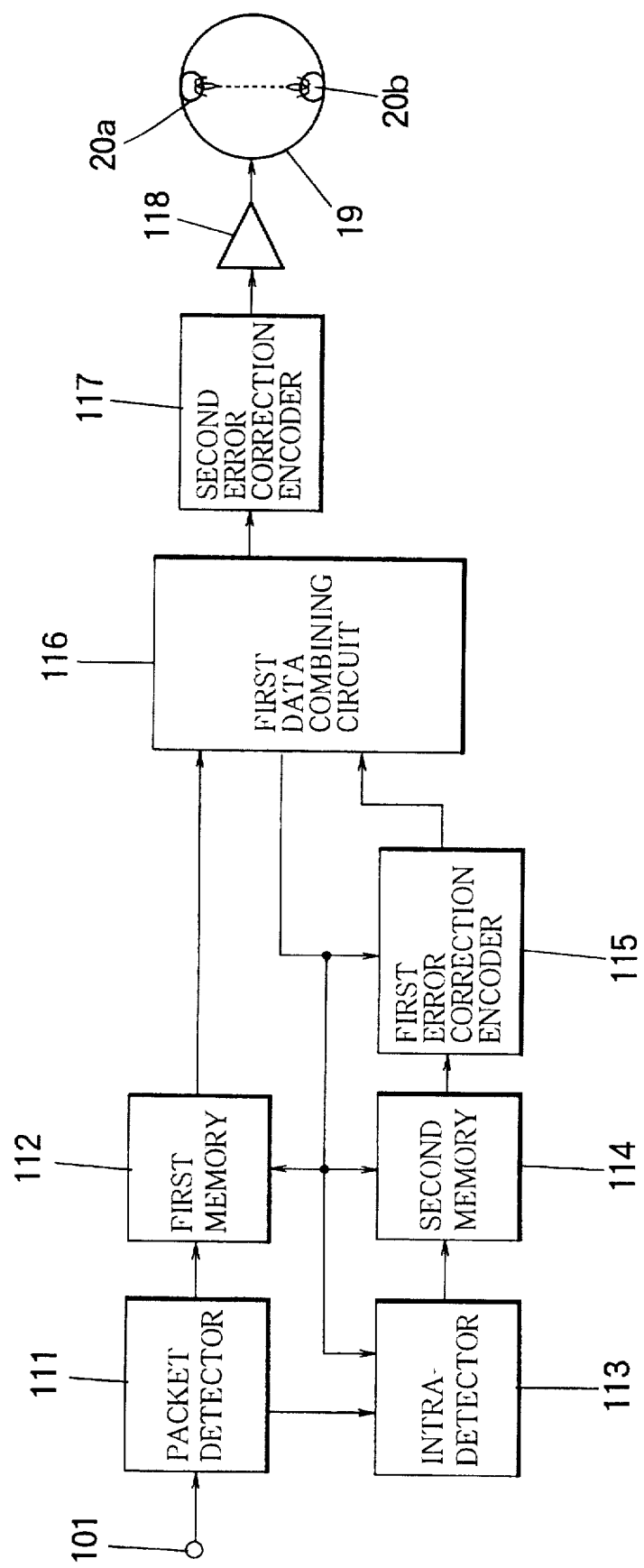
FIG. 30 is a block diagram showing an example of a recording system of a digital VTR of another embodiment of the invention.

FIG. 30 is a block diagram of a recording system of a digital VTR according to another embodiment, Embodiment B1. In the diagram, reference numerals 19 denotes a rotary drum and 20a and 20b denote rotary heads which are similar to those shown in FIG. 1. An input terminal 101 is for inputting a digital video signal and audio signal in the form of a bit stream, a packet detector 111 detects packets of video and audio signals, and the like from the bit stream, a first memory 112 stores the bit stream, an intra-detector 113 detects intra-encoded data in the bit stream, and a second memory 114 stores intra-encoded data output by the intra-detector 113. A first error correction encoder 115 adds an error correction code to data output by the second memory 114. A first data combining circuit 116 combines data output by the first memory 112 and the first error correction encoder 115 so as to generate a recorded data stream. A second error correction encoder 117 adds an error correction code specified by the SD specification to the recorded data stream output by the first data combining circuit 116. Reference numeral 118 is a recording amplifier.

Figure 31:
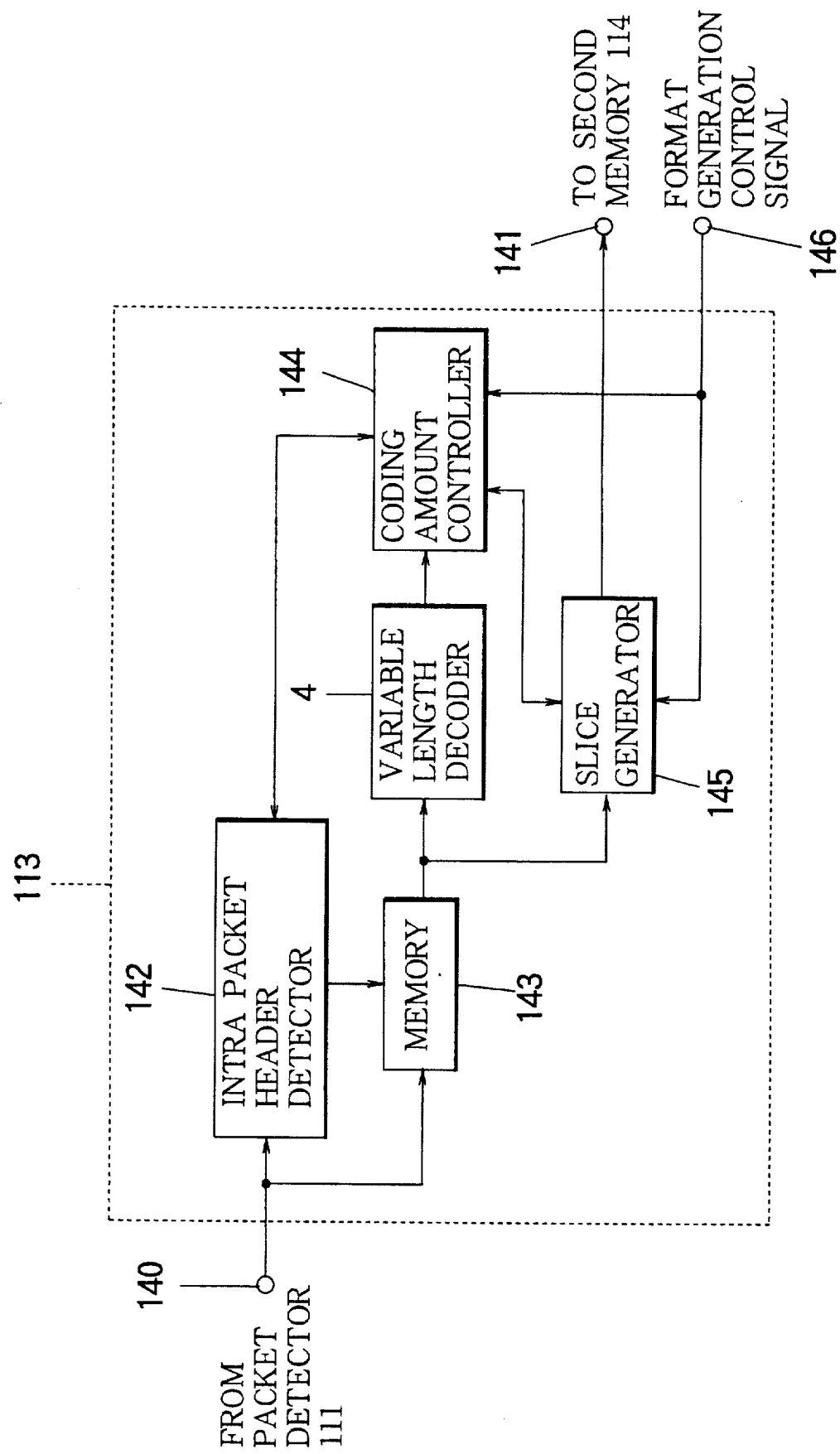
FIG. 31 is a block diagram showing an example of an intra-detector in FIG. 30.

FIG. 31 is a block diagram of an example of the intra-detector 113. In the drawing, reference numeral 4 denotes a variable length decoder which is similar to that shown in FIG. 39. Reference numeral 140 denotes an input terminal, and 141 denotes an output terminal. An intra-packet header detector 142 detects an intra-packet header and generates a write control signal for writing detected intraframe data in a memory 143. A coding amount controller 144 computes coding amount based on the coded length and run-length of variable length code words output by the variable length decoder 4, and controls the coding amount of special playback transport packets based on the computed result. A slice generator 145 for combining bit streams output by the memory 143 to generate slices. Reference numeral 146 is an input terminal of the format generation control signal.

Figure 32:
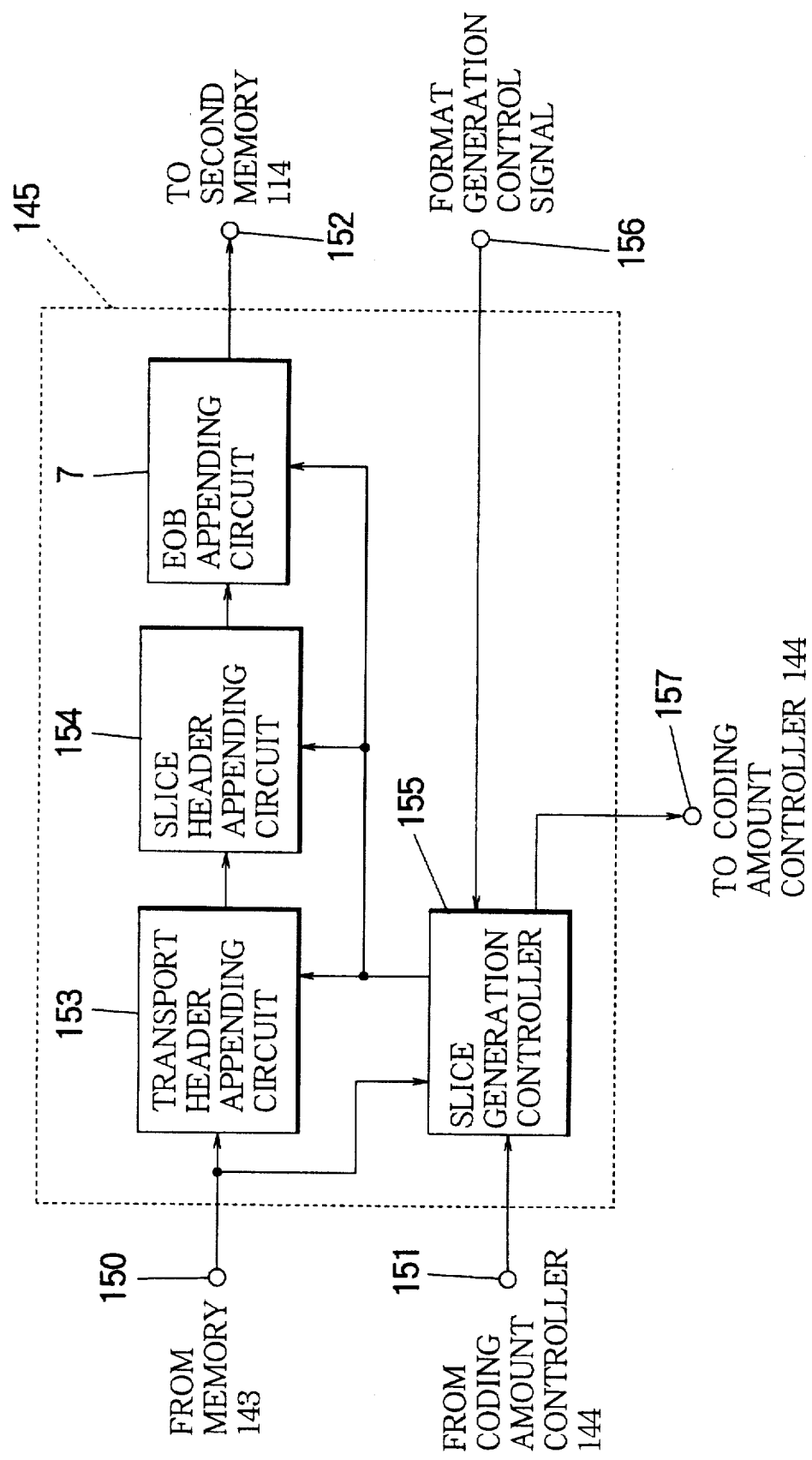
FIG. 32 is a block diagram showing an example of a slice generator in FIG. 31.

FIG. 32 is a block diagram of an example of the slice generator 145. In the diagrams reference numeral 7 denotes an EOB appending circuit similar to that in FIG. 39. Reference numerals 150 and 151 denotes input terminals, 152 denotes a data output terminal, 153 denotes a transport header appending circuit, 154 denotes a slice header appending circuit, 155 denotes a slice generation controller, 156 denotes a format generation control signal input terminal, and 157 denotes an output terminal.

The construction of DCT blocks and macroblocks in the ATV signal are as shown in FIG. 4A to FIG. 4C.

Disposition of the data within one track is as shown in FIG. 5, the arrangement of the rotary heads 20a, 20b on the rotary drum 19 are as shown in FIG. 6A to FIG. 6C, data packets are as shown in FIG. 7A and FIG. 7B, transport packets contained in the bit stream are as shown in FIG. 7A, the recording data packets on the magnetic tape is as shown n FIG. 7B, the code configuration of the error correction code appended to the special playback data is as shown in FIG. 8, the number of sync blocks obtained from one track at each of the fast playback speeds are as shown in FIG. 9, the special playback data recording areas on the magnetic tape is as shown in FIG. 10A and FIG. 10B, the manner of dividing one error correction block of 16 times (−14 times) playback data in a digital VTR according to this embodiment is as shown in FIG. 11, and the track format of the digital VTR according to this embodiment are as shown in FIG. 12. That is, they are similar to those described in connection with Embodiment A1, and their description is omitted.

Figure 33A:
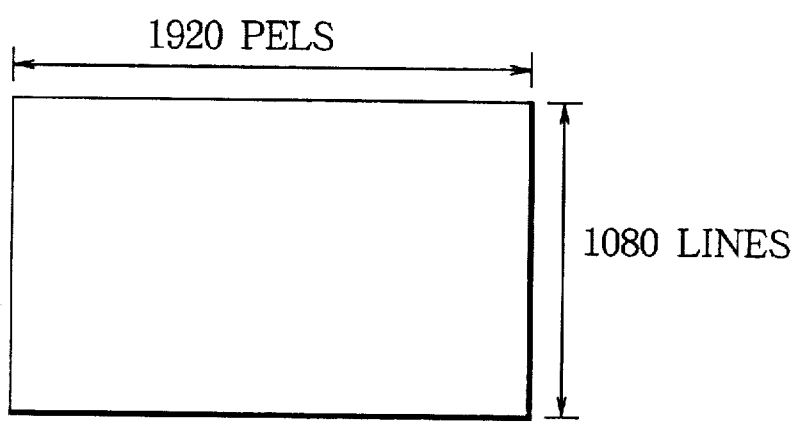
FIG. 33A and FIG. 33B are diagrams showing the configuration on the screen of macroblocks.
Figure 33B:
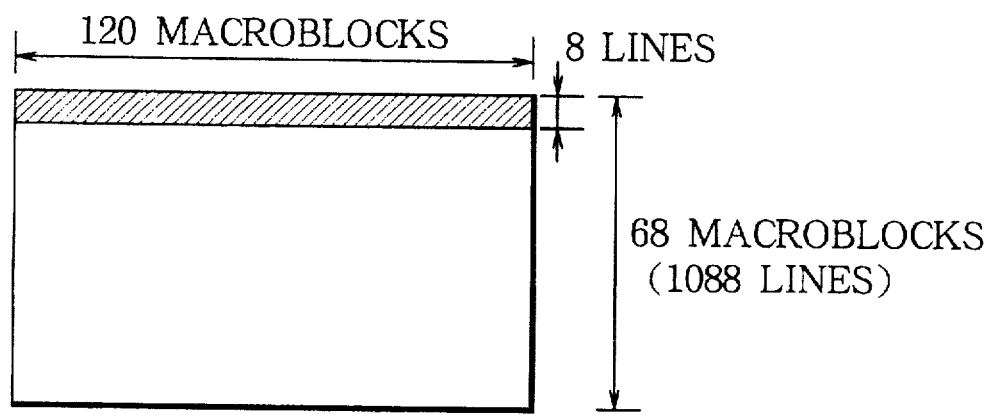

FIG. 33A and FIG. 33B show the manner of configuring macroblocks of the ATV signal.

The playback system of the digital VTR according to this embodiment is as shown in FIG. 23. That is it is similar to that described with reference to Embodiment A2, and its description is omitted.

FIG. 34 is a block diagram of an example of the still image packet generator 30. In the diagram, 160 and 161 denote input terminals, and 162, 163 and 164 denote output terminals. A slice header generator 165 is for generating slice headers. Reference numeral 166 denotes a macroblock address generator, 167 denotes a still image macroblock data generator, 168 denotes a timing controller, 169 denotes a packet generation controller, 170 denotes a no-data packet generator, 171 denotes a switch, and 172 denotes an input terminal.

Figure 35:
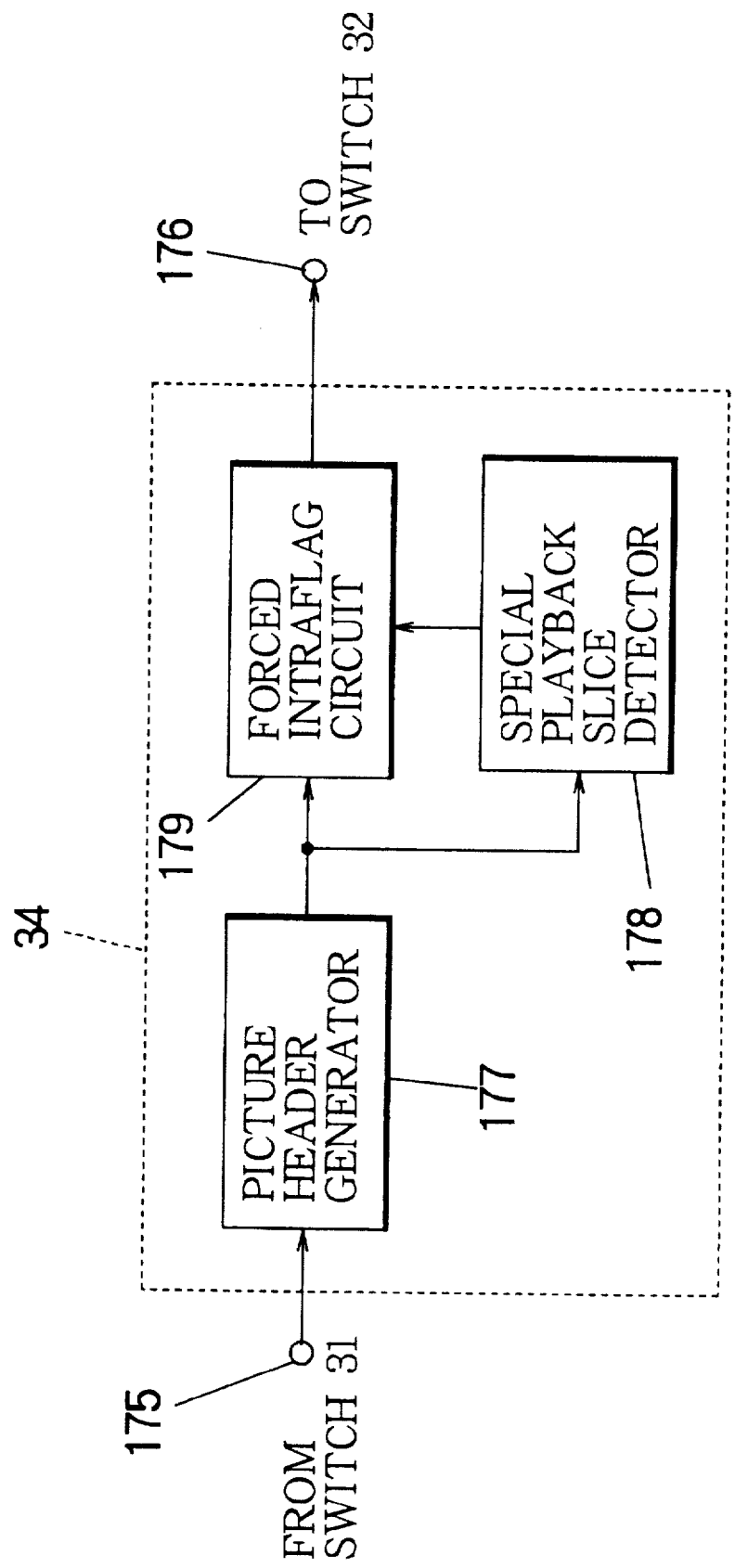
FIG. 35 is a block diagram of an example of header replacement circuit in FIG. 23.

FIG. 35 shows an example of the header replacing circuit 34. In the diagram, 175 denotes an input terminal, 176 denotes an output terminal, 177 denotes a picture header generator, 178 denotes a special playback slice detection circuit, and 179 denotes a forced intraflag appending circuit.

The head scanning traces at 2 times, 4 times, 8 times and 16 times playback speeds are as shown in FIG. 13. The tracking points at each of the playback speeds are as shown in FIG. 14. The scanning traces during −2 times speed playback and the output sequence of the special playback data is as shown in FIG. 26A to FIG. 26C. The playback transport packets during forward special playback are as shown in FIG. 24A to FIG. 24C. The partial refreshing of the screen during forward special playback is as shown in FIG. 25. The output of the playback transport packets during reverse special playback is as shown in FIG. 27A to FIG. 27C. The partial refreshing on the screen in the reverse special playback is as shown in FIG. 28. The configuration of the still image slice, and transports configured of still image slices are as shown FIG. 36A to FIG. 36C.

The recording forma is similar to that described with reference to Embodiment 1. The disposition of the special playback data, taking account of the number of sync blocks from which data can be obtained, is as shown in FIG. 10A. The the number of sync blocks recorded in the special playback data recording area are as shown in FIG. 10B. The operation during special playback is as explained with reference to FIG. 9 in connection with Embodiment A1.

The refresh time of the playback image at 4 times, 8 times, and 16 times speed playback with the recording format is set to be 0.5 sec. as shown in FIG. 10A and FIG. 10B. In this embodiment, however, the special playback data is formed from intra-frames which are specially provided for the respective playback speeds.

The method of configuring one error correction block of special playback data is as described with reference to FIG. 8 in connection with Embodiment A1.

The recording format of one track is as described with reference to FIG. 5 in connection with Embodiment A1. The manner of twenty sync blocks of special playback data for each of the playback speeds is recorded as described with reference to FIG. 10A in connection with Embodiment A1. The refresh time of the special playback data for each of the playback speeds is as described in connection with Embodiment A1.

The operation during recording in Embodiment B1 will now be described with reference to FIG. 30 to FIG. 32, FIG. 4A to FIG. 4C, FIG. 5 to FIG. 12. In the following description, it is assumed that the video signal in the transport packets is in the form of data encoded in frame units. The bit stream input from the input terminal 101 comprises a digital video signal, digital audio signal and digital data related to the video and audio signals. The bit stream is divided for transmission into the transport packets as shown in FIG. 7A. This packet comprises a 4 byte header, and 184 bytes of data. According to Embodiment B1, the bit stream is detected with regard to each transport packet, and two detected transport packets are converted to and recorded as five sync blocks of data as shown in FIG. 7B. The bit stream input via the input terminal 101 is input to the packet detector 111, where transport packets are detected, and then input to the first memory 112 and the intra-detector 113.

Figure 46A:
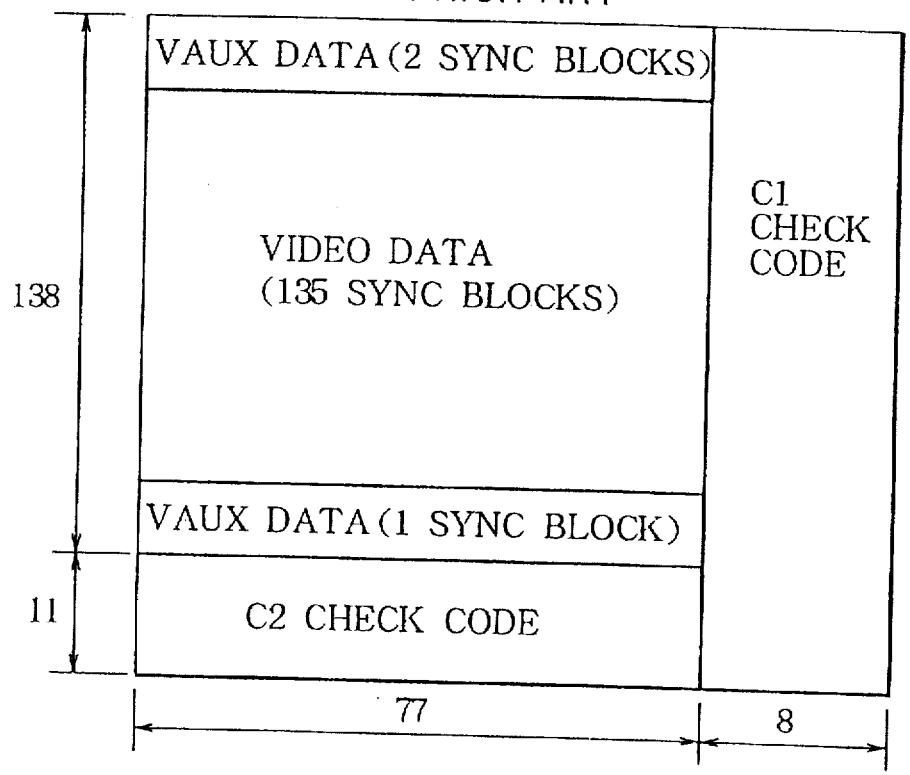
FIG. 46A and FIG. 46B show a data format of video signals complying with the SD specification on the video signal recording area of one track.
Figure 46B:
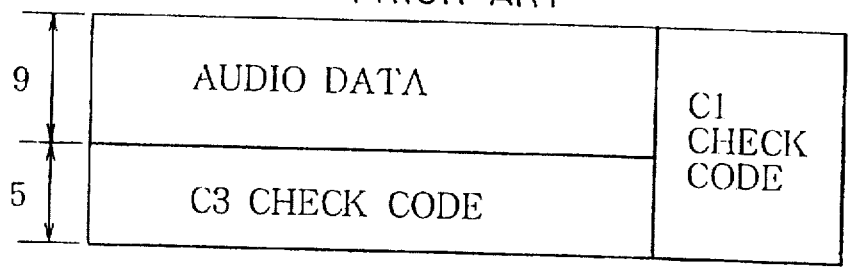

According to the SD specification, as has also been described in connection with the prior art, 149 sync blocks per track are provided for video recording as shown in FIG. 5 (or FIG. 46A and FIG. 46B). Of these sync blocks, three blocks are provided as a VAUX data recording area, and eleven blocks are provided as the C2 check code.

The configuration of one sync block is identical to that described with reference to FIG. 47 in connection with the prior art example.

The bit stream data input transport packet by transport packet is first stored in the first memory 112, and the data which is stored in the first memory 112 is read out so as to give recorded data blocks of the type shown in FIG. 7B. FIG. 7B shows the situation when two transport packets are configured from five sync blocks, the data length in one sync block is 77 bytes as described above.

The bit stream output by the packet detector 111 is input to the intra-detector 113. The operation of the intra-detector 113 will now be described with reference to FIG. 31 and FIG. 32. According to Embodiment B1, three types of data are generated as special playback data, viz. 4 times speed, 8 times speed and 16 times speed. The intra-detector 113 comprises three circuits, each as shown in FIG. 31. Regarding the second memory 14, separate memories are provided for each playback speed. More specifically, for 4 times speed playback, a memory of 30 sync block capacity is provided in view of the fact that two error correction blocks are recorded on one track. For 8 times and 16 times speed playback, a memory of 15 sync block capacity is provided.

A picture header is separated from the bit stream input via an input terminal 140 by an intra-packet header detector 142, and the coding mode of the image in each frame is detected.

If the result of detection indicates the intracoding mode, the intra-packet detection circuit 142 generates a write address and write control signal to write the bit stream in a memory 143. The intra-packet detector 142 counts the coding amount of intra-images in one frame, and outputs the count result to a coding amount controller 144. The coding amount controller 144 first estimates the transmission rate based on the coding amount count result. More specifically, according to Embodiment B1, it is estimated up to what sequence data in the DCT blocks should be transmitted based on the aforesaid coding amount count result. The estimation result is used as an initial value to perform coding amount control of transport packets. The detailed operation of the coding amount controller 144 will be described later.

According to Embodiment B1, when writing intraframe data in the memory 143, data is written transport packet by transport packet, starting from a transport packet for which a picture header has been detected to the next transport packet for which a picture header has been detected. This is because the header appended to the top of the transport packet contains information concerning the transport packet, and this information is necessary when the special playback data is generated. Further, the memory 143 comprises two memory blocks each storing one frame of intra-image data. When one of these memory blocks is generating special playback transport packets, the intraframe bit stream is written as the data in the other memory block.

When the format generation control signal is input via the input terminal 146, the intra-detection circuit 113 outputs a predetermined number of special playback transport packets. According to Embodiment B1, for example, six special playback transport packets are generated at 16 times playback speed, so when a format generation control signal is input, the intraframe transport packets stored in the memory are read from the memory 143 in sequence until the generation of six special playback transport packets is complete. According to Embodiment B1, the data read control signal from the memory 143 is output by the coding amount controller 144. Data output by the memory 143 is input to the variable length decoder 4 and slice generation circuit 145. In the variable length decoder 4, the input bit stream is variable length decoded, and the coding length and run length are output to the coding amount controller 144. The coding amount controller 144 performs coding amount control based on the aforesaid prediction result.

The method of generating special playback data transport packets will now be described. Data input via the input terminal 150 is input to the transport header appending circuit 153. The transport header appending circuit 153 generates special playback transport headers based on the transport headers appended in advance to the bit stream. The generated transport headers are appended to the bit stream based on the control signals output by the slice generation controller 155. The transport headers in the bit stream (which have been transmitted together with the bit stream) are removed by the transport header appending circuit 153.

To the bit stream to which transport headers have been added, a slice header is appended by the slice header appending circuit 154, and a slice is thereby re-configured. The method of re-configuring slices is later described in detail. The slice generation controller 55 detects a slice header from the bit stream, and supplies a control signal to the slice header appending circuit 154 for appending a slice header. The slice header following the transport header is appended to the bit stream based on the control signal output by the coding amount controller 144. The slice header which has been transmitted is removed by the slice header appending circuit 154.

The special playback data to which a slice header has been appended by the slice header appending circuit 154 is input to the EOB appending circuit 7. The EOB appending circuit 7 detects DCT blocks from the input bit stream, and forcibly appends an EOB to the DCT blocks based on a control signal output by the coding amount controller 144. High frequency region data in DCT blocks after an EOB has been forcibly appended is removed. Data to which the EOB has been forcibly appended is output to the second memory 114 via the output terminal 152.

The operation of the coding amount controller 144 will now briefly be described. First, when generation of special playback data transport packets is commenced, the coding amount controller 144 supplies the control signal to the slice generation controller 55 for appending a transport header. At the same time, an initial value of a coding amount counter provided in the coding amount controller 144 is set. When the transport header is appended to the bit stream, a control signal is output to the slice generation controller 155 for appending a slice header, and the coding amount counter value is increased by the coding length of the slice header. When addition of slice headers is complete, a read address and read control signal are output to read data from the memory 143.

The data read from the memory 143 is variable length decoded by the variable length decoder 4, and the coding length and run length are input to the coding amount controller 144. The coding amount controller 144 determines up to what sequence has been transmitted by counting the run length data. The coding amount is computed by counting the code length. The coding amount is compared with a target value each time the transmission of one macroblock is complete, and if the coding amount is greater than the target value, the transmission sequence amount is reduced; if on the other hand the coding amount is less, the transmission sequence amount is increased. The initial value of the transmission sequence amount is an estimated value.

The position at which an EOB is inserted in each DCT block is detected by comparing the sequence position information with the transmission sequence amount at the coding amount controller 144. More specifically, a control signal is generated such that a variable length code word at which the sequence position information exceeds the transmission sequence amount is replaced by an EOB. With regard to the demarcation between successive data, this information is output by the coding amount controller 144 based on the variable length decoding result. When a predetermined number of macroblocks have been transmitted, a dummy bits are added to the empty area so as to generate a special playback transport packet of 188 bytes. If a horizontal macroblock row on the screen changes in a special playback transport packet, the point at which the change occurs is detected by detecting the slice header by means of the slice generation controller 155, and a control signal is output to the slice header appending circuit 154 for appending a new slice header. Detection of transport headers or slice headers is also performed by the variable length decoder 4, and output to the coding amount controller 144 to perform coding amount control.

The intra-detection circuit 113 comprises three circuits each as shown in FIG. 31 and FIG. 32, and each circuit performs the following operations.

The above operations are repeated a predetermined number of times so as to obtain a predetermined number of transport packets. More specifically, at 16 times playback speed, six transport packets are generated and output each time a format generation control signal is input to the intra-detection circuit 113 as described above. The special playback transport packets generated in the above manner are stored in the second memory 114. According to Embodiment B1, removal of data of within DCT blocks forcibly eliminated from is implemented by not writing data in the second memory 114. The EOB appending circuit 7, therefore, appends a flag indicating whether or not data is written, and transmits the special playback transport packets.

When the format generation control signal is input, data stored in the second memory 114 is read a predetermined number of times, taking an error correction block as a unit. In this process, the data is read so as to constitute recorded data blocks as shown in FIG. 7B. That is, the data length in one sync block is 77 bytes, and two transport packets are configured from five sync blocks as described above. In the figure, H1 and H2 are headers, and the aforesaid signals are appended.

Special playback transport packets read from the second memory 114 taking five sync blocks as a unit (the data length of one sync block being 77 bytes) are grouped in sets of 15 sync blocks, and error correction codes are appended by the first error correction encoder 115. The operation of the first error correction encoder 115 will next be briefly described with reference to FIG. 8. FIG. 8 shows the construction of the error codes appended to special playback data. According to Embodiment B1, a (85, 77, 9) Reed-Solomon code (C1 check code) identical to the error correction code appended to the ATV signal bit stream is used as an error correction of the special playback data in the recording direction, and a (20, 15, 6) Reed-Solomon code (C4 check code) for which the minimum distance is the same as that of the audio signal is used in the vertical direction.

Special playback data read from the second memory 114 in units of five sync blocks is grouped into sets of 15 sync blocks by the first error correction encoder 115 so as to form one error correction block, and a C4 check code is appended in the vertical direction. A C1 check code is appended by the second correction encoder 117, described later, also to the ATV signal output by the first memory 112 so as to form a product error correction block. The minimum distance of the C4 check code is the same as that of the C3 check code in the audio signal described above, so the same coding circuit can be used merely by changing the coding length.

The data output by the first memory 112 and first error correction encoder 115 is input to the first data combining circuit 116. The first data combining circuit 116 combines the data output by the first memory 112 and first error correction encoder 115 so as to generate the track format shown in FIG. 12. The format generation control signal output by the first data combining circuit 116 will now be briefly described.

For the format generation control signal, a control signal is output for each sync block by the first memory 112 in a recording area of the ATV signal bit stream shown in FIG. 10A and FIG. 10B (or FIG. 12). One sync block of data output by the first memory 112 is stored in a predetermined area of a track format generating memory provided in the first data combining circuit 116.

With regard to the special playback data, when the format generation control signal is output by the first data combining circuit 116, data corresponding to the playback speed is read from the second memory 114, and is temporarily stored in a buffer memory provided in the first data combining circuit 116 after a C4 check code is appended by the first error correction encoder 115. (special playback data is stored in the buffer memory in units of error correction blocks. For 4 times playback speed, a buffer memory of two error correction blocks is provided.) A predetermined number of sync blocks of special playback data at different speeds is then read out with a predetermined timing, and combined in the format generating memory. To update data in the buffer memory, the number of times special playback data is repeated is detected when reading of the special playback data is complete, and if the number is equal to a predetermined number of repeats, updating is performed by outputting a format generation control signal corresponding to the special playback data.

An error correction code (C2 check code) in the vertical direction is appended, by the second error correction encoder 117, to data generated by the first data combining circuit 116, and an error correction code (C1 check code) in the recording direction is then appended. The C1 check code is thereby appended with this timing to the special playback data shown in FIG. 7A and FIG. 7B. The recording data to which error correction codes have been appended is first digitally-modulated and amplified by the recording amplifier 118, and recorded on the magnetic tape via the rotary heads 20a, 20b.

Next, description is made of the method of generating the special playback transport packets according to Embodiment B1 of this invention. FIG. 13 shows the scanning traces of the rotary head 20a at 2, 4, 8 and 16 times playback speed. As illustrated, at 4 times speed, two of the error correction blocks shown in FIG. 8 are reproduced in one scan of the rotary head 20a, at 8 times speed, one error correction block is reproduced in one scan of the rotary head 20a, and at 16 times speed, one error correction block is reproduced in two scans of the rotary head 20a.

According to Embodiment B1, special playback transport packets are generated in view of the aforesaid considerations. FIG. 33A shows the image construction of one screen frame in the ATV signal. As illustrated, the screen comprises 1080 lines×1920 pels. According to Embodiment B1, when the ATV signal is coded, 8 lines of dummy data (for example black level data) is inserted in the upper edge of the screen as shown in the figure in FIG. 33B. 120 macroblocks are therefore arranged in the horizontal direction, and 68 macroblocks in the vertical direction.

According to Embodiment B1, when special playback transport packets are generated, slices are configured as described below taking account of the data control during fast playback. When transmitting slice data, the coding amount is controlled by the coding amount controller 144 so that data in the same slice does not spread over two consecutive transport packets. Further, when the transport packets are generated, the coding amount controller 144 controls the coding amount so that the data in all macroblocks belonging to the same row of macroblocks is configured in one scanning period of the rotary head. Since 16 times speed playback data is configured as described above, and coding amount control is performed so that all macroblock data belonging to the same row of macroblocks can be reproduced in two scanning periods of the rotary head.

The method of generating special playback transport packets corresponding to each playback speed, in particular coding amount control and packet configuration, will next be described with reference to FIG. 31 and FIG. 32. First, the method of generating 4 times speed playback data will be briefly described.

A transport header is appended in the above manner by the transport header appending circuit 153 to the bit stream data input via the input terminal 150. The transport headers in the bit stream (having been transmitted together with the bit stream) are removed.

A slice header is appended by the slice header appending circuit 154 to the bit stream to which a transport header has been appended so as to re-configure a slice. More specifically, a slice header is generated and appended to the bit stream each time a transport header is appended by the transport header appending circuit 153. With regard to the data for 4 times playback, two error correction blocks of data can be reproduced in one scanning period of the rotary head. In other words, all macroblock data belonging to the same row of macroblocks are transmitted by 12 transport packets. During this interval, the slice start code in the slice header therefore has the same value. With regard to generation of the slice header, the slice header is detected from the bit stream by the slice generation controller 155, and the row of macroblocks in the bit stream currently input is detected by the slice start code in the slice header. After detecting the aforesaid row of macroblocks, the slice header having been transmitted is removed.

Regarding special playback data to which a slice header is appended, DCT blocks are detected from the bit stream, and an EOB is forcibly appended to each DCT block based on the control signal output by the coding amount controller 144 and transmission of high frequency region sequence data is terminated. Coding amount control is performed so that all macroblocks belonging to the same row of macroblocks are inserted in 12 transport packets. More specifically, according to Embodiment B1, a transport header (4 bytes) and a slice header (4 bytes solely for slice start code), are appended to the head of each transport packet, and control is performed taking account of these headers.

Likewise, for 8 times playback speed, control is performed so as to transmit all macroblocks of data in the same row of macroblocks in 6 transport packets. For 16 times speed, coding control is performed so that all macroblocks of data in the same two macroblock rows are transmitted in 6 transport packets. A brief description of 16 times speed playback is given hereinafter.

A transport header is appended to the bit stream input via the input terminal 150 by the transport header appending circuit 153. A slice header is then appended to the bit stream to which the transport header has been appended so as to re-configure the slice. (The method of appending the slice header is as described above). With regard to the data for 16 times playback, one error correction block of data can be reproduced in two scanning periods of the rotary head. In other words, all macroblocks of data belonging to the same two macroblock rows are transmitted in 6 transport packets.

According to Embodiment B1, instead of performing control so that all data belonging to the same macroblock row is transmitted by 3 transport packets, all data belonging to the same two macroblock rows is transmitted by 6 transport packets. This means that the error correction block shown in FIG. 8 is to be configured to correct playback data during fast playback. At 16 times speed, signal processing in the playback system is performed at an interval or cycle of two scanning periods of the rotary head 20a. Accordingly, with regard to the data for the 16 times speed playback, there is one packet containing a slice start code indicating a different slice row midway in the transport packet. The slice header is detected from the bit stream by the slice generation controller 155, and the macroblock row in the bit stream currently input is detected from the slice start code appended in the slice header.

With regard to the special playback data to which the slice header is appended, DCT blocks are detected from the bit stream, and an EOB is forcibly appended to each DCT block based on the control signal output by the coding amount controller 144. Coding amount control is performed so that the data in all macroblocks belonging to the same two macroblock rows is inserted in 6 transport packets. More specifically, according to Embodiment B1, coding amount control is performed taking account of the transport header at the head of each transport packet (4 bytes), the slice header (4 bytes solely for the slice start code) and the slice header of the packet appended to the slice midway in the transport packets.

Special playback transport packets configured in the above manner have the following features. Firstly, they are resistant to error propagation. This is because the transport packets are configured as described above, and a slice header is always appended to every transport packet. Even if an error is detected in playback data, the error is not propagated outside the same horizontal row of macroblocks. The slice header can be estimated from the continuity of the transport packets, and if the error is in only one transport packet, the position of the incorrect macroblock can be estimated from the remaining data. More specifically, according to the MPEG2 specification, as macroblock skip cannot be performed on intra-encoded images, the position of the macroblock for which an error was detected can be found from the continuity of macroblocks by detecting the number of macroblocks before and after the transport packet containing the error. Good image quality can therefore be obtained by having the still image packet generator 30 generate a still image packet for this packet in this part when the transport packets are combined. (The still image packet generator 30 will be described later).

The second major feature is that the circuit layout of the playback system for special playback is extremely simple. This will be described in further detail later in the description of the playback system.

The operation of the playback system when normal playback is performed by the digital VTR having the aforesaid recording format will now be described with reference to FIG. 23. Data reproduced from the magnetic tape via the rotary heads 20a and 20b is first amplified by the head amplifier 21, and signal detection is performed by the signal detector 22 so as to convert the data to playback digital data. A sync signal appended to the head of each sync block is then detected. The playback digital data output from the signal detector 22 is then digitally demodulated by the digital demodulator 23. The digitally demodulated data is input to the ID detector 24 and first error correction decoder 25. The ID detector 24 separates the ID signal appended to the head of each sync block taking, as a reference, the sync signal detected by the signal detector 22, and detects errors contained in the ID signal using the error detection code appended to the ID signal. The first error correction decoder 25 corrects and detects errors occurring in the playback signal using the C1 check code appended in the recording direction. Data for which error correction has been performed is input to the second error correction decoder 26 and third error correction decoder 28.

The second error correction decoder 26 corrects or detects errors in data which was not corrected by the C1 check code (data for which errors have been detected or which contains undetected errors) using the C2 check code (referred to as C2 decoding). C2 decoded data is input to the third memory 27. In the third memory 27, the ATV signal bit stream is separated from the input data, and only the bit stream is stored in the memory. (Special playback data is discarded at this stage as in the prior art).

With regard to the data input to the third error correction decoder 28, special playback data recorded in the special playback recording area is separated from the playback data, and the error correction block shown in FIG. 8 is configured. The separation of the special playback data recording area is performed by detecting the position of this recording area on the track from the sync block number recorded in the ID signal in the sync blocks, and by detecting the header in the sync block, and determining whether the data is the special playback data or an ordinary ATV signal bit stream.

When the error correction block is configured, the third error correction decoder 28 corrects or detects errors in the data which was not corrected by the aforesaid C1 check code using the C4 check code. The C4 decoded data is input to the fourth memory 29.

According to Embodiment B1, the minimum distance of the C4 check code for special playback data is designed to be the same as the minimum distance of the C3 check code for audio data. The reason for this is as follows: The audio signal for the ATV signal is transmitted together with the digital video signal in the ATV signal bit stream as described in connection with the prior art, so it is not recorded in the audio signal area but together with the video signal. When an ATV signal is played back using a digital VTR, an audio signal error correction decoder circuit is not used. By setting the minimum distance for the C4 check code to be the same as the minimum distance for the C3 check code, the third error correction decoder 28 can be used also as an audio signal error correction decoder, and the circuit size can thereby be reduced.

The fourth memory 29 stores the special playback data which has been error corrected. During normal playback, the switch 32 always selects the output of the third memory 27. The ATV bit stream restored to 188 byte packet information in the third memory 27 is output via the output terminal 33.

Next, the operation of the playback system during fast playback will be described with reference to FIG. 13, FIG. 23, FIG. 34 and FIG. 35. According to Embodiment B1, the description will be made of the configuration of the rotary head shown in FIG. 6A. FIG. 13 shows the scanning trace of the rotary head 20a at 2, 4, 8 and 16 times playback speed. The trace of the rotary head 20a will be the same even if the arrangement of the rotary head shown in FIG. 6B is used. (However, for the rotary head 20b, the trace will be completely different as the head position is different.) First, the tracking control method for fast playback in Embodiment B1 will be described with reference to FIG. 14A to FIG. 14C. The number of sync blocks that can be reproduced from the track at each playback speed is shown in FIG. 9.

To obtain data effectively, therefore, the tracking of the rotary head 20a should be controlled so that the playback output is a maximum in the center of the area in which special playback data is recorded at each speed. FIG. 14A to FIG. 14C show the tracking control points of the rotary head 20a at each playback speed. With the recording format according to Embodiment B1, in a 9000 rpm system, one error correction block shown in FIG. 8 can be configured even without using the data reproduced by the rotary head 20b, so the scanning trace of the rotary head 20b is omitted from FIG. 13.

Description will now be made of the method of transmitting special playback transport packets during fast playback according to Embodiment B1. The description will focus on reverse fast playback which is particularly suitable for demonstrating the effectiveness of the method. When fast playback is performed in the reverse direction using a digital VTR having the recording format shown in FIG. 12, slices are reproduced in the reverse sequence to that of recording.

Description will now be made of the playback sequence of special playback data packets during reverse fast playback with reference to FIG. 26A to FIG. 26C. FIG. 26A shows one example of slice blocks in one frame, FIG. 26B shows the scanning trace of the rotary head 20a at 2 times playback speed, and FIG. 26C shows the playback sequence of special playback data output by the rotary head 20a. In FIG. 26C, the output sequence of special playback data recorded in the 4 times speed playback area which is reproduced by the rotary head 20a is shown (It is different from the playback signal (envelope output) output by the rotary head 20a. As illustrated, during fast playback, as slice data is reproduced in the reverse direction as described above, it is necessary to alter the arrangement of slice data in the fourth memory 29.

This is stipulated by the MPEG2 specification. According to the MPEG2 specification, macroblocks must be transmitted in raster scan order starting from the macroblock at the top left of the screen, as described above. When intraframe data is input, the ATV decoder starts decoding of image data, beginning with the leading slice. If the transmission sequence of slices in the input bit stream is different from the predetermined sequence, the playback image cannot be configured by the ATV decoder. This is because an ATV decoder (MPEG2 specification) is not provided with a function for deshuffling decoded slices at a predetermined position on the screen when the sequence of playback slices is different. In such a case, in order to achieve reverse fast playback, a memory must be provided in the playback system which can store at least one frame of special playback data so that the order of playback data can be changed.

According to Embodiment B1, in order to dispense with the memory for rearranging the playback data during reverse fast playback, special playback data is transmitted, being divided into a plurality of frames. FIG. 24A to FIG. 24C and FIG. 27A to FIG. 27C show the data transmission method according to Embodiment B1. According to Embodiment B1, data is detected from special playback transport packets which are intermittently reproduced during fast playback, and data of all macroblocks in a plurality of identical macroblock rows are grouped to form a slice block. This slice block is combined with a still image packet (described later) generated by the still image packet generator 30 so as to form one frame transport packet, and output to the ATV decoder. Hereinafter, this will be referred to as partial refresh. More specifically, transport packets are transmitted with the output mode of the transport packets (image data) being in the interframe mode (i.e. interfield or interframe prediction mode).

A header is then replaced so that the special playback data which is in slices and is reproduced intermittently during fast playback is transmitted as a forced intraframe mode. FIG. 24A to FIG. 24C and FIG. 27A to FIG. 27C show the case where one frame is divided into n slice blocks (n is an integer equal to 2 or more). According to Embodiment B1, data is recorded on the magnetic tape as described above, so that a slice block is configured taking data of macroblocks belonging to the same macroblock row as a unit. In general, a slice block may be configured by grouping a plurality of macroblocks having consecutive macroblock addresses.

Partial refresh will now be described with reference to FIG. 24A to FIG. 24C and FIG. 25 in the case of fast forward playback. FIG. 24A shows special playback data reproduced by the rotary head 20 during fast forward playback. FIG. 24B shows reproduced transport packets output from the switch 32 during special playback. One frame in the figure means one frame of reproduced transport packets during special playback. FIG. 24C shows the change-over signal of the switch 31, and FIG. 25 shows interframe data output by the digital VTR. Data in the hatched part is special playback data transmitted in the forced intraframe mode, and the other part shows transmitted part of the still image packets output by the still image packet generator 30. According to Embodiment B1, one frame of special playback images are divided into n slice blocks as shown in FIG. 24A to FIG. 24C.

Description will now be made of the partial refresh during fast reverse playback with reference to FIG. 27A to FIG. 27C and FIG. 28. FIG. 27A shows special playback data reproduced by the rotary head 20 during fast reverse playback, and FIG. 27B shows the reproduced transport packets output by the switch 32 during special playback. One frame in the figure means one frame of reproduced transport packets during special playback. FIG. 27C shows the change-over signal for the switch 31. FIG. 28 shows interframe data output by the digital VTR.

The operation of the playback system during fast playback will now be described in view of the above considerations with reference to FIG. 13, FIG. 14A to FIG. 14C, FIG. 23, FIG. 34 and FIG. 35. When a fast playback mode signal is input, the switch 32 selects the output of the header replacement circuit 34. The playback data intermittently reproduced by the rotary heads 20a and 20b is amplified by the head amplifier 21, and signal detection is performed by the signal detector 22 to convert the data to playback digital data. At the same time, the sync signal appended to the head of each sync block is detected. The playback digital data output by the signal detector 22 is digitally demodulated by the digital demodulator 23. The digitally demodulated data is then input to the ID detector 24 and first error correction circuit 25. The ID detector 24 separates the ID signal appended to the head of each sync block taking, as a reference, the sync signal detected by the signal detector 22, and detects errors in the ID signal using the error detection code appended to the ID signal.

The first error correction decoder 25 corrects and detects errors in the playback signal using the C1 check code appended in the recording direction. The C1 decoded data is input to the third error correction decoder 28. The output of the first error correction decoder 25 is also input to the second error correction decoder 26, however as data is reproduced intermittently C2 decoding is not performed, and as transport packets cannot be configured, C2 decoding is not performed during fast playback in Embodiment B1.

Data corrected in the third error correction decoder 28 is stored in the fourth memory 29.

Still image packets are generated by the still image packet generator 30. When these still image packets are detected, the ATV decoder replaces the slice data part transmitted by these still image packets by decoded image data in the preceding frame. One way of configuring a still image packet is shown below. A still image packet is a transport packet wherein motion vectors are 0 and prediction errors are 0 for all macroblock data in all slices belonging to the transport packet. Still image packets will now be described with reference to FIG. 34, FIG. 36A and FIG. 36B.

Figure 36A:
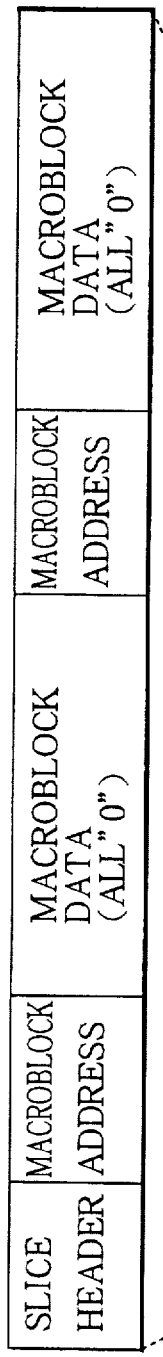
FIG. 36A and FIG. 36B are diagrams showing the configuration of still image slices and transport packets configured from these still image slices.

FIG. 36A shows a method of configuring a slice in the aforesaid transport packet. According to Embodiment B1, still image slice data is configured as shown in the figure by using macroblock skip. More specifically, following the slice header (including the start code), there are two macroblocks for which the motion vectors are 0 and prediction errors are 0 for all data in the macroblock. This slice can therefore be configured by generating a slice address appended to the slice start code in the slice header and the macroblock address of the second macroblock, and replacing only this part. According to MPEG2, the skipped macroblock is interpolated by the screen of the preceding frame, so the result is the same as if macroblock data for which motion and prediction errors are all zero is transmitted. It may be so arranged that macroblock skip is performed only for interframe data. (Interpolation of data by data in the preceding frame is defined by a P frame.)

Figure 36B:
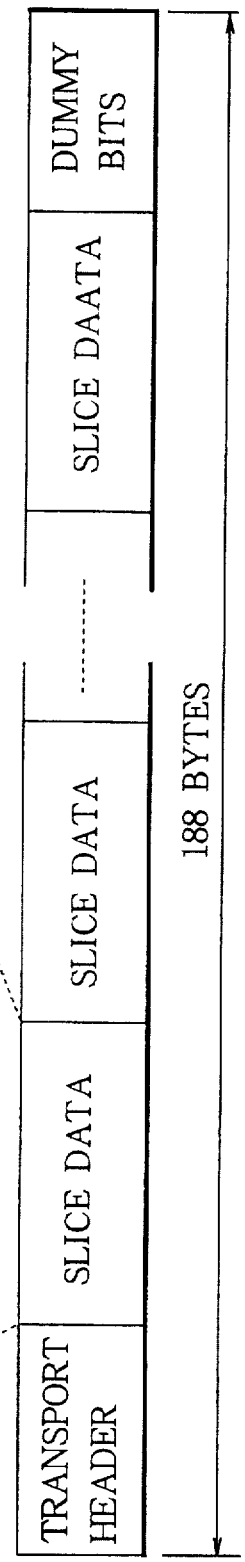
Figure 37:
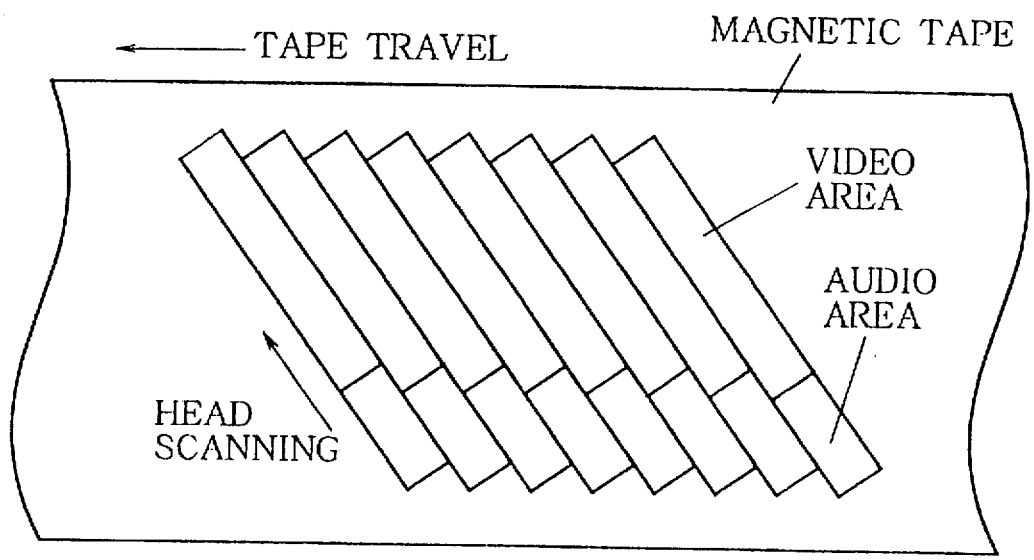
FIG. 37 shows a track pattern of an ordinary home digital VTR.
Figure 38A:
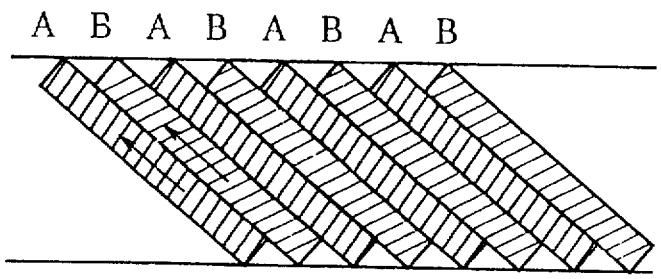
FIG. 38A and FIG. 38B show head scanning traces of a rotary head during normal playback and fast playback of a conventional digital VTR.
Figure 38B:
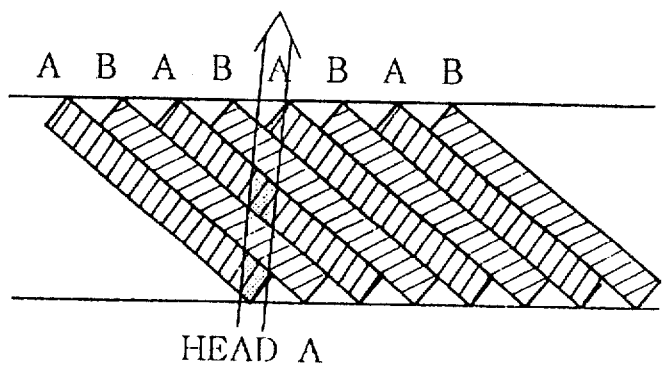
Figure 41:
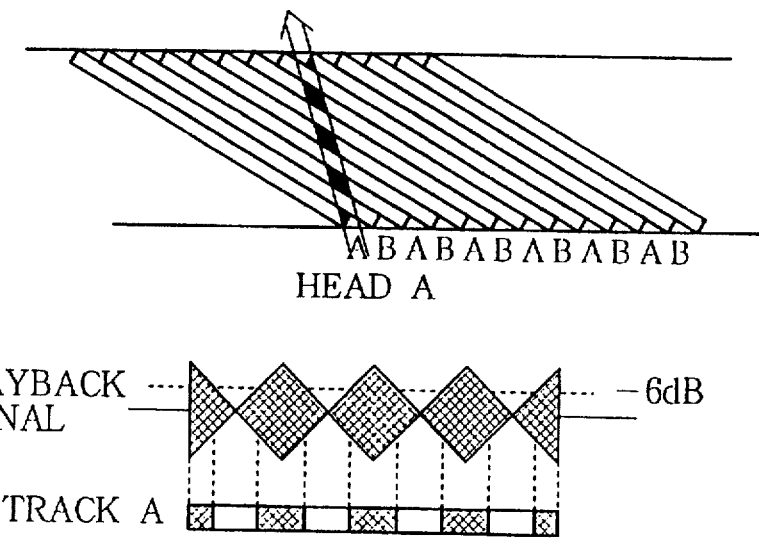
FIG. 41 shows a head scanning trace during fast playback.

In the still image packet generator 30, a plurality of still image slices are grouped together to form the transport packet shown in FIG. 36B. A transport packet may also be formed from one still image slice.

The method of configuring still image packets will now be described with reference to FIG. 34. A data output request signal is input via the input terminal 160, and the addresses of the first and last macroblocks of the slice block are input from the fourth memory 29 via the input terminal 161.

When a macroblock address of special playback data is input, the packet generation controller 169 configures two still image packets based on this information. More specifically, a first still image packet is formed from macroblocks from the head of the frame and up to the macroblock immediately preceding the first macroblock of the slice block which was input, and a second still image packet is formed from macroblocks from the macroblock next to the last macroblock of the slice block to the last macroblock of the frame. When the address at head of the input macroblock addresses is the address of the leading macroblock on the screen, only the second packet is generated. If the address at the tail of the input macroblock addresses is the address of the last macroblock on the screen, only the first packet is generated. This determination is made by the packet generation controller 169.

The packet generation controller 169 calculates a slice address based on the macroblock address, and supplies a slice address to the slice header generator 165. The slice header generator 165 generates a slice header based on this slice address. When the leading slice header of each frame is generated, a picture header is also generated. A transport packet header is also generated by the slice header generator 165. The picture header and transport header are configured based on control information contained in a control signal output by the packet controller 169 to the slice header generator 165.

In the macroblock address generator 166 generates a macroblock address based on a control signal output by the packet generation controller 169, and header information related to motion vectors (motion vectors are 0) is also generated. The macroblock addresses that are generated are the relative address "1" of the leading macroblock, and the relative address "m" when the second macroblock is skipped. The relative address "m" after the skip is calculated based on the macroblock address output by the packet generation controller 169. The generated macroblock addresses are appended to the bit stream based on a timing pulse output by the packet generation controller 169. The still image macroblock data generator 167 appends macroblock data for which prediction errors are 0, to the bit stream based on a control signal output by the packet generation controller 169, and still image slices are thereby configured (FIG. 36A).

Still image slices containing data from the leading macroblock in one frame up to the macroblock immediately preceding the leading macroblock of the slice block output by the fourth memory 29 are grouped together to form a first still image packet. Likewise, still image slices containing data from the macroblock next macroblock to the last macroblock of the slice block output by the fourth memory 29 up to the last macroblock in the frame are grouped together to form a second still image packet. The first and second still image packets may be configured from a plurality of transport packets. When they are configured by dividing them into a plurality of transport packets, transport headers are appended by the slice header generator 165.

Next, the operation of the fourth memory 29, still image packet generator 30, switch 31 and header replacement circuit 34 will now be described with reference to FIG. 23, FIG. 34 and FIG. 35. According to Embodiment B1, during 4 times and 8 times speed playback, one frame of special playback data is transmitted, being divided into 12 frames. As described above, one frame of special playback data can be configured in 68 scans of the rotary head. (That is, according to Embodiment B1, all macroblock data belonging to the same row of macroblocks can be reproduced in one scan of the rotary head 20a, and one frame is configured from 68 rows of macroblocks.) According to Embodiment B1, therefore, slice blocks each formed by 5 scans of the rotary head 20a are transmitted for 4 frame periods, and then slice blocks each formed by 6 scans are transmitted for 8 frame periods so as to configure a special playback image. Likewise, during 16 times speed playback, one frame of special playback data is transmitted being divided into 6 frames.

In the fourth memory 29, a slice block is configured in the above manner from data output by the third error correction decoder 28. When configuration of the slice block is complete, the fourth memory 29 supplies a data output request signal and the addresses of the leading and last macroblocks of the slice block to the still image packet generator 30. When the data output request signal is input, the timing controller 168 detects the state of transport packets currently being output. If still image packets are being generated, output of packets is halted (kept in the stand-by state) until output of one frame of packets is complete. If no-data packets (later described in detail) are being output, output of packets is kept in the stand-by state until output of the packet currently being output is complete. The reason why the output of the packets goes on standby while still image packets are being output by the still image packet generator 30 as described above is that there is a possibility of incorrect operation interframe data is interrupted in the ATV decoder and the head of another frame of data is input in the ATV decoder. The timing controller 168 controls generation of packets so as to avoid this.

When the standby mode is released, the timing controller 168 supplies a first still image packet generating start signal to the packet generation controller 169 to generate a first still image packet, and a control signal to cause the switch 171 to select the output of the still image macroblock generator 167. A control signal is also output so that the switch 31 selects the output of the still image packet generator 30. When the first still image packet generating start signal is supplied from the timing controller 168, the packet generation controller 169 controls the slice header generator 165, macroblock address generator 166 and still image macroblock data generator 167 so as to generate a first still image packet. When generation of the first still image packet in the packet generation controller 169 is complete, a first still image packet generating complete signal is output to the timing controller 168. When the aforesaid first still image packet output complete is detected, the timing controller 168 supplies a data read start signal to the fourth memory 29 and a control signal for causing the switch 31 to select the output of the fourth memory 29.

When the aforesaid signal is received by the fourth memory 29, the slice block configured as described above is read from the beginning. When reading of the slice block is complete, a data read complete signal is output to the timing controller 168. When the timing controller 168 receives this signal, it supplies a second still image packet generating start signal to the packet generation controller 169 to generate a second still image packet. (The switch 171 selects the output of the still image macroblock generator 167 until transmission of one frame of data is complete.) A control signal is also output so that the switch 31 selects the output of the still image packet generator 30.

When the second still image packet generating start signal is supplied from the timing controller 168, the packet generation controller 169 controls the slice header generator 165, macroblock address generator 166 and still image macroblock data generator 167 so as to output a second still image packet. When generation of the second still image packet is complete, the packet generation controller 169 supplies a second still image packet generation complete signal to the timing controller 168. When the timing controller 168 detects that output of the second still image packet is complete, it supplies a control signal so that the switch 171 selects the output of the no-data packet generator 170. The output of the no-data packet generator 170 is selected until the next slice macroblock data or still image data is configured.

In the ATV bit stream, no-data packets can be defined by transport headers. When no-data packets are detected in the bit stream, these packets are discarded by the ATV decoder. These packets are generated and output by the no-data packet generator 170.

The transport packets configured in the above manner are input to the header replacement circuit 34 via the switch 31. According to Embodiment B1, transport packets are transmitted in the interframe mode (interfield or interframe prediction mode). Special playback data output by the fourth memory 29 is transmitted in the forced intraframe mode. When special playback data is output, therefore, the header replacement circuit 34 detects a header indicating the decoding mode of each macroblock and replaces it by a forced intraframe mode header. If the special playback data contains a picture header, the header replacement circuit 34 detects a header indicating the image transmission mode from the picture header, and replaces it by a header indicating the interframe (or interfield) mode.

The operation of the header replacement circuit 34 will now be described with reference to FIG. 35. A picture header in the data input via the input terminal 175 is detected by the picture header generator 177. When the picture header is detected, a flag in the header indicating the image transmission mode is replaced by an interframe mode flag. The picture header appended to the first still image packet is transmitted indicates the interframe mode, but according to Embodiment B1, these headers are replaced without making any distinctions.

Data for which the contents of the picture header have been altered in the above manner is input to the forced intraflag appending circuit 179 and special playback slice detector 178. From the input data, the special playback slice detector 178 detects a macroblock address in the special playback slice block output by the fourth memory 29. According to Embodiment B1, special playback slice block detection is performed using a selection signal from the switch 31. The detection result is input to the forced intraflag appending circuit 179. The forced intraflag appending circuit 179 replaces a flag indicating the decoding mode of the macroblock following the macroblock address detected as described above is replaced by a flag that forcibly performs intra-decoding. Replacement of transport headers in the bit stream is also performed by the header replacement circuit 34. (More specifically, headers indicating continuity of transport packets are replaced.)

Transport packets during special playback for which the headers have been replaced are supplied to the output terminal 33 via the switch 32. Transport packets during special playback are thereby transmitted as interframe packets, and the special playback data in each macroblock reproduced from the magnetic tape is decoded by the ATV decoder in the forced intraframe mode.

The still image packet generator 30 selects the output packets according to the amount of data output to the ATV decoder up to the present time. More specifically, if the amount of data (number of frames) sent to the ATV decoder is excessive so that the memory in the ATV decoder would tend to overflow, no-data packets are output to control the coding volume. Conversely, if there is not enough data (underflow), transport packets wherein one frame comprises only still image slices are generated and output by the still image packet generator 30.

Also according to Embodiment B1, in order to adjust the number of playback frames, transport packets wherein one frame comprises only still image slices must be generated at a rate of approximately 3 frames per second during special playback. The coding amount of the ATV bit stream is controlled using these transport packets and no data transport packets. (The number of output frames is controlled so as not to cause either overflow or underflow in the memory in the ATV decoder as stated above).

The timing of generation is also controlled by the timing controller 168 based on the data transmission volume of playback transport packets during special playback. According to Embodiment B1, the data transmission volume (number of frames) is counted at the output stage of the switch 32, and the count result is input to the still image packet generator 30. The data transmission volume is found by counting the number of frames that have been transmitted but not yet decoded, and their coding amount. The operation may be simplified by using simply the aforesaid number of frames that have not yet been decoded.

FIG. 24A to FIG. 24C and FIG. 25 show playback transport packets during forward special playback that are generated in the above manner. As illustrated, one frame of special playback data is transmitted, being divided into n frames of these transport packets. Only the special playback slice part of the playback image that is transmitted in the forced intraframe mode is refreshed. In FIG. 25, the position on the screen that is updated when these transport packets in each frame are transmitted (position of area for reproduced special playback data) is shown by hatching. By transmitting playback transport packets during special playback as illustrated, the playback image is refreshed from the slice data in the upper part of the screen in one frame every n frames during fast forward playback.

Likewise, FIG. 27A to FIG. 27C and FIG. 28 show playback transport packets during fast reverse special playback that are generated in the above manner. As illustrated, one frame of special playback data is transmitted, being divided into n frames of these transport packets. Only the special playback slice part of the playback image that is transmitted in the forced intraframe mode is refreshed. In FIG. 28, the position on the screen that is updated when these transport packets in each frame are transmitted (position of area for reproduced special playback data) is shown by hatching. As illustrated, the playback image is refreshed from the slice data in the lower part of the screen in one frame every n frames during reverse fast playback. The operation of the playback system during fast playback is essentially the same in the forward and reverse directions, and only the order in which the playback image is refreshed is different. The sole difference insofar as regards control is that during reverse fast playback, slice data must be rearranged in order to configure a slice block.

As described above, by controlling the fourth memory 29, still packet generator 30, switch 31, header replacement circuit 34 and switch 32, a good playback image can be obtained without the need for the ATV decoder to recognize the fast playback mode. Further, by combining still image packets and no-data packets so as to prevent overflow or underflow of the memory of the ATV decoder, a good special playback image can be obtained.

As special playback data is configured as described above during recording, the still image slices generated by the still image packet generator 30 can be formed of slices wherein all macroblocks belonging to the same row of macroblocks are still images. These still image slices can be configured by replacing only the slice address in the slice start code, so circuit size can be reduced. Further, when the slice blocks are configured, the leading slice of special playback data reproduced from each track is the macroblock at the left edge of the screen, hence separation of a slice header during fast playback is extremely simple and circuit size can be reduced. (16 times speed playback data is detected every two scans of the rotary head.)

As the special playback data in all macroblocks belonging to the same row of macroblocks can be configured in one scan of the rotary head, one frame of interframe data can be generated in time with the rotation of the drum 19 when the slice blocks are configured, so the size of the timing controller 168 can be considerably reduced. If the aforesaid control is not performed during recording, the data amount of slices reproduced at the input of the fourth memory 29 must be counted and slice blocks must be configured according to this data amount.

Data write and read control in the fourth memory 29 is also highly simplified. If the aforesaid control was not performed during recording, data transmission with partial refresh as described above could not take place unless slices were extracted from reproduced packets at the input of the fourth memory 29 to generate a new transport packet. This is due to the fact that demarcations between slices (or slice blocks) do not necessarily correspond to demarcations between transport packets.

As was described above, according to Embodiment B1, during fast playback, data is stored in a fast playback memory taking each slice as a unit instead of taking each frame as a unit, so the memory capacity is reduced. During reverse fast playback, as slices are reproduced in the reverse order to that of recording, it was necessary to provide a memory in the playback system for storing at least one frame of fast playback data, and reshuffle the reproduced data so as to configure a playback image in the ATV decoder. However, by selecting the interframe mode as described above and switching special playback data reproduced slice by slice to forced intraframe mode and generating transport packets, the reshuffling memory is unnecessary. Also as in the case of fast forward playback, the capacity of the fast playback memory can be reduced because the reproduced data is stored in the fast playback memory taking one slice as a unit. For example, according to Embodiment B1, one frame of data is transmitted being divided into 12 slice blocks, so memory capacity can be reduced to approximately $\frac{1}{12}$.

According to Embodiment B1, therefore, output transport packets are controlled as described above, so the capacity of the fourth memory 29 can be substantially reduced. More specifically, a memory that is provided need to store only one slice of data (or a plurality of slices depending on the configuration of the slices), and there is no need to provide one frame of memory in the playback system as described above. In particular, with regard to a playback-only device, there is not need to have a memory which can store one frame of data, so circuit size can be reduced. According to Embodiment B1, the fourth memory 29 needs to have a capacity of 6 slice blocks×2 for storing 4 times speed playback data, which has the greatest data volume. Further, the transport packets can be decoded without the ATV decoder recognizing the special playback mode.

EMBODIMENT B2

Another method of generating special playback transport packets during recording according to Embodiment 2 of the invention will now be described.

When special playback transport packets are generated according to Embodiment B1, slices are configured as described below in consideration of data control during or fast playback. When slice data is transmitted, data in the same slice does not spread over two consecutive transport packets. Also, when generating transport packets, all macroblock data belonging to the same row of macroblocks can be configured in one scanning period of the rotary head. At 16 times playback speed, because of the above configuration, the coding amount is controlled such that all macroblock data belonging to the same two rows of macroblocks can be reproduced in two scanning periods of the rotary head.

Description will next be made of the method of configuring special playback transport packets according to Embodiment B2. As described in connection with Embodiment B1, two special playback transport packets generated by the intra-detector 113 are combined, and converted to 5 sync blocks of recording data blocks in the second memory 114 (FIG. 7A and FIG. 7B). According to Embodiment B1, when transport packets are generated, a slice header is always added to the head of each transport packet. According to Embodiment B2, when slice data is transmitted in a digital VTR having a recording format wherein a plurality of transport packets are grouped together to re-configure a recording data block, for example as shown in FIG. 7B, on the recording medium, coding amount control is performed by the coding amount controller 144 so that data within the same slice does not spread over the aforesaid plurality of recording data blocks. Further, when transport packets are generated, coding amount control is performed so that one macroblock row of data can be configured in one scanning period of the rotary head as in Embodiment B1. For 16 times playback speed data, coding amount control is performed so that two rows of macroblocks can be reproduced in two scanning periods of the rotary head.

The configurations of the recording system of the digital VTR, the intra-detector 113 and the slice generator 145 according to Embodiment B2 are the same as shown in FIG. 30 to FIG. 32. The recording format on the magnetic tape and the configuration of macroblocks on the screen are the same as those of Embodiment B1.

The manner of generating special playback transport packets for the respective playback speeds will next be described. In particular, the coding amount control and the manner of configuring packets will be described with reference to FIG. 31 and FIG. 32. First, the method of generating four times speed data will be described.

A special playback transport header is appended by the transport header appending circuit 153 to the bit stream input via the input terminal 150. Transport headers in the bit stream (having been transmitted together with the bit stream) are removed.

A slice header is then added by the slice header appending circuit 154 to the bit stream to which the transport header has been appended so as to re-configure a slice. When the slice is re-configured, the transport packet at the head of the recording block is detected, and the slice header is added following the transport header. For 4 times speed playback data, two error correction blocks of data can be reproduced in one scanning period of the rotary head. That is, all macroblock data belonging to the same row of macroblocks can be configured in 12 transport packets. During this interval, the slice start code in the slice header assumes the same value. Generation of the slice header is the same as in Embodiment B1, and its description will therefore be omitted here. The slice headers which have been transmitted are removed after detecting the row of macroblocks.

The the special playback data to which transport headers and slice headers have been appended is supplied to the EOB circuit 7 where DCT blocks are detected from the bit stream, and an EOB is forcibly appended to each DCT block based on control signals output by the coding amount controller 144. Coding amount control is performed such that all data belonging to the same row of macroblocks are in 12 transport packets. More specifically, according to Embodiment B2, a transport header (4 bytes) is appended to the head of each transport packet, and a slice header (4 bytes for slice start code alone) is appended to each recording block, so that the coding amount control is performed taking account of these headers.

Likewise, for 8 times speed data, coding amount control is performed so that all data belonging to the same row of macroblocks can be transmitted in 6 transport packets. For 16 times speed data, coding amount control is performed so that all data belonging to the same two rows of macroblocks can be transmitted in 6 transport packets. Below, a brief description of 16 times speed data will be given.

A transport header is appended by the transport header appending circuit 153 to the bit stream input via the input terminal 150. A slice header is then appended by the slice header appending circuit 154 to the bit stream to which the transport header has been appended so as to re-configure a slice. When the slice is re-configured, the transport packet at the head of the recording block is detected, and a slice header is added following the transport header as in the case of 4 times speed data. For 16 times speed data, one error correction block of data can be reproduced in two scanning periods of the rotary head, so all macroblock data belonging to the two rows of macroblocks can be configured in 6 transport packets. Coding amount control is also performed for each set of 6 transport packets.

The special playback data to which transport headers and slice headers have been appended is supplied to the EOB appending circuit 7; where DCT blocks are detected from the bit stream, and an EOB is forcibly appended to each DCT block based on control signals output by the coding amount controller 144. Coding amount control is performed such that all data belonging to the same two rows of macroblocks are in 6 transport packets. More specifically, as in Embodiment B1, a transport header (4 bytes) is appended to the start of each transport packet, a slice header (4 bytes for slice start code alone) is appended to each recording block, and a slice header is appended midway in the transport packet, and the coding amount control is performed taking account of these headers.

The special playback transport packets configured in the above manner have the following features.

First, slice headers are added for each recording block, it is basically sufficient to recognize the slice header appended to the transport packet at the head of the recording blocks during playback. In other words, during special playback, slice blocks can be configured without detecting the slice headers in the transport packets. Further, as slice headers are not appended to every transport header, the amount of image data is reduced, and the quality of the reproduced image during special playback is improved.

Next, these transport packets are resistant to error propagation. This is because transport packets are configured as described above. A slice header is always appended to every recording data block, so that even if an error is detected in playback data, it is not propagated outside one row of macroblocks. Also due to the continuity of recorded data blocks, if the error is in only one transport packet, the position of the incorrect macroblock can be estimated from the remaining data. More specifically, according to the MPEG2 specification, macroblock skip cannot be applied to intra-encoded images, so that, due to the continuity of macroblocks, the position of the macroblock where an error was detected can be found from the number of macroblocks in the transport packets before and after the transport packet with the error. Good image quality can be obtained by replacing this packet by a still image packet generated by the still image packet generator 30 when the transport packets are combined.

As special playback data is configured as described above during recording, when still image packets are generated, still image slices can be configured merely by generating slices for which all macroblocks in the same row of macroblocks are still images as in Embodiment B1, so the size of the still image packet generator 30 can be reduced. Also, when configuring slice blocks, the leading special playback data reproduced from each track is the macroblock at the left edge of the screen, hence separation of slice data during fast playback is easy and circuit size can be reduced. (16 times speed data can be detected every two scans of the rotary head.)

Further, as special playback data in all macroblocks belonging to the same row of macroblocks can be configured in one scan of the rotary head, one frame of interframe data can be generated in time with the rotation of the drum 19 when slice blocks are configured. As a result, the size of the timing controller 168 can be considerably reduced. Further, writing and reading of data in and out of the fourth memory 29 can be simplified.

EMBODIMENT B3

Description will now be made of a method of generating special playback transport packets during recording and a method of configuring special playback transport packets according to Embodiment B3. As was described in connection with Embodiment B1, two special playback transport packets generated by the intra-encoding circuit 113 are combined and converted to 5 sync blocks of recording data in the second memory 114 and recorded as in Embodiment B1 (FIG. 7B). Further, as the rotary head 20 moves slantwise across the track during special playback as described above, the error detection probability that would result when only the C1 check code is applied is high, so a playback image of a satisfactory quality cannot be obtained.

Recording may therefore be performed by appending an error correction code to special playback data as shown in FIG. 8 as in Embodiment B1. As shown in FIG. 8, one error correction block is configured from special playback data, and a C4 check code is appended. In some cases, errors occurring in special playback data can be suppressed by applying the C4 check code error correction to data which was not corrected by the C1 check code. The following description will be made of the manner of generating transport packets for a digital VTR having a recording format wherein the C4 check code is appended to special playback data for transmission.

First, the manner of configuration of one error correction block will be described. As in Embodiment B1, a recording data block of 5 sync blocks is configured from two special playback transport packets (FIG. 7B). Three of these recording data blocks are then grouped together to form an information symbol of one error correction block, and the C1 and C4 check codes are appended.

Next, the method of generating transport packets according to Embodiment B3 will be described. According to Embodiment B3, coding amount control is performed by the coding amount controller 144 so that when slice data is transmitted in a digital VTR having the aforementioned recording format, data in the same slice does not spread over the aforesaid plurality of error correction blocks. In other words, a slice header is necessarily appended to the leading transport packet at the head of one error correction block. When transport packets are generated, coding amount control is performed so that all macroblock data belonging to the same row of macroblocks can be configured in one scanning period of the rotary head 20 as in Embodiment B1. For 16 times speed playback data, coding amount control is performed so that all macroblock data belonging to the same two rows of macroblocks can be reproduced in two scanning periods of the rotary head 20.

With the exception of the slice header generating part, the construction and operation of the recording system of the digital VTR according to Embodiment B3 is identical to that of Embodiment B1, and its description will therefore be omitted here. Hereinafter, a brief description will be given of the slice header generating part with reference to FIG. 32. The bit stream input via the input terminal 150 is supplied to the transport header appending circuit 153, where special playback transport headers are appended. The bit stream to which with transport headers have been appended is supplied to the slice header appending circuit 154, where slice headers are appended, so that the slices are re-configured. When re-configuring the slices, the transport packet at the head of one error correction block is detected, and a slice header is generated following the transport header.

The special playback data to which transport headers and slice headers have been appended is supplied to the EOB appending circuit 7, where DCT blocks are detected from the bit stream, and EOB is forcibly appended to each DCT block based on a control signal output by the coding amount controller 144. Coding amount control is performed in the same way as in Embodiment B1. The recording format on the magnetic tape and the configuration of macroblocks on the screen are the same as those of Embodiment B1.

The special playback transport packets configured in the above manner have the following features. First, these transport packets are resistant to error propagation. This is because the data of all macroblocks belonging to the same row of macroblocks is configured in one scanning period of the rotary head as described above. Also, a slice header is always appended to the transport packet at the head of one error correction block, so that even if an error is detected in playback data, it is not propagated outside the same row of macroblocks. Further, the slice header can be estimated from the continuity of recording data blocks, so if there is only one incorrect transport packet, the position of the incorrect macroblock can be estimated from the remaining data.

As the error correction using C4 check code is applied in the data processing during special playback, the aforesaid slice blocks can be configured after configuring the error correction block shown in FIG. 8, so signal processing can be performed easily. It is not however essential that the error correction block is configured in one scan of the rotary head, it being possible to configure it in two scanning periods as in 16 times speed playback, or in a larger number of scanning periods. (A recording format comprising a non-integral number of scanning periods. e.g. 0.5 or 1.3 scanning periods, may also be used.)

As special playback data is generated as described above during recording, still image packets can be configured simply by generating slices for which all macroblocks belonging to the same row of macroblocks are still images, as in Embodiment B1, so the size of the still image packet generator 30 can be reduced. Further, when the slice blocks are configured, the leading special playback data reproduced from each track is the macroblock at the left edge of the screen, so that separation of a slice header during fast playback is simple and circuit size can be reduced. (16 times speed playback data is detected every two scans of the rotary head.)

As the special playback data in all macroblocks belonging to the same row of macroblocks can be configured in one scan of the rotary head 20, one frame of interframe data can be generated in time with the rotation of the drum 19 when the slice blocks are configured, so the size of the timing controller 168 can be considerably reduced. Data write and read control in the fourth memory 29 is also substantially simplified. The quality of the playback image is improved by the reduction in the amount of slice headers compared to Embodiments B1 and B2.

EMBODIMENT B4

According to Embodiments B1 to B3, all macroblocks belonging to one row of macroblocks were reproduced in one scanning period of the rotary head 20. The invention however is not limited to this arrangement. If at least a slice header is appended to the head of each transport packet in Embodiment B1, the head of one recording data block in Embodiment B2 and the head of one error correction block in Embodiment B3, the number of transport packets in the case of Embodiment B1, the number of recording data blocks in the case of Embodiment B2 and the number of error corrections in the case of Embodiment B3 may be counted when generating slice blocks, until a predetermined number is reached. Further, when generating still image packets in the still image packet generator 30, since a slice block start address is assigned as described above, all processing is performed taking each special playback transport packet as a unit. The end of the slice address is determined from the slice header appended to the next transport packet.

Hence, by generating special playback transport packets as described above, when slice blocks are configured during special playback, a slice header is detected from the reproduced bit stream, and the special playback data bit stream can be generated without re-configuring the transport packets. The circuit size in the playback system can therefore be considerably reduced.

EMBODIMENT B5

Description will now be made of another method of generating special playback transport packets during recording and a method of configuring special playback transport packets according to Embodiment B5. According to Embodiment B5, when these transport packets are generated, coding amount control is performed so that the data of the macroblock at the left edge of the screen is at the head of each transport packet.

In digital storage media for recording MPEG2 signals (e.g. digital VTR and digital disk players), it is expected that data will be recorded in transport packets, and, to achieve special playback, intra-encoded packets of data will be extracted so that the aforesaid signals are recorded on predetermined areas of the recording medium. When component signals defined by 4:2:2, for example, are converted to 4:2:0 to configure an MPEG2 bit stream, the amount of all special playback data belonging to the same row of macroblocks is less than the amount of data in the ATV signal.

One or more slice data comprising all the macroblocks in the same row of macroblocks can therefore be transmitted by one transport packet. If these special playback transport packets are configured so that macroblock data at the left edge of the screen is at the head of each transport packet, control of the playback system is substantially simplified and the size of the circuits involved is considerably reduced. A particularly large reduction in the circuit size of the playback system can be achieved in digital disk players designed exclusively for playback.

The special playback transport packets configured in the above manner are resistant to error propagation. This is due to the fact that change-over of the rows of macroblocks is synchronized with the beginning of transport packets, so error propagation remains inside each transport packet.

As special playback data is configured as described above during recording, still image packets can be configured by generating slices for which all macroblocks belonging to the same row of macroblocks are still images, as in Embodiment B1, so the size of the still image packet generator 30 can be reduced. Also, when configuring slice blocks, the data at the head of each transport packet is the macroblock at the left edge of the screen, so that separation of slice header during fast playback is easy and circuit size can be reduced Further, as the special playback data in all macroblocks belonging to the same row of macroblocks can be configured in one transport packet, slice blocks can be configured by counting the number of playback transport packets. The size of the timing controller 168 can therefore be considerably reduced. Further, control over writing and reading of data in and out of the fourth memory 29 can be simplified.

EMBODIMENT B6

According to Embodiments B1 to B5, a slice header was appended to each transport packet, to each recording data block or to each error correction block. According to Embodiment B6, however, a slice header is appended to each sync block in a digital VTR. In digital disk players or the like, a slice header is appended at the beginning of special playback data following the sync signal appended to the data. If the slice header is configured as described above, control of the playback system is simplified and circuit size is considerably reduced as in Embodiments B1 to B5. A particularly large reduction in the circuit size of the playback system can be achieved in digital disk players designed exclusively for playback.

EMBODIMENT B7

Another mode of operation of the playback system of a digital VTR during special playback will now be described. The recording format is assumed to be the same as that of Embodiment B1. It is also assumed that the block configuration of the playback system, the block configuration of the still image packet generator 30 and the configuration of the header replacement circuit 34 are the same as those of Embodiment B1. The operation of the playback system will be described with reference to FIG. 23, FIG. 34 and FIG. 35. According to Embodiment B7, however, the method of generating timing when one frame of special playback transport packets is output during special playback is different from that of Embodiment B1. According to Embodiment B1, the output timing of one frame of playback transport packets during special playback was generated in accordance with the number of scans of the magnetic tape by the rotary head 20a. Here, however the timing of output transport packets is adjusted to the frame synchronization of an externally connected display, such as a TV.

Hereinafter, fast playback operation at circuitry subsequent to the fourth memory 29, which is a characteristic feature of Embodiment B7, will be described with reference to FIG. 23, FIG. 34 and FIG. 35. The operation of the circuitry in front of the fourth memory 29 is assumed to be the same as that of Embodiment B1.

Data for which errors have been corrected by the third error correction decoder 28 is stored in the fourth memory 29. At the same time, the still image packet generator 30 generates still image packets, and a special playback bit stream output timing signal is also generated. The method of generating this output timing signal will be described. As stated above, in this embodiment, when special playback transport packets are output to the ATV decoder during special playback, the output timing of the generated special playback images is output is adjusted to the frame synchronization of an externally connected display, such as a TV.

When the fast playback mode signal is input, the switch 32 selects the output of the header replacement circuit 34, and detects a bit stream frame frequency from the picture header. The following description assumes that the frame frequency is 30 Hz. The frame frequency detection result is input to the timing controller 168. A frequency division factor is set in a counter provided in the timing controller 168, and based on this frequency division factor, an output timing signal is output so as to output special playback transport packets corresponding to 30 frames per second. The generation of still image packets by the still image packet generator 30 is the same as that of Embodiment B1, and its description is therefore omitted here.

The aforesaid output timing signal is supplied to the fourth memory 29 via the output terminal 164. In the fourth memory 29, slice blocks are configured from transport packets that have so far been synthesized, and the addresses of the macroblocks at the head and tail of the slice block are output to the packet generation controller 169. When there are transport packets formed of data two different frames (i.e., the last slice block of one frame and the leading slice block of the next frame), the macroblock address of the frame data that should be sent first is transmitted. The remaining special playback data is output when transport packets are transmitted during the next frame period.

When macroblock addresses of special playback data are input, the packet generation controller 169 generates a first still image packet formed of the data from the first macroblock of the frame up to a macroblock immediately preceding the first macroblock of the slice block which is input from the fourth memory 29, and a second still image packet from data from the macroblock after the last macroblock of the slice block which is input from the fourth memory 29, up to the final macroblock of the frame as in Embodiment B1. If the head of the macroblock address which was input is the leading macroblock on the screen, only the latter packet is generated, while if the address of the last macroblock which was input is the last macroblock on the screen, only the former packet is generated. This determination is made by the packet generation controller 169.

Also, when the output timing signal is output to the fourth memory 29, the state of transport packets currently being output is checked by the timing controller 168. When the bit stream of the preceding frame is being generated, output of the first still image packet is suspended (kept in stand-by state) until output of one frame of packets is complete. When no-data packets are being generated, output of the first still image packet is suspended (kept in stand-by state) until output of the packet currently being generated is complete.

When the stand-by state is released, the timing controller 168 outputs a first still image packet generating start signal to the packet generation controller 169 so as to generate a first still image packet, and a control signal so that the switch 171 selects the output of the still image macroblock data generator 167. A control signal is also output so that the switch 31 selects the output of the still image packet generator 30. When the first still image packet generating start signal is input from the timing controller 168, the packet generation controller 169 controls the slice header generator 165, macroblock address generator 166 and still image macroblock data generator 167 so as to generate a first still image packet. When generation of the first still image packet in the packet generation controller 169 is complete, a first still image packet generation complete signal is output to the timing controller 168. When the aforesaid first still image packet output complete is detected, the timing controller 168 outputs a data read start signal to the fourth memory 29 and a control signal to the switch 31 to select the output of the fourth memory 29.

When the aforesaid signal is received in the fourth memory 29 the slice block configured as described above is read from the beginning. When reading of the slice block is complete, a data read complete signal is output to the timing controller 168. When the timing controller 168 receives this signal, it outputs a second still image packet generating start signal to the packet generation controller 169 to generate a second still image packet. The switch 171 selects the output of the still image macroblock generator 167. A control signal is also output so that the switch 31 selects the output of the still image packet generator 30.

When the second still image packet generating start signal is input from the timing controller 168, the packet generation controller 169 controls the slice header generator 165, macroblock address generator 166 and still image macroblock data generator 167 so as to output a second still image packet. When generation of the second still image packet by the packet generation controller 169 is complete, a second still image packet generation complete signal is output to the timing controller 168. When it is detected by the timing controller 168 that output of the second still image packet is complete, a control signal is output so that the switch 171 selects the output of the no-data packet generator 170 until the next output timing signal is generated.

Transport packets configured in the above manner are input to the header replacement circuit 34 via the switch 31. The operation of replacing header information is the same as that of Embodiment B1, and its description is therefore omitted. Special playback data packets for which the headers have been replaced are supplied to the output terminal 33 via the switch 32. Special playback transport packets are thereby transmitted as interframe packets, and the data in each macroblock is decoded in the ATV decoder in the forced intraframe mode.

According to Embodiment B7, however, there is no need to transmit dummy frame packets wherein one frame is comprised entirely of still image packets as in Embodiment B1. This is due to the fact that one frame of data is generated in time with the frame period of the ATV decoder. In the digital VTR, therefore, special playback transport packets can be generated without regard to control of overflow or underflow of data transmitted to the ATV decoder, and circuit size can be reduced. More specifically, since need to generate one frame of still image packets has been eliminated, the timing control is simplified. In particular, timing control is much simpler than in Embodiment B1 when the speed of the rotary head 20 is adjusted in order to match the relative speed of the magnetic tape with the drum during special playback. In the actual data transmission, the size of slice blocks and the amount of special playback data that is partially refreshed and transmitted differ depending on the frame.

Hence as described above, by controlling the fourth memory 29, still image packet generator 30, switch 31, header replacement circuit 34 and switch 32, a playback image can be configured without the fast playback mode being recognized by the ATV decoder, and a good fast playback image can be obtained. Moreover, control can be performed by the digital VTR without any concern regarding memory overflow or underflow in the ATV decoder, and a good special playback image can be obtained.

Further, all special playback data of macroblocks belonging to the same row of macroblocks can be configured in one scan of the rotary head, therefore the slice blocks are configured in time with the aforesaid output timing signal and the rotation phase of the drum 19. If the data output timing is generated in this way, still image slices can be configured simply by generating slices wherein all macroblocks belonging to the same row of macroblocks are still images, and as this can be done by replacing only the slice address in the slice start code in the slice header when still image slices are generated, circuit size can be reduced.

When slice blocks are configured, the special playback data reproduced from each track is the macroblock at the left edge of the screen, so separation of slice header during fast playback is easy and circuit size can be reduced. (16 times speed playback data can be detected every two scans of the rotary head.) Also, although this was not described in detail in connection with Embodiment B7, circuit size can be still further reduced by configuring slice blocks taking one error correction block as a unit. The slice configuration during recording is moreover not limited to the arrangement shown in Embodiment B1, and the slice configurations shown in Embodiments B2 to B6 may be used, and yet similar effects are obtained.

If the aforesaid control for slice configuration during recording were not performed, it would be necessary to count the amount of slice data reproduced at the input of the fourth memory 29, and configure the slice blocks in accordance with this data amount. This would render writing and reading of data in the fourth memory 29 difficult. Also with regard to the playback transport packets, slices were extracted from transport packets, and new transport packets corresponding to the demarcations between slices had to be generated for each slice, otherwise data transmission by the aforesaid partial refresh cannot be achieved. This is due to the fact that the demarcations between slices (or slice blocks) do not necessarily coincide with the demarcations between transport packets.

Hence during fast playback, according to Embodiment B7, the fast playback memory stores the playback data, not frame by frame, but slice block by slice block. As a result, memory capacity can be reduced. Moreover, the reshuffling memory which was required during reverse fast playback is no longer necessary, and as playback data is stored in the fast playback memory taking each slice as a unit as in the case of fast forward playback, a memory capacity can be reduced. In particular, in devices designed exclusively for playback, there is no need to provide one frame of memory so circuit size can be reduced, and with regard to the ATV decoder, transport packets can be decoded without recognizing the special playback mode.

EMBODIMENT B8

According to Embodiments B1 to B7, with regard to still image packets, packets where the motion vectors were 0 and the prediction errors were 0 were transmitted. But the invention is not limited to this arrangement. For example, when special playback data was not transmitted, packets where interpolation is performed with images from the preceding frame (or field) may be used, and yet similar effects can be obtained. In particular, the memory capacity and circuit size of the playback system can be reduced if one frame of special playback images is transmitted, being divided into a plurality of frames.

For example, in another method of generating still image packets, a flag known as a DSM trick mode is defined in the system header part of MPEG2. In the fast playback mode defined by this flag, an intra-slice refresh flag is defined, and if slice data is not reproduced by transport packets in which this flag is defined, interpolation is performed using data from the preceding frame. However, the positions of macroblocks in the slice are defined only by relative addresses, and there is no description by the decoder as to how to control leading slice data when there is a jump in the address of the slice in the slice row direction, or that the leading start must begins with the data of the macroblock at the left edge.

When reproduced special playback data is transmitted using this DSM trick mode flag, if slice addresses in the row direction are output discontinuously when partial refresh is performed, transmission is so made that the data of the macroblock at the head of the first slice after the discontinuity is configured from a macroblock on the left edge of the screen. By configuring slices as thus described, transmission of transport packets by partial refresh during special playback can be achieved even if this DSM trick flag is used in the MPEG2 decoder, and the circuit size of the playback system can be reduced. If slices are configured as shown in Embodiments B1 to B6 during recording, a further reduction of circuit size of the playback system can be achieved.

EMBODIMENT B9

According to Embodiments B1 to B8, still image packets were generated transport packet by transport packet. But the invention is not limited to this arrangement, and (if slice blocks are configured transport packet by transport packet during special playback) macroblocks wherein motion vectors are 0 and prediction errors are 0 may be inserted midway in the special playback transport packets which are reproduced, and yet similar effects can be obtained. Similar effects can also be obtained if the transport packets are configured by inserting the reproduced special playback data (slice units) following the aforesaid macroblocks showing still images.

EMBODIMENT B10

According to Embodiments B1 to B9, 5 sync blocks of data were configured using the 2 transport packets as shown in FIG. 7B. But the invention is not limited to this arrangement. (In particular, it is expected that in disk players for recording/playback of, or playback of digital signals, that are not yet standardized, the configuration of one sync block may be different from that of a digital VTR.) Moreover, the configuration of one error correction block configured from special playback data is not limited to that shown in FIG. 8.

EMBODIMENT B11

According to Embodiments B1 to B10, special playback data was treated as frame image data. But the invention is not limited to this arrangement. When the transmitted transport packets are field images, they may be treated as field images, and similar processing may be performed, and yet similar effects are obtained. The data may also comprise non-interlaced images. Further, according to Embodiments B1 to B10, the data recording format was that shown in FIG. 12. But the invention is not limited to this arrangement. the same effect can be achieved the aforesaid control may be applied to a digital VTR or digital signal playback device that records digital signals which are high efficiency coded by high efficiency coding system using motion compensation prediction as typified by MPEG2, and has a recording format where intra-encoded data is separated as the special playback data from the aforesaid digital signals, and the special playback data is recorded in predefined areas on the recording medium, and yet similar effects are obtained.

According Embodiments B1 to B10, special playback data was recorded on one track in the scanning trace of the rotary head, where special playback data areas for recording the special playback data may be provided on a plurality of tracks and on the scanning trace of the rotary head, if the special playback transport packets are configured as described above, similar effects can be obtained. Further, according to Embodiments B1 to B10, a digital VTR was described as an example of a digital signal playback device. But the invention is not limited to this, and but may be adopted to slice configuration during recording and playback control during special playback in disk players or the like which records the aforesaid signals in the above manner.

What is claimed is:

1. A digital signal playback device for playing back data from a recording medium on which intraframe, intrafield, interframe, or interfield encoded digital video signals and digital audio signals input in the form of packets have been recorded transparently, and special playback data for special playback generated from said intraframe or intrafield encoded digital video signals has been recorded at predetermined positions on the recording medium, comprising:

data separating means for separating said special playback data from a playback data during special playback;

data storage means for storing said special playback data separated by said data separating means;

still image slice data generating means for generating one frame or one field of still image slice data, during the special playback, all the macroblocks in the slice output by said still data generating means having a zero motion vector and zero prediction errors; and data control means for controlling data reading from said data storage means and said still image slice data generating means during the special playback in such a manner that:

when one field or one frame of special playback data has been configured in said data storage means, said data control means causes said one field or one frame of the special playback data to be read from the data storage means, and while one field or one frame of special playback data separated from the playback data is being configured in said data storage means, said data control means causes said still image packets to be output from the still image slice data generating means in field or frame units at predetermined intervals;

said special playback data read from the data storage means and said still image packets output from the still image slice data generating means being supplied via a decoder to a display.

2. A digital signal playback device as defined in claim 1, further comprising still image packet generating means, wherein data change-over is performed such that the output of said still image packet generating means is always selected during still playback after the final data in the frame or field reproduced during normal playback has been output.

3. A digital signal playback device as defined in claim 1, further comprising still image packet generating means, wherein a change-over of data is performed such that the output of said still image slice data generating means is output until a servo system locks and the intra-frame data for the special playback is reproduced, during transition to fast playback.

4. A digital signal playback device for playing back data from a recording medium on which intraframe, intrafield, interframe, or interfield encoded digital video signals and digital audio signals input in the form of packets have been recorded transparently, and special playback data for special playback generated from said intraframe or intrafield encoded digital video signals has been recorded at predetermined positions on the recording medium, comprising:

data separating means for separating said special playback data from a playback data during special playback;

data storage means for storing said special playback data separated by said data separating means during the special playback;

still image slice data generating means for generating still image slice data during the special playback, with all the macroblocks in the slice having a zero motion vector and zero prediction errors; and packet generating means for controlling the data storage means and the still image slice data generating means to generate one field or one frame of output data packets at predetermined intervals during the special playback;

a header information changing means receiving each field or frame of output data packets, and changing the header information of said output data packets, thereby outputting each field or frame of output data packets in an interfield or interframe mode;

wherein when said packet generating means generates said one field or one frame of output data packets during the special playback at predetermined intervals, the slice header for the special playback data separated by said data separating means from the playback data is analyzed, and said packet generating means is controlled such that, on the basis of the result of the analysis, the still image packets are generated from the still image slice data generating means in place of the special playback data which is not stored in the storage means, and the macroblocks in each slice formed of the special playback data which is stored in the storage means are set to forced intramode, said special playback data read from the data storage means and said still image packets output from the still image slice data generating means being supplied via a decoder to a display.

5. A digital signal playback device as defined in claim 4, wherein control, performed by said packet generating means, is used at least during special playback in reverse direction.

6. A digital signal recording device for transparently recording intraframe, intrafield, interframe or interfield encoded digital video signals and digital audio signals input in the form of transport packets, comprising:

data separating means for separating intraframe or intrafield coded video signals from said transport packets, special playback packet generating means for recompressing said intraframe or intrafield coded digital signals separated by said separating means, and forming slices using the recompressed data, so as to reconfigure special playback transport packets using the slices thus formed, special playback block forming means for grouping n (n being a predetermined integer) said special playback transport packets output by said special playback packet generating means so as to form special playback blocks, and recorded data controlling means for controlling said special playback packet generating means so that data within each of said slices does not spread over a plurality of said special playback blocks, and performing control over reading from the special playback packet generating means such that the special playback blocks are stored in predefined areas on a recording medium, when the intraframe, intrafield, interframe, or interfield encoded digital signals are recorded on the recording medium.

7. A digital signal recording and playback device as defined in claim 6, wherein said special playback packet generating means is controlled so that data in one slice does not spread over a plurality of said transport packets when said special playback transport packets are generated.

8. A digital recording and playback device as defined in claim 6, wherein said special playback transport packets are formed such that data of the macroblock at the head of said special playback transport packets is formed from a macroblock on the left edge of the screen.

9. A digital recording and playback device as defined in claim 7, wherein said special playback transport packets are formed such that data of the macroblock at the head of said special playback transport packets are formed from a macroblock on the left edge of the screen.

10. A digital signal recording and playback device as defined in claim 6, wherein said special playback block forming means is controlled so that the data in said special playback block is configured from all macroblocks belonging to the same macroblock row.

11. A digital signal recording and playback device as defined in claim 10, wherein said special playback block forming means is controlled such that one special playback block is formed from two special playback transport packets.

12. A digital signal recording and playback device as defined in claim 8, wherein said special playback block is controlled to form special playback blocks from one error correction block to which an error correction code is appended in the direction different from the recording direction.

13. A digital signal recording and playback device as defined in claim 6, wherein said special playback block forming means is controlled to form one special playback block from one error correction block to which an error correction code is appended in a direction different from the recording direction.

* * * * *